(12) United States Patent
Aimatsu

(10) Patent No.: US 9,690,022 B2
(45) Date of Patent: *Jun. 27, 2017

(54) LIQUID CRYSTAL COMPOSITION, PHASE DIFFERENCE PLATE, IMAGE DISPLAY DEVICE, AND METHOD FOR CONTROLLING WAVELENGTH DISPERSION IN OPTICALLY ANISOTROPIC LAYER

(71) Applicant: ZEON CORPORATION, Tokyo (JP)

(72) Inventor: Masashi Aimatsu, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 14/438,262

(22) PCT Filed: Oct. 30, 2013

(86) PCT No.: PCT/JP2013/079375
§ 371 (c)(1),
(2) Date: Apr. 24, 2015

(87) PCT Pub. No.: WO2014/069515
PCT Pub. Date: May 8, 2014

(65) Prior Publication Data
US 2015/0285979 A1    Oct. 8, 2015

(30) Foreign Application Priority Data
Oct. 30, 2012    (JP) .................... 2012-238970

(51) Int. Cl.
C09K 19/38    (2006.01)
G02B 5/30    (2006.01)
G02F 1/1335    (2006.01)
G02F 1/1337    (2006.01)
C09K 19/54    (2006.01)
C09K 19/02    (2006.01)
C09K 19/22    (2006.01)
C09K 19/24    (2006.01)
C09K 19/30    (2006.01)
C09K 19/32    (2006.01)
C09K 19/34    (2006.01)
C09K 19/04    (2006.01)
C09K 19/20    (2006.01)

(52) U.S. Cl.
CPC ............ *G02B 5/3016* (2013.01); *C09K 19/02* (2013.01); *C09K 19/22* (2013.01); *C09K 19/24* (2013.01); *C09K 19/3068* (2013.01); *C09K 19/322* (2013.01); *C09K 19/3497* (2013.01); *C09K 19/38* (2013.01); *C09K 19/3861* (2013.01); *C09K 19/3876* (2013.01); *G02B 5/3083* (2013.01); *G02F 1/1337* (2013.01); *G02F 1/133528* (2013.01); *C09K 2019/0448* (2013.01); *C09K 2019/2078* (2013.01)

(58) Field of Classification Search
CPC ............ C09K 19/3491; C09K 19/3497; C09K 19/3861; C09K 19/542; C09K 19/544; C09K 2019/0448; C09K 2019/2078; G02B 5/3016; G02B 5/3083; G02F 1/133528; G02F 1/1337; G02F 1/13363; G02F 2001/133637

See application file for complete search history.

(56) References Cited

U.S. PATENT DOCUMENTS 6,565,974 B1    5/2003    Uchiyama et al.
2009/0046224 A1*    2/2009    Iida .................. G02F 1/133634
                                              349/96

(Continued)

FOREIGN PATENT DOCUMENTS

| JP | 3325560 B2 | 9/2002 |
| JP | 2007-002208 A | 1/2007 |
| JP | 2010-031223 A | 2/2010 |
| JP | 2010-084032 A | 4/2010 |
| WO | 2012/147904 A1 | 11/2012 |

OTHER PUBLICATIONS

Feb. 10, 2014 Search Report issued in International Patent Application No. PCT/JP2013/079375.

(Continued)

*Primary Examiner* — Shean C Wu
(74) *Attorney, Agent, or Firm* — Oliff PLC

(57) ABSTRACT

Liquid crystal composition containing polymerizable liquid crystal compound with reverse wavelength dispersion and one additive-monomer-A and additive-monomer-B, wherein: liquid crystal compound includes (in molecule), a main chain mesogen and side chain mesogen, optical axis of the main chain mesogen and optical axis of the side chain mesogen in different directions when compound is uniformly oriented, reversing wavelength dispersion property of birefringence; when the additive-monomer is in liquid crystal compound, the additive-monomer-A satisfies Expression(i); the additive-monomer-B satisfies Expression(ii) within wavelength range λ=380 nm-780 nm: ne>nea and no<noa Expression(i), ne<neb and no>nob Expression(ii) (ne is a refractive index of liquid crystal compound in slow-axis-direction, no is a refractive index of liquid crystal compound in fast-axis-direction, nea and noa are refractive indices of the additive-monomer-A in ne and no direction when dispersed in liquid crystal compound, neb and neo are refractive indices of additive-monomer-B in ne and no direction when dispersed in liquid crystal compound).

8 Claims, 5 Drawing Sheets

(56) References Cited

U.S. PATENT DOCUMENTS

| | | | | |
|---|---|---|---|---|
| 2010/0045901 A1* | 2/2010 | Uehira | ............. | C07D 277/64 |
| | | | | 349/75 |
| 2014/0142266 A1 | 5/2014 | Sakamoto et al. | | |
| 2015/0277006 A1* | 10/2015 | Takasago | ........... | C09K 19/2007 |
| | | | | 349/194 |
| 2015/0277010 A1* | 10/2015 | Aimatsu | ............. | G02B 1/04 |
| | | | | 359/489.07 |

OTHER PUBLICATIONS

May 5, 2015 International Preliminary Report on Patentability issued in International Patent Application No. PCT/JP2013/079375.

\* cited by examiner

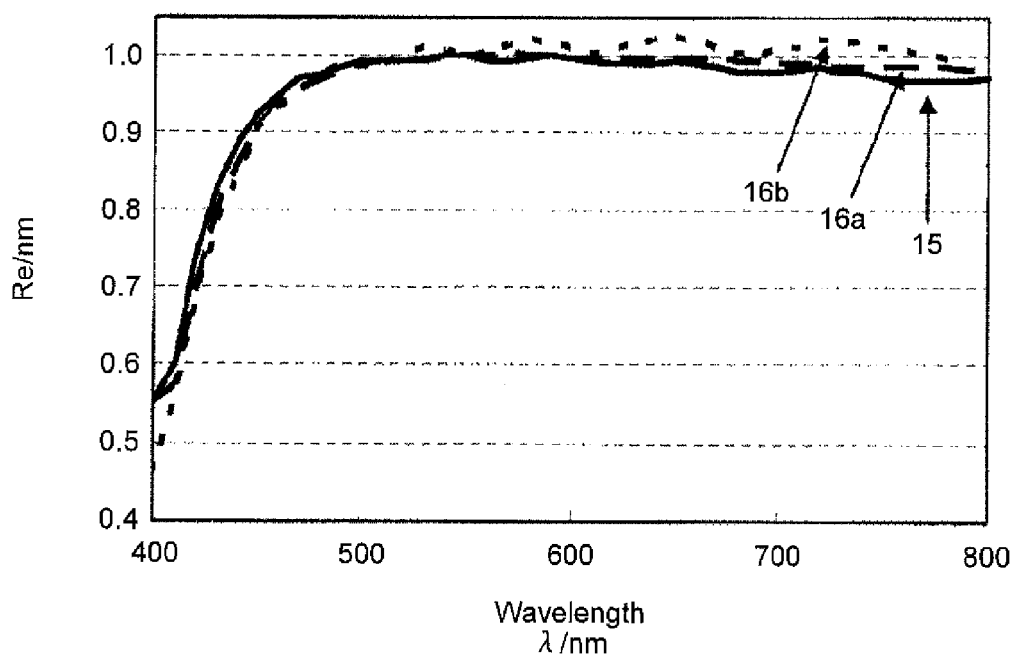

LIQUID CRYSTAL COMPOSITION, PHASE DIFFERENCE PLATE, IMAGE DISPLAY DEVICE, AND METHOD FOR CONTROLLING WAVELENGTH DISPERSION IN OPTICALLY ANISOTROPIC LAYER

FIELD

The present invention relates to a phase difference plate having reverse wavelength dispersion property that may be used for liquid crystal display devices and for organic EL display devices, to a liquid crystal composition that may be used for production of the phase difference plate, to a method for producing the phase difference plate, and to an image display device using the phase difference plate. The present invention also relates to a method for controlling wavelength dispersion in an anisotropic layer of a phase difference plate having reverse wavelength dispersion property.

BACKGROUND

In recent years, liquid crystal display devices have rapidly come into widespread use for applications such as portable devices, tablets, notebook PCs, and TV sets. This is because the liquid crystal display devices are thin and therefore their space-saving, lightweight, low power consumption, etc. are appreciated. Organic EL display devices have capability of realizing reduction in thickness and power saving at a higher level than that of the liquid crystal display devices, and have high display performance. Therefore the organic EL display devices are rapidly coming into widespread use mainly for smartphones. These display devices are equipped with a phase difference plate for improving their display performance for, e.g., improving viewing angle property and for ensuring visibility under strong external light.

The phase difference plates are broadly classified into two types: a stretched phase difference plate in which a phase difference is developed by stretching a resin to highly orient the resin; and a coated phase difference plate in which a polymerizable liquid crystal is applied onto a substrate serving as a support, oriented to develop a phase difference, and then cured. The stretched phase difference plate has very good workability, and their phase difference, film thickness, etc. can be relatively freely controlled by changing stretching conditions. The coated phase difference plate has a very large birefringence, being about 0.1, and are characterized in that it is highly advantageous to achieve a reduction in thickness as compared to the stretched phase difference plate ($\Delta n$=about 0.002).

Recently, the requirement for improvement in display performance has arisen, and phase difference plates are strongly being required to have reverse wavelength dispersion property, and to have precise controllability of the magnitude of the wavelength dispersion. The reverse wavelength dispersion property is a property in which the value of phase difference or birefringence increases as the wavelength $\lambda$ of light increases from the short wavelength side toward the long wavelength side. The magnitude of wavelength dispersion is a magnitude that indicates a change in the value of phase difference with respect to a change in wavelength and is generally represented by the magnitude of $Re(450)/Re(550)$ and $Re(650)/Re(550)$, where $Re(\lambda)$ is the value of retardation at a wavelength of $\lambda$ nm.

With regard to the stretched phase difference plates, there is a proposal described in Patent Literature 1 to meet the aforementioned requirements. According to Patent Literature 1, a phase difference plate having reverse wavelength dispersion property can be provided by stretching a resin prepared by blending or copolymerizing a macromolecular polymer having a positive intrinsic birefringence and a macromolecular polymer having a negative intrinsic birefringence. The magnitude of wavelength dispersion can be controlled by changing the blending ratio of the two macromolecular polymers and the stretching conditions.

With regard to coated phase difference plates, there have been developed a large number of polymerizable liquid crystal materials having reverse wavelength dispersion property, as described in Patent Literature 2. By changing the molecular design of a polymerizable liquid crystal compound with reverse wavelength dispersion, the magnitude of wavelength dispersion can be controlled.

As other methods for controlling the wavelength dispersion in a polymerizable liquid crystal material with reverse wavelength dispersion, there have been proposed methods as in Patent Literatures 3 and 4. In these methods, a polymerizable liquid crystal compound with reverse wavelength dispersion and another polymerizable liquid crystal compound having forward wavelength dispersion property are blended. By controlling the ratio of blending, the wavelength dispersion can be controlled in the direction that causes $Re(450)/Re(550)$ to increase. If the magnitude of wavelength dispersion can be controlled by blending of the polymerizable liquid crystal compounds in such a manner, it is not necessary to return to molecular designing, so that it is possible to rapidly adapt to the requirements from the market.

CITATION LIST

Patent Literature

Patent Literature 1: Japanese Patent No. 3325560 B
Patent Literature 2: Japanese Patent Application Laid-Open No. 2010-31223 A
Patent Literature 3: Japanese Patent Application Laid-Open No. 2007-002208 A
Patent Literature 4: Japanese Patent Application Laid-Open No. 2010-084032 A

SUMMARY

Technical Problem

As explained, one method for controlling the magnitude of wavelength dispersion in a polymerizable liquid crystal with reverse wavelength dispersion is to control the magnitude by the molecular designing of the polymerizable liquid crystal compound with reverse wavelength dispersion itself. However, with this method, it takes an enormous amount of time from the molecular designing until mass production, and therefore it may be unable to rapidly adapt to the requirements from the market. With the method of blending an additional polymerizable liquid crystal compound having forward wavelength dispersion property, the wavelength dispersion can be controlled easily. However, the wavelength dispersion can only be controlled in the direction that causes $Re(450)/Re(550)$ to increase.

The present invention has been made in view of the foregoing problems, and an object of the present invention is to provide a method for freely controlling the magnitude of wavelength dispersion in a polymerizable liquid crystal material with reverse wavelength dispersion without returning to molecular designing. Specifically, the object of the present invention is to provide a method that enables controlling of the wavelength dispersion not only in the direction that causes Re(450)/Re(550) to increase but also in the direction that causes Re(450)/Re(550) to decrease without molecular designing. Further objects of the present invention are to provide a liquid crystal composition with controlled wavelength dispersion, a phase difference plate using the liquid crystal composition, and a method for producing the phase difference plate.

Solution to Problem

That is, according to the present invention, the following is provided.

(1) A liquid crystal composition comprising a polymerizable liquid crystal compound with reverse wavelength dispersion and one of an additive monomer A and an additive monomer B, wherein:

the polymerizable liquid crystal compound with reverse wavelength dispersion includes, in a molecule thereof, a main chain mesogen and a side chain mesogen bonded to the main chain mesogen, an optical axis of the main chain mesogen and an optical axis of the side chain mesogen being oriented in different directions when the polymerizable liquid crystal compound with reverse wavelength dispersion is uniformly oriented, whereby birefringence Δn of the polymerizable liquid crystal compound with reverse wavelength dispersion has reverse wavelength dispersion property; and when the additive monomer is dispersed in the polymerizable liquid crystal compound with reverse wavelength dispersion, the additive monomer A satisfies the following Expression (i) within the wavelength range of λ=380 nm to 780 nm, and the additive monomer B satisfies the following Expression (ii) within the wavelength range of λ=380 nm to 780 nm:

ne>nea and no<noa    Expression (i)

ne<neb and no>nob    Expression (ii)

(wherein ne is a refractive index of the polymerizable liquid crystal compound with reverse wavelength dispersion in a slow axis direction, no is a refractive index of the polymerizable liquid crystal compound with reverse wavelength dispersion in a fast axis direction, nea is a refractive index of the additive monomer A in the ne direction when the additive monomer A is dispersed in the polymerizable liquid crystal compound with reverse wavelength dispersion, noa is a refractive index of the additive monomer A in the no direction when the additive monomer A is dispersed in the polymerizable liquid crystal compound with reverse wavelength dispersion, neb is a refractive index of the additive monomer B in the ne direction when the additive monomer B is dispersed in the polymerizable liquid crystal compound with reverse wavelength dispersion, and nob is a refractive index of the additive monomer B in the no direction when the additive monomer B is dispersed in the polymerizable liquid crystal compound with reverse wavelength dispersion).

(2) A phase difference plate comprising an optically anisotropic layer formed by curing a liquid crystal composition containing a polymerizable liquid crystal compound with reverse wavelength dispersion and an additive monomer A, wherein:

in the optically anisotropic layer, the polymerizable liquid crystal compound with reverse wavelength dispersion includes, in a molecule thereof, a main chain mesogen and a side chain mesogen bonded to the main chain mesogen, an optical axis of the main chain mesogen and an optical axis of the side chain mesogen being oriented in different directions, whereby birefringence $\Delta n_L'$ of the optically anisotropic layer has reverse wavelength dispersion property;

the additive monomer A satisfies the following Expression (i) within the wavelength range of λ=380 nm to 780 nm:

ne>nea and no<noa    Expression (i)

(wherein ne is a refractive index of the polymerizable liquid crystal compound with reverse wavelength dispersion in a slow axis direction, no is a refractive index of the polymerizable liquid crystal compound with reverse wavelength dispersion in a fast axis direction, nea is a refractive index of the additive monomer A in the ne direction when the additive monomer A is dispersed in the polymerizable liquid crystal compound with reverse wavelength dispersion, and noa is a refractive index of the additive monomer A in the no direction when the additive monomer A is dispersed in the polymerizable liquid crystal compound with reverse wavelength dispersion); and the birefringence $\Delta n_L'$ of the optically anisotropic layer formed by curing the liquid crystal composition and birefringence $\Delta n_L$ of an optically anisotropic layer formed by uniformly orienting only the polymerizable liquid crystal compound with reverse wavelength dispersion satisfy relationship of Expression (iii):

$\Delta n_L(450)/\Delta n_L(550) > \Delta n_L'(450)/\Delta n_L'(550)$ and $\Delta n_L(650)/\Delta n_L(550) < \Delta n_L'(650)/\Delta n_L'(550)$    Expression (iii)

(wherein $\Delta n_L(450)$ and $\Delta n_L'(450)$ are the birefringence $\Delta n_L$ and the birefringence $\Delta n_L'$, respectively, at a wavelength of λ=450 nm, $\Delta n_L(550)$ and $\Delta n_L'(550)$ are the birefringence $\Delta n_L$ and the birefringence $\Delta n_L'$, respectively, at a wavelength of λ=550 nm, and $\Delta n_L(650)$ and $\Delta n_L'(650)$ are the birefringence $\Delta n_L$ and the birefringence $\Delta n_L'$, respectively, at a wavelength of λ=650 nm).

(3) A phase difference plate comprising an optically anisotropic layer formed by curing a liquid crystal composition containing a polymerizable liquid crystal compound with reverse wavelength dispersion and an additive monomer B, wherein:

in the optically anisotropic layer, the polymerizable liquid crystal compound with reverse wavelength dispersion includes, in a molecule thereof, a main chain mesogen and a side chain mesogen bonded to the main chain mesogen, an optical axis of the main chain mesogen and an optical axis of the side chain mesogen being oriented in different directions, whereby birefringence $\Delta n_L'$ of the optically anisotropic layer has reverse wavelength dispersion property;

the additive monomer B satisfies the following Expression (ii) within the wavelength range of λ=380 nm to 780 nm:

ne<neb and no>nob    Expression (ii)

(wherein ne is a refractive index of the polymerizable liquid crystal compound with reverse wavelength dispersion in a slow axis direction, no is a refractive index of the polymerizable liquid crystal compound with reverse wavelength dispersion in a fast axis direction, neb is a refractive index of the additive monomer B in the ne direction when the additive monomer B is dispersed in the polymerizable liquid crystal compound with reverse wavelength dispersion, and nob is a refractive index of the additive monomer B in the no direction when the additive monomer B is dispersed in the polymerizable liquid crystal compound with reverse wavelength dispersion); and the birefringence $\Delta n_L'$ of the optically anisotropic layer formed by curing the liquid crystal composition and birefringence $\Delta n_L$ of an optically anisotropic layer formed by uniformly orienting only the polymerizable liquid crystal compound with reverse wavelength dispersion satisfy relationship of Expression (iv):

$$\Delta n_L(450)/\Delta n_L(550) < \Delta n_L'(450)/\Delta n_L'(550) \text{ and}$$

$$\Delta n_L(650)/\Delta n_L(550) > \Delta n_L'(650)/\Delta n_L'(550) \qquad \text{Expression (iv)}$$

(wherein $\Delta n_L(450)$ and $\Delta n_L'(450)$ are the birefringence $\Delta n_L$ and the birefringence $\Delta n_L'$, respectively, at a wavelength of $\lambda$=450 nm, $\Delta n_L(550)$ and $\Delta n_L'(550)$ are the birefringence $\Delta n_L$ and the birefringence $\Delta n_L'$, respectively, at a wavelength of $\lambda$=550 nm, and $\Delta n_L(650)$ and $\Delta n_L'(650)$ are the birefringence $\Delta n_L$ and the birefringence $\Delta n_L'$, respectively, at a wavelength of $\lambda$=650 nm).

(4) A method for producing the phase difference plate according to (2), the method comprising the steps of:
applying the liquid crystal composition onto a support;
rendering orientation of the applied liquid crystal composition uniform; and
fixing the uniform orientation state.

(5) A method for producing the phase difference plate according to (3), the method comprising the steps of:
applying the liquid crystal composition onto a support;
rendering orientation of the applied liquid crystal composition uniform; and
fixing the uniform orientation state.

(6) An image display device comprising the phase difference plate according to (2) or (3).

(7) A method for producing a phase difference plate including an optically anisotropic layer formed by curing the liquid crystal composition according to (1), the method comprising
controlling a magnitude of wavelength dispersion in the optically anisotropic layer by an amount of one of the additive monomer A and the additive monomer B in the liquid crystal composition.

(8) A method for controlling a magnitude of wavelength dispersion in an optically anisotropic layer included in any of the aforementioned phase difference plates, the optically anisotropic layer being prepared by curing the liquid crystal composition containing the polymerizable liquid crystal compound with reverse wavelength dispersion and one of the additive monomers A and B, the method comprising controlling an amount of the one of the additive monomers A and B contained in the liquid crystal composition to thereby control the magnitude of the wavelength dispersion in the optically anisotropic layer.

Advantageous Effects of Invention

The present invention provides a method that enables flexible control of the magnitude of wavelength dispersion of a polymerizable liquid crystal with reverse wavelength dispersion without returning to molecular designing. The present invention also provides a liquid crystal composition for controlling wavelength dispersion, a phase difference plate using the liquid crystal composition and having reverse wavelength dispersion property, a method for producing the phase difference plate, and an image display device using the phase difference plate.

BRIEF DESCRIPTION OF DRAWINGS

FIG. 9 is a graph showing a change in wavelength dispersion of birefringence $\Delta n$ due to an additive monomer.

DESCRIPTION OF EMBODIMENTS

Before the method for controlling wavelength dispersion in a liquid crystal composition in the present invention is described, the features of the structure of a polymerizable liquid crystal compound with reverse wavelength dispersion and the principle of the development of the reverse wavelength dispersion property will be described with reference to the invention shown in Patent Literature 2 as an example. In the present invention, the term "polymerizable liquid crystal material with reverse wavelength dispersion" refers to a compound or composition that can be a material exhibiting reverse wavelength dispersion property after formed into, e.g., a film. The term "liquid crystal composition" refers to a composition containing a liquid crystal compound such as a polymerizable liquid crystal compound with reverse wavelength dispersion. The liquid crystal composition in the present invention usually has reverse wavelength dispersion property and is also usually polymerizable.

In the invention described in Patent Literature 2, there is an example of a polymerizable liquid crystal compound with reverse wavelength dispersion having a molecular structure that is as shown in the following. In this polymerizable liquid crystal compound with reverse wavelength dispersion, two mesogen skeletons, a mesogen 1a and a mesogen 1b, are present and are crossed to each other. A combination of the aforementioned two mesogens may possibly be defined as one mesogen. However, in the present invention, these are expressed as two separate mesogens.

[Chemical Formula 1]

(Polymerizable liquid crystal compound with reverse wavelength dispersion disclosed in the literature)

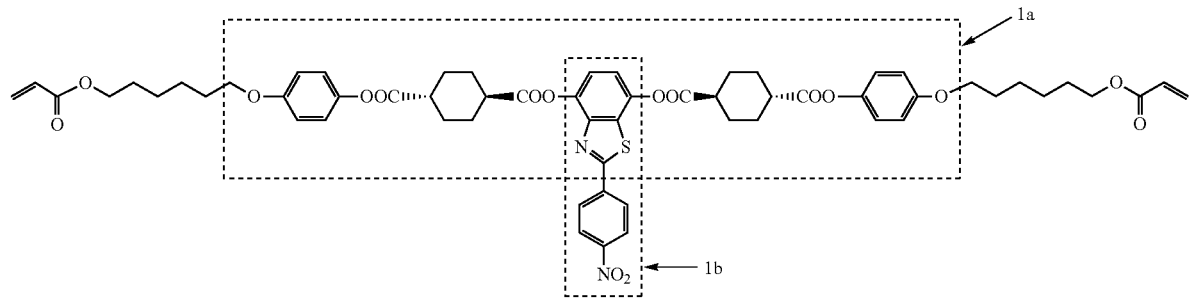

In the polymerizable liquid crystal compound with reverse wavelength dispersion, the refractive index in the direction of the long axis of the mesogen 1a is defined as n1, and the refractive index in the direction of the long axis of the mesogen 1b is defined as n2. The absolute value of the refractive index n1 and its wavelength dispersion are derived from the molecular structure of the mesogen 1a. The absolute value of the refractive index n2 and its wavelength dispersion are derived from the molecular structure of the mesogen 1b. In the liquid crystal phase, the polymerizable liquid crystal compound with reverse wavelength dispersion rotates about the long axis direction of the mesogen 1a as the rotation axis. Therefore, the aforementioned refractive indices n1 and n2 are the refractive indices as the body of revolution.

Figure 1:
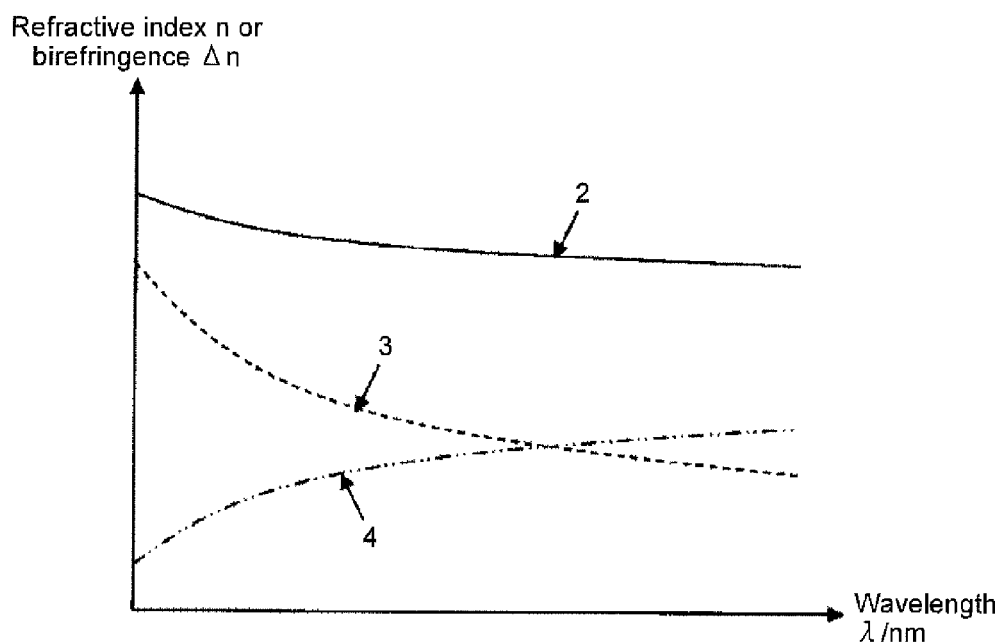
FIG. 1 is a graph for illustrating examples of the refractive index in its slow axis direction and refractive index in its fast axis direction of a polymerizable liquid crystal compound with reverse wavelength dispersion, and wavelength dispersion of its birefringence $\Delta n$.

The absolute value of the refractive index n1 is larger than the absolute value of the refractive index n2 because of the molecular structures of the mesogens 1a and 1b. In addition, the wavelength dispersion of each of the refractive indices n1 and n2 is forward wavelength dispersion, and the refractive index n1 has a smaller refractive index wavelength dispersion n(450)/n(550) than the refractive index n2. The phrase "a refractive index exhibits forward wavelength dispersion" means that the absolute value of the refractive index decreases as the wavelength λ increases. This behavior is illustrated in FIG. 1. The following drawings are schematic drawings. An actual drawing may be generated by curing a uniformly oriented liquid crystal compound to form a film and then measuring the wavelength dispersion property of the film. The phrase "uniformly oriented" means that the liquid crystal compound is oriented such that the angles of the optical axes of the mesogens 1a and 1b are constant.

As a result, as shown in the results in FIG. 1, the wavelength dispersion property of the birefringence Δn of the polymerizable liquid crystal compound with reverse wavelength dispersion (line 4 in the graph), which is the difference between the refractive index n1 (line 2 in the graph) and the refractive index n2 (line 3 in the graph), exhibits reverse wavelength dispersion property. The phrase "birefringence exhibits reverse wavelength dispersion property" means that the birefringence increases as the wavelength λ increases.

In this manner, the magnitude of the wavelength dispersion of the birefringence Δn largely depends on the molecular structures of the mesogens 1a and 1b. Therefore, to change the magnitude of the wavelength dispersion of the birefringence Δn, it has been necessary to change the structures of the mesogen skeletons, which is associated with considerable difficulties.

Subsequently, the method for controlling wavelength dispersion in a liquid crystal composition in the present invention will be described.

First, a method for changing the wavelength dispersion of the birefringence Δn of the liquid crystal composition in the direction that causes the wavelength dispersion to decrease will be described with reference to FIGS. 2 and 3. The direction that causes the wavelength dispersion of the birefringence Δn to decrease is the direction that causes Δn(450)/Δn(550) to increase and Δn(650)/Δn(550) to decrease. Δn(450) represents the birefringence Δn of the liquid crystal composition at a wavelength of λ=450 nm. Δn(550) represents the birefringence Δn of the liquid crystal composition at a wavelength of λ=550 nm. Δn(650) represents the birefringence Δn of the liquid crystal composition at a wavelength of λ=650 nm.

Figure 2:
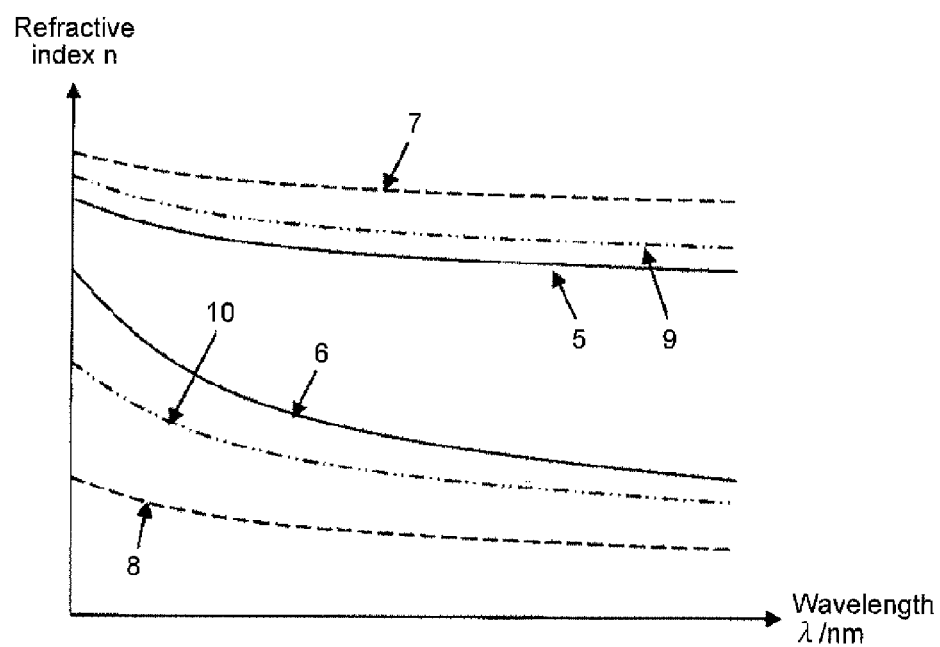
FIG. 2 is a graph for illustrating the refractive index wavelength dispersion in each of a polymerizable liquid crystal compound with reverse wavelength dispersion, an additive monomer, and a liquid crystal composition.
Figure 3:
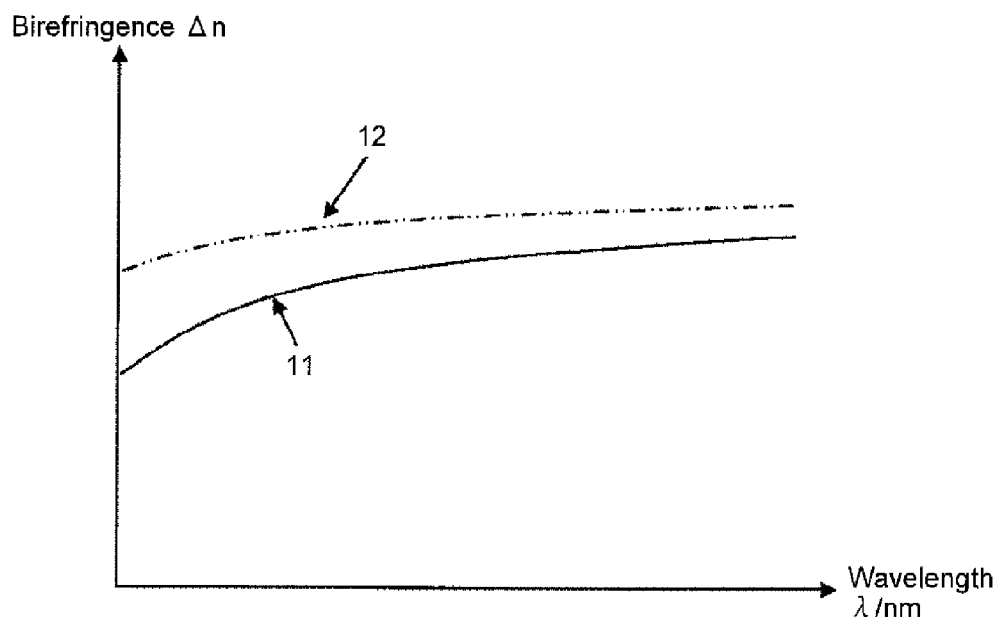
FIG. 3 is a graph for illustrating the wavelength dispersion of the birefringence $\Delta n$ of each of the polymerizable liquid crystal compound with reverse wavelength dispersion and the liquid crystal composition.

FIG. 2 is a graph showing changes in the wavelength dispersion of the refractive indices of a liquid crystal composition prepared by adding a polymerizable liquid crystal compound with forward wavelength dispersion used as an additive monomer to a polymerizable liquid crystal compound with reverse wavelength dispersion.

The refractive index of the polymerizable liquid crystal compound with reverse wavelength dispersion in the direction of its slow axis (line 5 in the graph) is denoted by ne. The slow axis direction of the polymerizable liquid crystal compound with reverse wavelength dispersion is the direction with large absolute value of the refractive index, i.e., the direction of the long axis of the mesogen 1a in the polymerizable liquid crystal compound with reverse wavelength dispersion.

The refractive index of the polymerizable liquid crystal compound with reverse wavelength dispersion in the direction of its fast axis (line 6 in the graph) is denoted by no. The fast axis direction of the polymerizable liquid crystal compound with reverse wavelength dispersion is a direction orthogonal to the slow axis direction, i.e., the direction of the long axis of the mesogen 1b in the polymerizable liquid crystal compound with reverse wavelength dispersion.

The refractive index of the polymerizable liquid crystal compound with forward wavelength dispersion in the direction of its slow axis (line 7 in the graph) is denoted by ne1'.

The refractive index of the polymerizable liquid crystal compound with forward wavelength dispersion in the direction of its fast axis (line 8 in the graph) is denoted by no1'.

In this case, ne, no, ne1', and no1' are in the relationship of the following (Expression 4) within the wavelength range of λ=380 to 780 nm.

$$ne < ne1' \text{ and } no > no1' \qquad \text{(Expression 4)}$$

When the polymerizable liquid crystal compound with reverse wavelength dispersion and the polymerizable liquid crystal compound with forward wavelength dispersion added are compatible with each other, they are uniformly oriented with the directions of their slow axes parallel to each other. As a result, immediately after they are oriented or in the state in which they are cured, the refractive index ne1" of the liquid crystal composition in the slow axis direction and its refractive index no1" in the fast axis direction satisfy the following (Expression 5) and (Expression 6).

$$ne1''=ne*a/(a+b)+ne1'*b/(a+b) \quad \text{(Expression 5)}$$

$$no1''=no*a/(a+b)+no1'*b/(a+b) \quad \text{(Expression 6)}$$

Herein "a" is the number of parts of the polymerizable liquid crystal compound with reverse wavelength dispersion, and "b" is the number of parts of the polymerizable liquid crystal compound with forward wavelength dispersion. The number of parts represents the amount by mole.

By adding the polymerizable liquid crystal compound with forward wavelength dispersion having the refractive indices represented by (Expression 4) in this manner, the refractive indices of the polymerizable liquid crystal compound with reverse wavelength dispersion in the slow and fast axis directions change as represented by (Expression 5) and (Expression 6). As a result, the birefringence $\Delta n1''$ of the liquid crystal composition becomes larger than that of the polymerizable liquid crystal compound with reverse wavelength dispersion alone. The wavelength dispersion of the birefringence $\Delta n1''$ thereby becomes smaller than that of the birefringence $\Delta n$ (FIG. 3), and the following (Expression 7) is satisfied.

$$\Delta n(450)/\Delta n(550) < \Delta n1''(450)/\Delta n1''(550) \text{ and}$$

$$\Delta n(650)/\Delta n(550) > \Delta n1''(650)/\Delta n1''(550) \quad \text{(Expression 7)}$$

Herein $\Delta n1''(450)$ represents the birefringence $\Delta n1''$ of the liquid crystal composition at a wavelength of $\lambda=450$ nm. $\Delta n1''(550)$ represents the birefringence $\Delta n1''$ of the liquid crystal composition at a wavelength of $\lambda=550$ nm. $\Delta n1''(650)$ represents the birefringence $\Delta n1''$ of the liquid crystal composition at a wavelength of $\lambda=650$ nm.

Subsequently, a method for changing the wavelength dispersion of the birefringence $\Delta n$ of a liquid crystal composition in the direction that causes the wavelength dispersion to increase will be described with reference to FIGS. 4 and 5. The direction that causes the wavelength dispersion of the birefringence $\Delta n$ to increase is the direction that causes $\Delta n(450)/\Delta n(550)$ to decrease and $\Delta n(650)/\Delta n(550)$ to increase.

Figure 4:
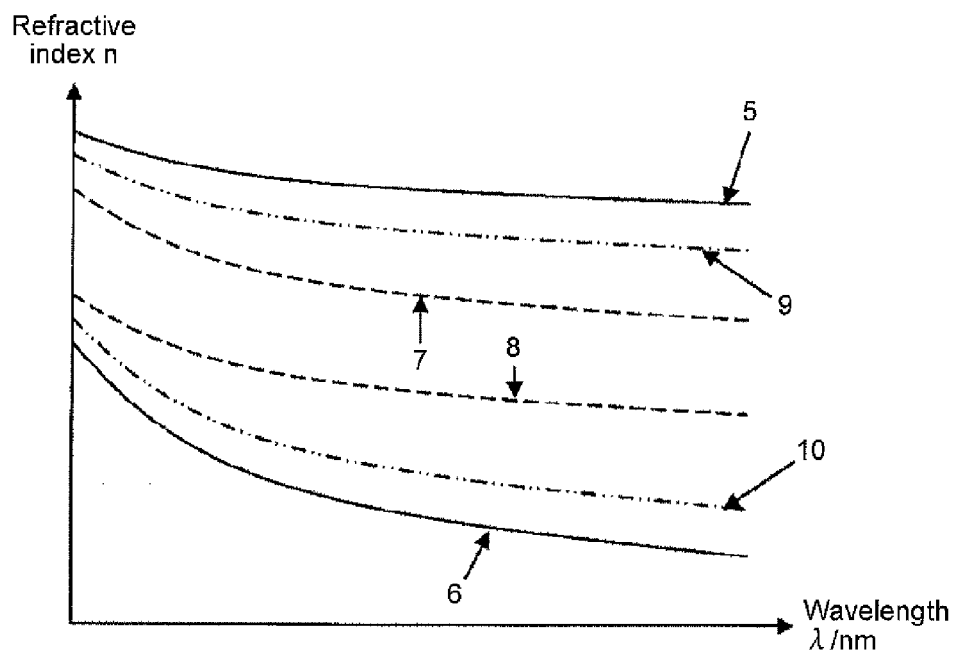
FIG. 4 is a graph for illustrating the refractive index wavelength dispersion in each of a polymerizable liquid crystal compound with reverse wavelength dispersion, an additive monomer, and a liquid crystal composition.
Figure 5:
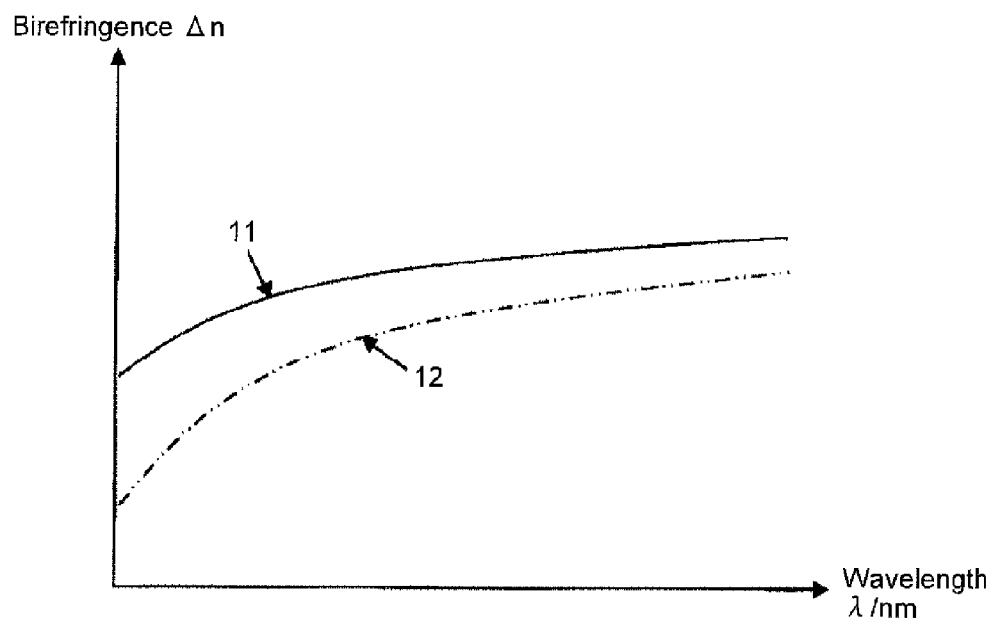
FIG. 5 is a graph for illustrating the wavelength dispersion of the birefringence $\Delta n$ of each of the polymerizable liquid crystal compound with reverse wavelength dispersion and the liquid crystal composition.

FIG. 4 is a graph showing changes in the wavelength dispersion of the refractive indices of a liquid crystal composition prepared by adding a polymerizable liquid crystal compound with forward wavelength dispersion used as an additive monomer to a polymerizable liquid crystal with reverse wavelength dispersion.

The refractive index of the polymerizable liquid crystal compound with reverse wavelength dispersion in the direction of its slow axis (line 5 in the graph) is denoted by ne.

The refractive index of the polymerizable liquid crystal compound with reverse wavelength dispersion in the direction of its fast axis (line 6 in the graph) is denoted by no.

The refractive index of the polymerizable liquid crystal compound with forward wavelength dispersion in the direction of its slow axis (line 7 in the graph) is denoted by ne2'.

The refractive index of the polymerizable liquid crystal compound with forward wavelength dispersion in the direction of its fast axis (line 8 in the graph) is denoted by no2'.

In this case, ne, no, ne2', and no2' are in the relationship of the following (Expression 8) within the wavelength range of $\lambda=380$ to 780 nm.

$$ne > ne2' \text{ and } no < no2' \quad \text{(Expression 8)}$$

When the polymerizable liquid crystal compound with reverse wavelength dispersion and the polymerizable liquid crystal compound with forward wavelength dispersion added are compatible with each other, they are uniformly oriented with the directions of their slow axes parallel to each other. As a result, the refractive index ne2" of the liquid crystal composition in the slow axis direction and its refractive index no2" in the fast axis direction satisfy the following (Expression 9) and (Expression 10).

$$ne2''=ne*a/(a+b)+ne2'*b/(a+b) \quad \text{(Expression 9)}$$

$$no2''=no*a/(a+b)+no2'*b/(a+b) \quad \text{(Expression 10)}$$

Herein "a" is the number of parts of the polymerizable liquid crystal compound with reverse wavelength dispersion, and "b" is the number of parts of the polymerizable liquid crystal compound with forward wavelength dispersion. The number of parts represents the amount by mole.

By adding the polymerizable liquid crystal compound with forward wavelength dispersion having the refractive indices represented by (Expression 8) in this manner, the refractive indices of the polymerizable liquid crystal compound with reverse wavelength dispersion in the slow and fast axis directions change as represented by (Expression 9) and (Expression 10). As a result, the birefringence $\Delta n2''$ of the liquid crystal composition becomes smaller than that of the polymerizable liquid crystal with reverse wavelength dispersion alone. The wavelength dispersion of the birefringence $\Delta n2''$ thereby becomes larger than that of the birefringence $\Delta n$ (FIG. 6), and the following (Expression 11) is satisfied.

$$\Delta n(450)/\Delta n(550) > \Delta n2''(450)/\Delta n2''(550) \text{ and}$$

$$\Delta n(650)/\Delta n(550) < \Delta n2''(650)/\Delta n2''(550) \quad \text{(Expression 11)}$$

Herein $\Delta n2''(450)$ represents the birefringence $\Delta n2''$ of the liquid crystal composition at a wavelength of $\lambda=450$ nm. $\Delta n2''(550)$ represents the birefringence $\Delta n2''$ of the liquid crystal composition at a wavelength of $\lambda=550$ nm. $\Delta n2''(650)$ represents the birefringence $\Delta n2''$ of the liquid crystal composition at a wavelength of $\lambda=650$ nm.

When the wavelength dispersion of the birefringence $\Delta n$ of the liquid crystal composition is changed in the direction that causes the wavelength dispersion to increase, a resin monomer that is not a liquid crystal compound (that has no refractive index anisotropy) may be added as an additive monomer within the range in which the liquid crystallinity of the polymerizable liquid crystal with reverse wavelength dispersion is not impaired. In contrast to liquid crystal compounds, the aforementioned resin monomer has no refractive index anisotropy. Therefore, even when the resin monomer is added to the liquid crystal composition containing the polymerizable liquid crystal compound with reverse wavelength dispersion, the refractive index n' of the resin monomer is the same in all directions. Therefore, a resin monomer having a refractive index shown in the following (Expression 12) may be selected.

$$ne > n' > no \quad \text{(Expression 12)}$$

Subsequently, a method for controlling the wavelength dispersion of the birefringence Δn of a liquid crystal composition containing a polymerizable liquid crystal compound with reverse wavelength dispersion will be described. As described above, the addition of an additive monomer having refractive indices that satisfy (Expression 4) causes a reduction in the wavelength dispersion of the birefringence Δn of the liquid crystal composition containing the polymerizable liquid crystal with reverse wavelength dispersion. The addition of an additive monomer having refractive indices that satisfy (Expression 8) or a refractive index that satisfies (Expression 12) causes an increase in the wavelength dispersion of the birefringence Δn of the liquid crystal composition containing the polymerizable liquid crystal compound with reverse wavelength dispersion. For controlling the magnitude of the change in the wavelength dispersion of the birefringence Δn, the adding amount of the additive monomer is controlled.

For example, for slightly reducing the wavelength dispersion of the birefringence Δn of a liquid crystal composition containing a polymerizable liquid crystal with reverse wavelength dispersion, a small amount of an additive monomer having refractive indices that satisfy (Expression 4) may be added. For further reducing the wavelength dispersion of the birefringence Δn of the liquid crystal composition containing the polymerizable liquid crystal with reverse wavelength dispersion, the additive monomer having refractive indices that satisfy (Expression 4) may be further added.

For slightly increasing the wavelength dispersion of the birefringence Δn of a liquid crystal composition containing a polymerizable liquid crystal with reverse wavelength dispersion, a small amount of an additive monomer having refractive indices that satisfy (Expression 8) or a refractive index that satisfies (Expression 12) may be added. For further increasing the wavelength dispersion of the birefringence Δn of the liquid crystal composition containing the polymerizable liquid crystal with reverse wavelength dispersion, the additive monomer having refractive indices that satisfy (Expression 8) or a refractive index that satisfies (Expression 12) may be further added.

In the foregoing description, only one type of additive monomer is added. However, a plurality of types of additive monomers that satisfy (Expression 4) may be added, or a plurality of types of additive monomers that satisfy (Expression 8) or (Expression 12) may be added. Further, both an additive monomer that satisfies (Expression 4) and an additive monomer that satisfies (Expression 8) or (Expression 12) may also be added. In the liquid crystal composition containing additive monomers as described above, by controlling the adding amount of the additive monomer that satisfies (Expression 4) and the adding amount of the additive monomer that satisfies (Expression 8) or (Expression 12), the wavelength dispersion of the birefringence Δn can be controlled more finely.

(Polymerizable Liquid Crystal Compound with Reverse Wavelength Dispersion)

In the present invention, the polymerizable liquid crystal compound with reverse wavelength dispersion is a polymerizable liquid crystal compound that forms a liquid crystal phase after prepared as a liquid crystal composition and uniformly oriented and is capable of being polymerized to form a polymer while such a uniform orientation of the molecules in the liquid crystal phase is maintained, and the obtained polymer exhibits reverse wavelength dispersion.

In the present invention, the polymerizable liquid crystal compound with reverse wavelength dispersion has a main chain mesogen and a side chain mesogen bonded to the main chain mesogen in the molecule. In a state where the polymerizable liquid crystal compound with reverse wavelength dispersion is uniformly oriented, the side chain mesogen may be oriented in a direction different from that of the main chain mesogen. Therefore, the optical axis of the main chain mesogen and the optical axis of the side chain mesogen may be oriented in different directions in the optically anisotropic layer. As a result of such orientation, the birefringence Δn of the optically anisotropic layer exhibits reverse wavelength dispersion property. Herein $\Delta n_L{'}$ represents the birefringence of the optically anisotropic layer obtained by curing the liquid crystal composition of the present invention.

Examples of the polymerizable liquid crystal compound with reverse wavelength dispersion may include a compound represented by the following formula (I) (this compound may be referred to hereinbelow as "compound (I)").

[Chemical Formula 2]

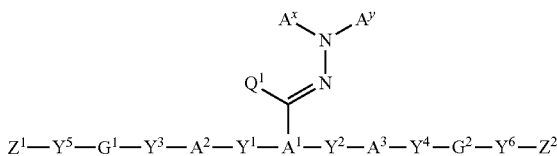

(I)

When the polymerizable liquid crystal compound with reverse wavelength dispersion is the compound (I), a —$Y^3$-$A^2$-$Y^1$-$A^1$-$Y^2$-$A^3$-$Y^4$— group acts as the main chain mesogen, and a >$A^1$—C($Q^1$)=NN($A^x$)$A^y$ group acts as the side chain mesogen. The $A^1$ group affects natures of both the main chain mesogen and the side chain mesogen.

In the formula, $Y^1$ to $Y^6$ are each independently a chemical single bond, —O—, —S—, —O—C(=O)—, —C(=O)—O—, —O—C(=O)—O—, —$NR^1$—C(=O)—, —C(=O)—$NR^1$—, —O—C(=O)—$NR^1$—, —$NR^1$—C(=O)—O—, —$NR^1$—C(=O)—$NR^1$—, —O—$NR^1$—, or —$NR^1$—O—.

Herein $R^1$ is a hydrogen atom or an alkyl group having 1 to 6 carbon atoms.

Examples of the alkyl group having 1 to 6 carbon atoms of $R^1$ may include a methyl group, an ethyl group, a n-propyl group, an isopropyl group, a n-butyl group, a sec-butyl group, a tert-butyl group, a n-pentyl group, and a n-hexyl group.

Herein $R^1$ is preferably a hydrogen atom or an alkyl group having 1 to 4 carbon atoms.

Among these, it is preferable that $Y^1$ to $Y^6$ are each independently a chemical single bond, —O—, —O—C(=O)—, —C(=O)—O—, or —O—C(=O)—O—.

$G^1$ and $G^2$ are each independently a divalent aliphatic group having 1 to 20 carbon atoms and optionally having a substituent.

Examples of the divalent aliphatic group having 1 to 20 carbon atoms may include an aliphatic group having a linear structure; and an aliphatic group having an alicyclic structure such as a saturated cyclic hydrocarbon (cycloalkane) structure and an unsaturated cyclic hydrocarbon (cycloalkene) structure.

Examples of the substituent may include a halogen atom such as a fluorine atom, a chlorine atom, a bromine atom, and an iodine atom; and an alkoxy group having 1 to 6 carbon atoms such as a methoxy group, an ethoxy group, a n-propoxy group, an isopropoxy group, a n-butoxy group, a sec-butoxy group, a tert-butoxy group, a n-pentyloxy group, and a n-hexyloxy group. A fluorine atom, a methoxy group, and an ethoxy group are preferable.

The aliphatic group may have —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted thereinto (provided that a case where two or more —O— groups or —S— groups are adjacently inserted is excluded).

Among these, —O—, —O—C(=O)—, —C(=O)—O—, and —O—C(=O)—O— are preferable.

Herein R$^2$ is a hydrogen atom or an alkyl group having 1 to 6 carbon atoms, like the aforementioned R$^1$. A hydrogen atom and a methyl group are preferable.

Specific examples of the aliphatic group having groups inserted thereinto may include —CH$_2$—CH$_2$—O—CH$_2$—CH$_2$—, —CH$_2$—CH$_2$—S—CH$_2$—CH$_2$—, —CH$_2$—CH$_2$—O—C(=O)—CH$_2$—CH$_2$—, —CH$_2$—CH$_2$—C(=O)—O—CH$_2$—CH$_2$—, —CH$_2$—CH$_2$—C(=O)—O—CH$_2$—, —CH$_2$—O—C(=O)—O—CH$_2$—CH$_2$—, —CH$_2$—CH$_2$—NR$^2$—C(=O)—CH$_2$—CH$_2$—, —CH$_2$—CH$_2$—C(=O)—NR$^2$—CH$_2$—, —CH$_2$—NR$^2$—CH$_2$—CH$_2$—, and —CH$_2$—C(=O)—CH$_2$—.

Among these, from the viewpoint of favorably expressing the desired effect of the present invention, it is preferable that G$^1$ and G$^2$ are each independently an aliphatic group having a linear structure such as an alkylene group having 1 to 20 carbon atoms and an alkenylene group having 2 to 20 carbon atoms. They each are more preferably an alkylene group having 1 to 12 carbon atoms such as a methylene group, an ethylene group, a trimethylene group, a propylene group, a tetramethylene group, a pentamethylene group, a hexamethylene group, and an octamethylene group, and particularly preferably a tetramethylene group [—(CH$_2$)$_4$—] and a hexamethylene group [—(CH$_2$)$_6$—].

Z$^1$ and Z$^2$ are each independently an alkenyl group having 2 to 10 carbon atoms that may be substituted by a halogen atom.

It is preferable that the number of carbon atoms in the alkenyl group is 2 to 6. Examples of the halogen atom that is a substituent on the alkenyl group of Z$^1$ and Z$^2$ may include a fluorine atom, a chlorine atom, and a bromine atom. A chlorine atom is preferable.

Specific examples of the alkenyl group having 2 to 10 carbon atoms of Z$^1$ and Z$^2$ may include CH$_2$=CH—, CH$_2$=C(CH$_3$)—, CH$_2$=CH—CH$_2$—, CH$_3$—CH=CH—, CH$_2$=CH—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$—CH$_2$—, CH$_2$=C(Cl)—, CH$_2$=C(CH$_3$)—CH$_2$—, and CH$_3$—CH=CH—CH$_2$—.

Among these, from the viewpoint of favorably expressing the desired effect of the present invention, it is preferable that Z$^1$ and Z$^2$ are each independently —CH$_2$=CH—, CH$_2$=C(CH$_3$)—, CH$_2$=C(Cl)—, CH$_2$=CH—CH$_2$—, CH$_2$=C(CH$_3$)—CH$_2$—, or CH$_2$=C(CH$_3$)—CH$_2$—CH$_2$—. They each are more preferably CH$_2$=CH—, CH$_2$=C(CH$_3$)—, or CH$_2$=C(Cl)—, and further more preferably —CH$_2$=CH—.

A$^x$ is an organic group of 2 to 30 carbon atoms having at least one aromatic ring selected from the group consisting of an aromatic hydrocarbon ring and an aromatic heterocyclic ring.

In the present invention, "aromatic ring" means a cyclic structure having aromaticity in the broad sense based on Huckel rule, and a cyclic structure that exhibits aromaticity by the involvement of a lone electron pair of heteroatom such as sulfur, oxygen, and nitrogen in a π electron system.

Herein the cyclic structure having aromaticity in the broad sense based on Huckel rule means a cyclic conjugated structure having (4n+2) π electrons. Further, examples of the compound having a cyclic structure that exhibits aromaticity by the involvement of a lone electron pair of heteroatom in a π electron system may include thiophene, furan, and benzothiazole.

The organic group of 2 to 30 carbon atoms having at least one aromatic ring selected from the group consisting of an aromatic hydrocarbon ring and an aromatic heterocyclic ring, of A$^x$, may have a plurality of aromatic rings, and may have an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a condensed aromatic heterocyclic ring such as a benzothiazole ring, a benzoxazole ring, a quinoline ring, a phthalazine ring, a benzimidazole ring, a benzopyrazole ring, a benzofuran ring, and a benzothiophene ring.

The aromatic ring of A$^x$ may have a substituent. Examples of the substituent may include a halogen atom such as a fluorine atom and a chlorine atom; a cyano group; an alkyl group having 1 to 6 carbon atoms such as a methyl group, an ethyl group, and a propyl group; an alkenyl group having 2 to 6 carbon atoms such as a vinyl group and an allyl group; a halogenated alkyl group having 1 to 6 carbon atoms such as a trifluoromethyl group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; —C(=O)—R$^4$; —C(=O)—OR$^4$; and —SO$_2$R$^4$. Herein R$^4$ is an alkyl group having 1 to 6 carbon atoms or an aryl group having 6 to 14 carbon atoms.

The aromatic ring of A$^x$ may have a plurality of substituents that are the same or different, and two adjacent substituents may be bonded together to form a ring. The formed ring may be a monocyclic ring or a condensed polycyclic ring.

The "number of carbon atoms" in the organic group having 2 to 30 carbon atoms of A$^x$ means the total number of carbon atoms in the entire organic group, although carbon atoms in the substituents are excluded therefrom (the same applies to A$^y$ which will be described later).

Examples of the organic group of 2 to 30 carbon atoms having at least one aromatic ring selected from the group consisting of an aromatic hydrocarbon ring and an aromatic heterocyclic ring of A$^x$ may include an aromatic hydrocarbon ring group; an aromatic heterocyclic ring group; an alkyl group of 3 to 30 carbon atoms having at least one aromatic ring selected from the group consisting of an aromatic hydrocarbon ring group and an aromatic heterocyclic ring group; an alkenyl group of 4 to 30 carbon atoms having at least one aromatic ring selected from the group consisting of an aromatic hydrocarbon ring group and an aromatic heterocyclic ring group; and an alkynyl group of 4 to 30 carbon atoms having at least one aromatic ring selected from the group consisting of an aromatic hydrocarbon ring group and an aromatic heterocyclic ring group.

A$^y$ is a hydrogen atom, an alkyl group having 1 to 12 carbon atoms and optionally having a substituent, an alkenyl group having 2 to 12 carbon atoms and optionally having a substituent, a cycloalkyl group having 3 to 12 carbon atoms and optionally having a substituent, —C(=O)—R³, —SO₂—R⁶, or an organic group of 2 to 30 carbon atoms having at least one aromatic ring selected from the group consisting of an aromatic hydrocarbon ring and an aromatic heterocyclic ring.

Examples of an alkyl group having 1 to 12 carbon atoms in the alkyl group having 1 to 12 carbon atoms and optionally having a substituent of $A^y$ may include a methyl group, an ethyl group, a n-propyl group, an isopropyl group, a n-butyl group, a sec-butyl group, a tert-butyl group, a n-pentyl group, a n-hexyl group, a n-heptyl group, a n-octyl group, a n-nonyl group, and a n-decyl group.

Examples of a substituent in the alkyl group having 1 to 12 carbon atoms and optionally having a substituent of $A^y$ may include a halogen atom such as a fluorine atom and a chlorine atom; a cyano group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; a cycloalkyl group having 3 to 8 carbon atoms such as a cyclopropyl group, a cyclopentyl group, and a cyclohexyl group; —C(=O)—R⁴; —C(=O)—OR⁴; and —SO₂R⁴. Herein R⁴ has the same meanings as described above.

Examples of an alkenyl group having 2 to 12 carbon atoms in the alkenyl group having 2 to 12 carbon atoms and optionally having a substituent of $A^y$ may include a vinyl group, a propenyl group, an isopropenyl group, a butenyl group, and a pentenyl group.

Examples of a cycloalkyl group having 3 to 12 carbon atoms in the cycloalkyl group having 3 to 12 carbon atoms and optionally having a substituent of $A^y$ may include a cyclopropyl group, a cyclobutyl group, a cyclopentyl group, a cyclohexyl group, and a cyclooctyl group.

Examples of substituents in the alkenyl group having 2 to 12 carbon atoms and optionally having a substituent and the cycloalkyl group having 3 to 12 carbon atoms and optionally having a substituent of $A^y$ may include a halogen atom such as a fluorine atom and a chlorine atom; a cyano group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; a cycloalkyl group having 3 to 8 carbon atoms such as a cyclopropyl group, a cyclopentyl group, and a cyclohexyl group; —C(=O)—R⁴; —C(=O)—OR⁴; and —SO₂R⁴. Herein R⁴ has the same meanings as described above.

In the group represented by —C(=O)—R³ of $A^y$, R³ is an alkyl group having 1 to 12 carbon atoms and optionally having a substituent, an alkenyl group having 2 to 12 carbon atoms and optionally having a substituent, or a cycloalkyl group having 3 to 12 carbon atoms and optionally having a substituent. Specific examples thereof may include those exemplified as the examples of the alkyl group having 1 to 12 carbon atoms and optionally having a substituent, the alkenyl group having 2 to 12 carbon atoms and optionally having a substituent, and the cycloalkyl group having 3 to 12 carbon atoms and optionally having a substituent of the aforementioned $A^y$.

In the group represented by —SO₂—R⁶ of $A^y$, R⁶ is an alkyl group having 1 to 12 carbon atoms, an alkenyl group having 2 to 12 carbon atoms, a phenyl group, or a 4-methylphenyl group.

Specific examples of the alkyl group having 1 to 12 carbon atoms and the alkenyl group having 2 to 12 carbon atoms of R⁶ may include those exemplified as the examples of the alkyl group having 1 to 12 carbon atoms and the alkenyl group having 2 to 12 carbon atoms of the aforementioned $A^y$.

The aromatic ring of the aforementioned $A^x$ and $A^y$ may have a substituent. The aforementioned $A^x$ and $A^y$ may together form a ring.

Examples of the organic group of 2 to 30 carbon atoms having at least one aromatic ring selected from the group consisting of an aromatic hydrocarbon ring and an aromatic heterocyclic ring of $A^y$ may include those exemplified as the examples regarding the aforementioned $A^x$.

The aromatic ring of $A^y$ may have a substituent on any position. Examples of the substituent may include those exemplified as the examples of the substituent on the aromatic ring of the aforementioned $A^x$.

Specific examples of the aromatic ring of $A^x$ and $A^y$ are as follows. However, in the present invention, the aromatic ring of $A^x$ and $A^y$ is not limited to the following examples. In the following compounds, [—] represents an atomic bond of the aromatic ring (the same applies to the following).

[Chemical Formula 3]

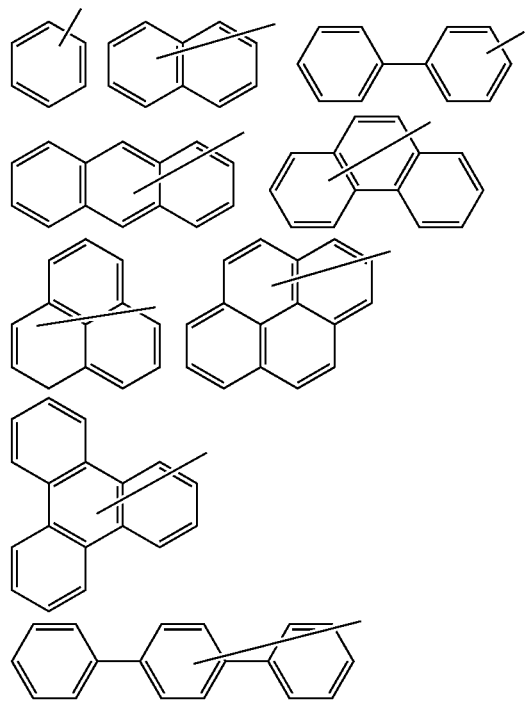

[Chemical Formula 4]

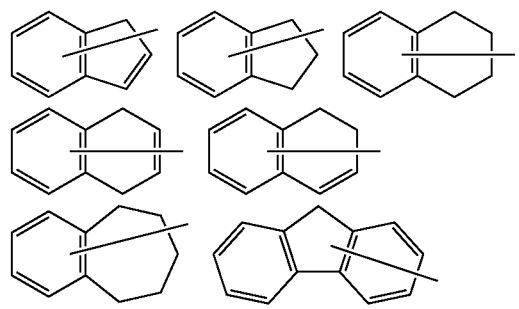

-continued

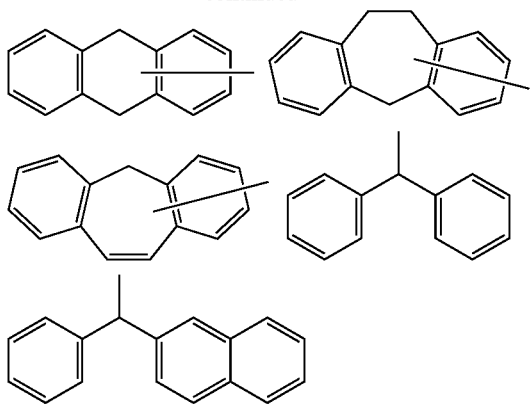

[Chemical Formula 5]

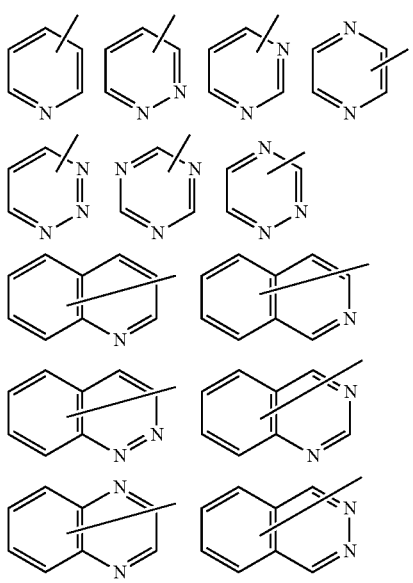

[Chemical Formula 6]

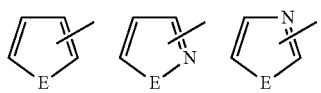

In the formulae, E is $NR^5$, an oxygen atom, or a sulfur atom. Herein $R^5$ is a hydrogen atom; or an alkyl group having 1 to 6 carbon atoms such as a methyl group and an ethyl group.

[Chemical Formula 7]

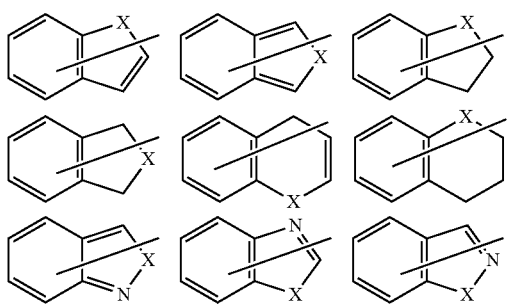

-continued

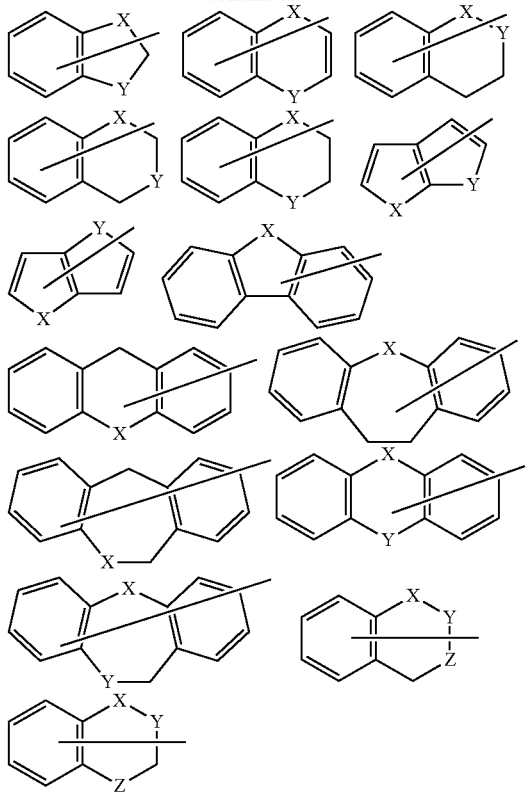

In the formulae, X, Y, and Z are each independently $NR^5$, an oxygen atom, a sulfur atom, —SO—, or —$SO_2$— (provided that a case where oxygen atoms, sulfur atoms, —SO— groups, or —$SO_2$— groups are adjacent is excluded). $R^5$ has the same meanings as described above.

Among the aforementioned aromatic rings, the aromatic ring of $A^x$ and $A^y$ is preferably as follows.

[Chemical Formula 8]

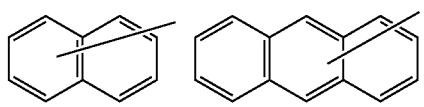

[Chemical Formula 9]

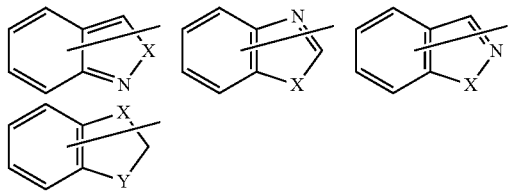

The aromatic ring of $A^x$ and $A^y$ is particularly preferably as follows.

[Chemical Formula 10]

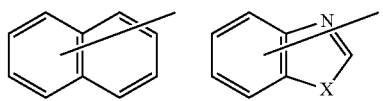

$A^x$ and $A^y$ may together form a ring. In particular, it is preferable that $A^x$ and $A^y$ form an unsaturated heterocyclic ring having 4 to 30 carbon atoms or an unsaturated carbon ring having 6 to 30 carbon atoms, wherein these rings may optionally have a substituent.

The unsaturated heterocyclic ring having 4 to 30 carbon atoms and the unsaturated carbon ring having 6 to 30 carbon atoms are not particularly restricted, and may or may not have aromaticity. Examples thereof may include rings shown in the following. The rings shown in the following are a moiety represented by:

[Chemical Formula 11]

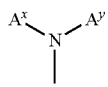

in the formula (I).

[Chemical Formula 12]

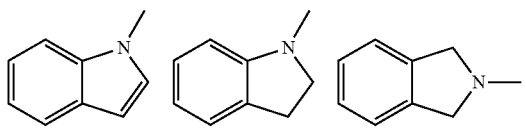

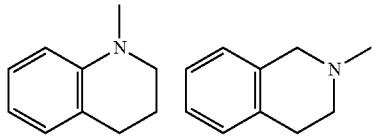

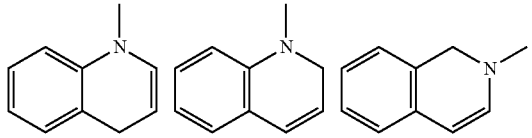

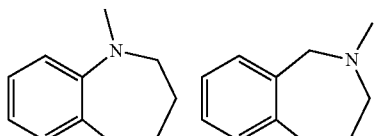

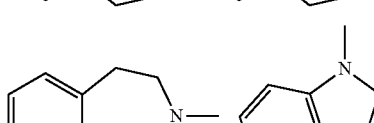

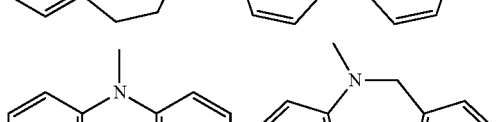

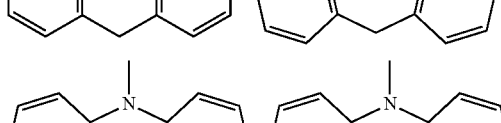

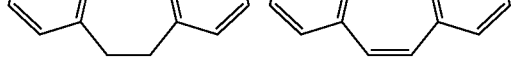

[Chemical Formula 13]

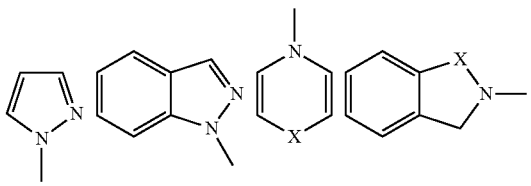

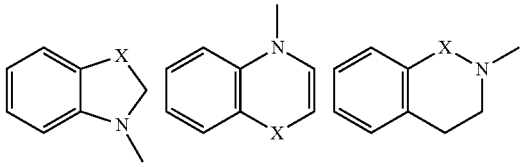

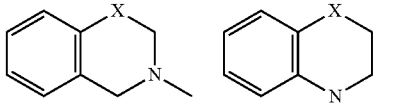

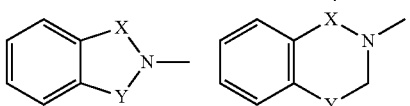

[Chemical Formula 14]

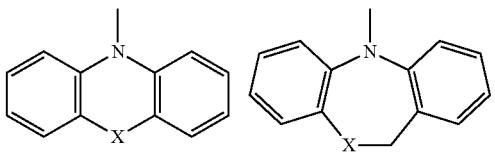

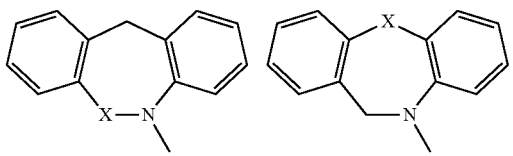

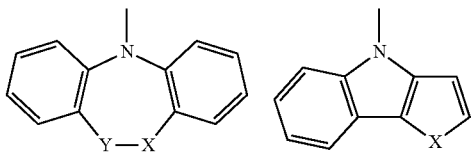

-continued

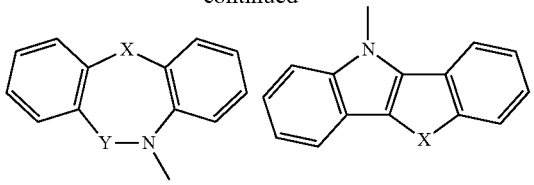

In the formulae, X, Y, and Z have the same meanings as described above.

The rings may have a substituent. Examples of the substituent may include a halogen atom, a cyano group, an alkyl group having 1 to 6 carbon atoms, an alkoxy group having 1 to 6 carbon atoms, a nitro group, —C(=O)—$R^4$, —C(=O)—$OR^4$, and —$SO_2R^4$. Herein $R^4$ has the same meanings as described above.

The total number of π electrons included in $A^x$ and $A^y$ is preferably 4 or more and 24 or less, and more preferably 6 or more and 18 or less from the viewpoint of favorably expressing the desired effect of the present invention.

Examples of preferred combination of $A^x$ and $A^y$ may include a combination of an aromatic group having 4 to 30 carbon atoms as $A^x$ and a hydrogen atom or an alkyl group optionally having a substituent as $A^y$, and a combination in which $A^x$ and $A^y$ together form an unsaturated heterocyclic ring or an unsaturated carbon ring. Preferred examples of a substituent in the alkyl group optionally having a substituent may include a cycloalkyl group, a cyano group, and a halogen atom such as a fluorine atom.

The combination is preferably a combination of the following structure as $A^x$ and a hydrogen atom or an alkyl group optionally having a substituent as $A^y$.

[Chemical Formula 15]

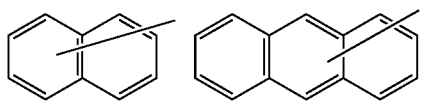

[Chemical Formula 16]

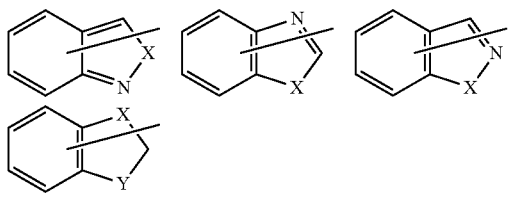

The combination is particularly preferably a combination of the following structure as $A^x$ and a hydrogen atom or an alkyl group optionally having a substituent as $A^y$. In the combination, a preferred substituent in the alkyl group optionally having a substituent is a cycloalkyl group, a cyano group, or a halogen atom such as a fluorine atom. In the formulae, X and Y have the same meanings as described above.

[Chemical Formula 17]

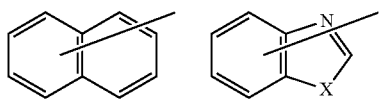

$A^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent carbocyclic aromatic group is preferable, and a trivalent benzene ring group and a trivalent naphthalene ring group represented by the following formulae are more preferable. In the following formulae, substituents $Y^1$ and $Y^2$ are shown for the sake of convenience to clearly show a bonding state ($Y^1$ and $Y^2$ have the same meanings as described above, and the same applies to the following).

[Chemical Formula 18]

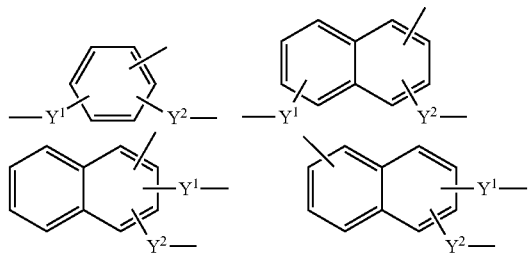

In particular, it is preferable that $A^1$ is a group represented by each of the formulae (A11) to (A22), and more preferably a group represented by the formula (A11).

[Chemical Formula 19]

(A11)

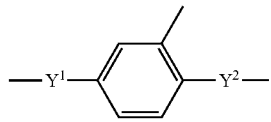

(A12)

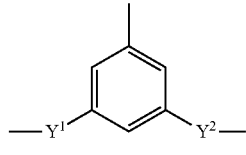

(A13)

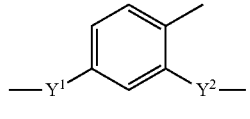

(A14)

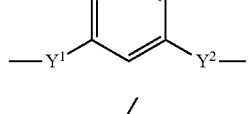

(A15)

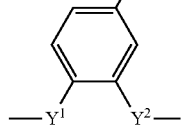

(A16)

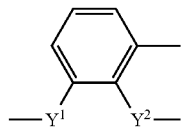

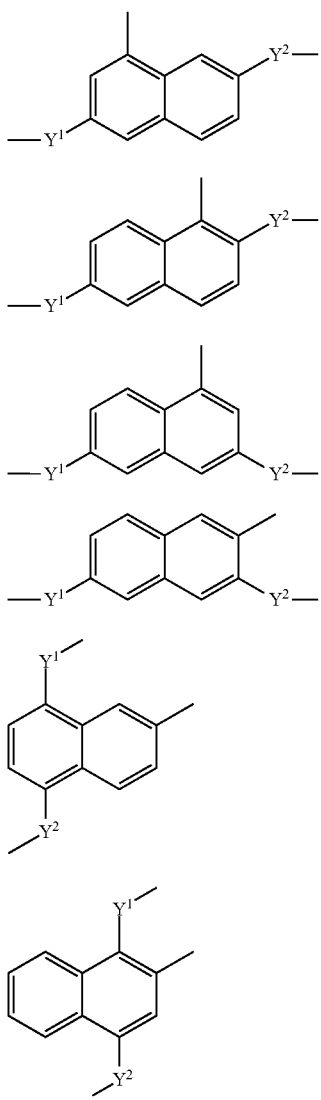

Examples of a substituent that may be included in the trivalent aromatic group of $A^1$ may include those exemplified as the examples of the substituent on the aromatic group of the aforementioned $A^x$. It is preferable that $A^1$ is a trivalent aromatic group having no substituent.

$A^2$ and $A^3$ are each independently a divalent aromatic group having 6 to 30 carbon atoms and optionally having a substituent.

The aromatic group of $A^2$ and $A^3$ may be monocyclic or polycyclic.

Specific examples of $A^2$ and $A^3$ may include the following groups.

[Chemical Formula 20]

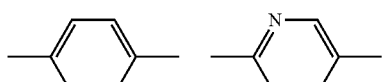

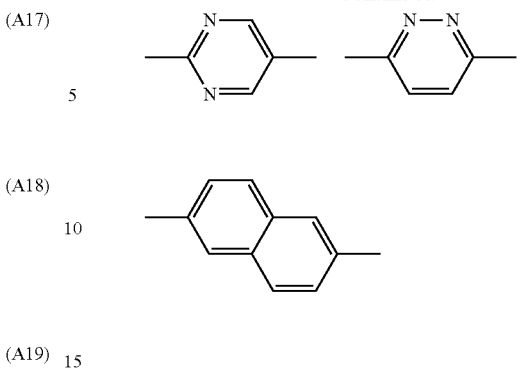

The organic groups enumerated as the specific examples of the aforementioned $A^2$ and $A^3$ may have a substituent on any position. Examples of the substituent may include a halogen atom, a cyano group, a hydroxyl group, an alkyl group having 1 to 6 carbon atoms, an alkoxy group having 1 to 6 carbon atoms, a nitro group, and a —C(=O)—OR group. Herein R is an alkyl group having 1 to 6 carbon atoms. Among these, a halogen atom, an alkyl group, and an alkoxy group are preferable. As the halogen atom, a fluorine atom is more preferable. As the alkyl, a methyl group, an ethyl group, and a propyl group are more preferable. As the alkoxy group, a methoxy group and an ethoxy group are more preferable.

Among these, it is preferable that $A^2$ and $A^3$ are each independently a group represented by the following formulae (A23) and (A24) that may optionally have a substituent from the viewpoint of favorably expressing the desired effect of the present invention, and the group represented by the formula (A23) and optionally having a substituent is more preferable.

[Chemical Formula 21]

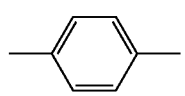

(A23)

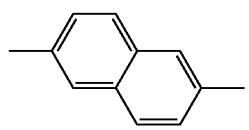

(A24)

$Q^1$ is a hydrogen atom or an alkyl group having 1 to 6 carbon atoms and optionally having a substituent.

Examples of the alkyl group having 1 to 6 carbon atoms and optionally having a substituent may include those exemplified as the examples regarding the aforementioned $A^x$.

Among these, $Q^1$ is preferably a hydrogen atom or an alkyl group having 1 to 6 carbon atoms, and more preferably a hydrogen atom or a methyl group.

Specific examples of the compound (I) may include compounds represented by the following formulae (I)-1 to (I)-3.

[Chemical Formula 22]

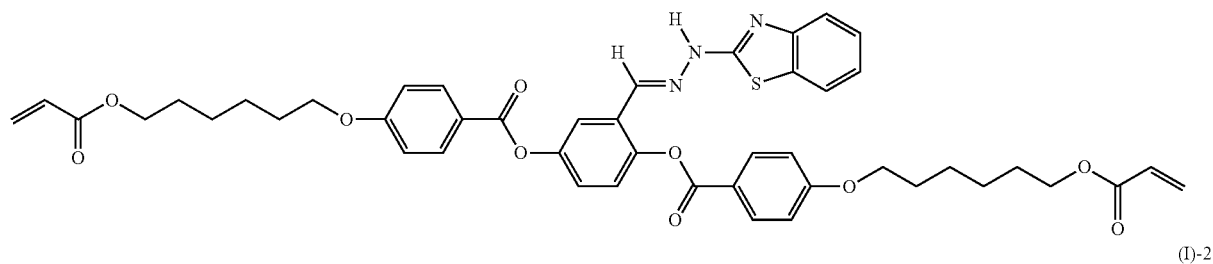

(I)-1

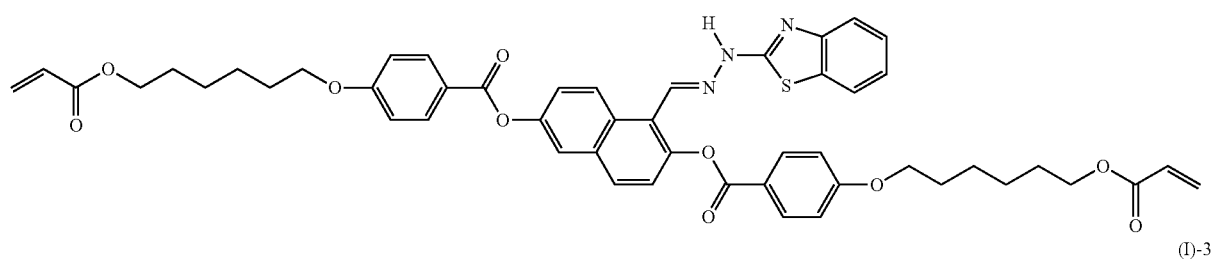

(I)-2

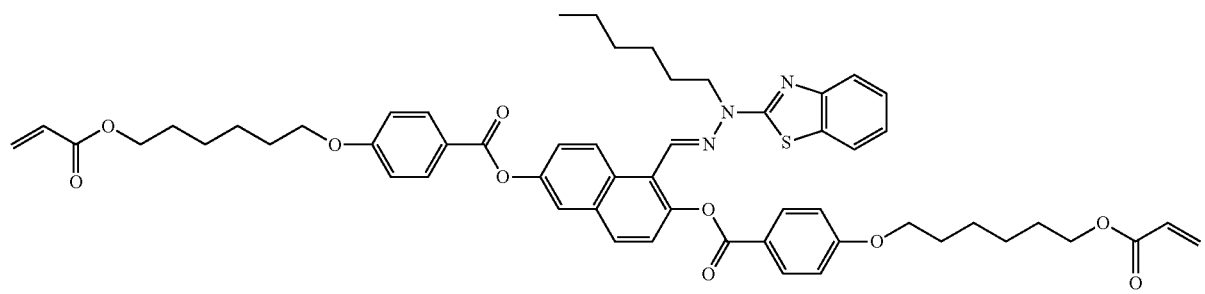

(I)-3

(Method for Producing Compound (I))

The compound (I) may be produced by, e.g., the following reaction.

[Chemical Formula 23]

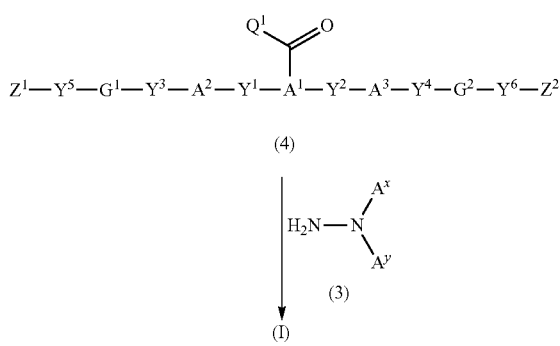

(wherein $Y^1$ to $Y^6$, $G^1$, $G^2$, $Z^1$, $Z^2$, $A^x$, $A^y$, $A^1$ to $A^3$, and $Q^1$ have the same meanings as described above.)

Specifically, a hydrazine compound represented by the formula (3) (hydrazine compound (3)) may be reacted with a carbonyl compound represented by the formula (4) (carbonyl compound (4)) at a molar ratio of [hydrazine compound (3):carbonyl compound (4)] of 1:2 to 2:1, and preferably 1:1.5 to 1.5:1 to highly selectively produce a target compound represented by the formula (I) in high yield.

In this case, an acid catalyst, such as an organic acid such as (±)-10-camphorsulfonic acid and p-toluenesulfonic acid; and an inorganic acid such as hydrochloric acid and sulfuric acid, may be added to perform the reaction. The addition of the acid catalyst may shorten the reaction time and may improve the yield. The amount of the acid catalyst to be added is usually 0.001 to 1 mol relative to 1 mol of the carbonyl compound (4). The acid catalyst may be added as it is, or as a solution form in which the acid catalyst is dissolved in an appropriate solution.

The solvent used in the reaction is not particularly limited so long as it is inert to the reaction. Examples of the solvent may include an alcohol solvent such as methyl alcohol, ethyl alcohol, n-propyl alcohol, isopropyl alcohol, n-butyl alcohol, isobutyl alcohol, sec-butyl alcohol, tert-butyl alcohol, n-pentyl alcohol, and amyl alcohol; an ether solvent such as diethyl ether, tetrahydrofuran, 1,2-dimethoxyethane, 1,4-dioxane, and cyclopentyl methyl ether; an ester solvent such as ethyl acetate, propyl acetate, and methyl propionate; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and triamide hexamethylphosphate; a sulfur-containing solvent such as dimethyl sulfoxide and sulfolane; and a mixed solvent of two or more types thereof.

Among these, the alcohol solvent, the ether solvent, and a mixed solvent of the alcohol solvent and the ether solvent are preferable.

The amount of the solvent to be used is not particularly limited, and may be appropriately determined in consideration of type of compound to be used and reaction scale. The amount is usually 1 to 100 g relative to 1 g of the hydrazine compound (3).

The reaction smoothly proceeds in a temperature range of −10° C. to the boiling point of the solvent to be used. The reaction time of each reaction may vary depending on the reaction scale, and is usually several minutes to several hours.

The hydrazine compound (3) may be produced as follows.

[Chemical Formula 24]

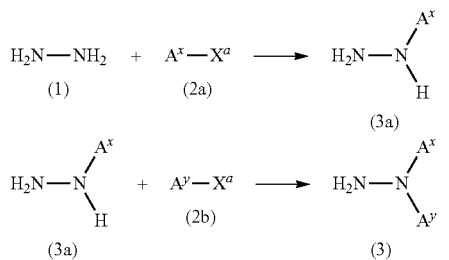

(wherein $A^x$ and $A^y$ have the same meanings as described above. $X^a$ is a leaving group such as a halogen atom, a methanesulfonyloxy group, and a p-toluenesulfonyloxy group.)

Specifically, a compound represented by the formula (2a) may be reacted with hydrazine (1) in an appropriate solvent at a molar ratio of (compound (2a):hydrazine (1)) of 1:1 to 1:20, and preferably 1:2 to 1:10, to obtain a corresponding hydrazine compound (3a). Further, the hydrazine compound (3a) may be reacted with a compound represented by the formula (2b) to obtain the hydrazine compound (3).

As hydrazine (1), hydrazine monohydrate is usually used. As hydrazine (1), a commercially available product may be used as it is.

The solvent used in the reaction is not particularly limited so long as it is inert to the reaction. Examples of the solvent may include an alcohol solvent such as methyl alcohol, ethyl alcohol, n-propyl alcohol, isopropyl alcohol, n-butyl alcohol, isobutyl alcohol, sec-butyl alcohol, tert-butyl alcohol, n-pentyl alcohol, and amyl alcohol; an ether solvent such as diethyl ether, tetrahydrofuran, 1,2-dimethoxyethane, 1,4-dioxane, and cyclopentyl methyl ether; an aromatic hydrocarbon-based solvent such as benzene, toluene, and xylene; an aliphatic hydrocarbon-based solvent such as n-pentane, n-hexane, and n-heptane; an amide-based solvent such as N,N-dimethylformamide, N-methylpyrrolidone, and triamide hexamethylphosphate; a sulfur-containing solvent such as dimethyl sulfoxide and sulfolane; and a mixed solvent of two or more types thereof.

Among these, the alcohol solvent, the ether solvent, and a mixed solvent of the alcohol solvent and the ether solvent are preferable.

The amount of the solvent to be used is not particularly limited, and may be appropriately determined in consideration of type of compound to be used and reaction scale. The amount is usually 1 to 100 g relative to 1 g of hydrazine.

The reaction smoothly proceeds in a temperature range of −10° C. to the boiling point of the solvent to be used. The reaction time of each reaction may vary depending on the reaction scale, and is usually several minutes to several hours.

The hydrazine compound (3) may also be produced by reducing a diazonium salt (5) through a publicly known method, as described in the following.

[Chemical Formula 25]

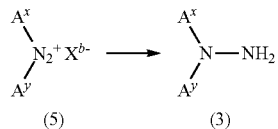

In the formula (5), $A^x$ and $A^y$ have the same meanings as described above. $X^{b-}$ is an anion that is a counter ion of diazonium. Examples of $X^{b-}$ may include an inorganic anion such as a hexafluorophosphate ion, a fluoroborate ion, a chloride ion, and a sulfate ion; and an organic anion such as a polyfluoroalkyl carboxylate ion, a polyfluoroalkyl sulfonate ion, a tetraphenyl borate ion, an aromatic carboxylate ion, and an aromatic sulfonate ion.

Examples of the reducing agent used in the reaction may include a metal salt reducing agent.

The metal salt reducing agent is generally a compound containing low-valent metal or a compound having a metal ion and a hydride source (see "Yuki Gosei Jikkenhou Handbook (Organic synthesis experimental method handbook)", 1990, edited by The Society of Synthetic Organic Chemistry, Japan, published by Maruzen Co., Ltd., p. 810).

Examples of the metal salt reducing agent may include $NaAlH_4$, $NaAlH_n(OR^7)_m$, $LiAlH_4$, $iBu_2AlH$, $LiBH_4$, $NaBH_4$, $SnCl_2$, $CrCl_2$, and $TiCl_3$. Herein m and n each independently represent an integer of 1 to 3, and m+n=4. $R^7$ represents an alkyl group having 1 to 6 carbon atoms. iBu represents an isobutyl group.

In the reduction reaction, a known reaction condition may be adopted. For example, the reaction may be carried out under a condition described in Publications such as Japanese Patent Application Laid-Open No. 2005-336103 A, "Shin Jikken Kagaku Koza (New course of experimental chemistry)", 1978, published by Maruzen Co., Ltd., vol. 14, and "Jikken Kagaku Koza (Course of experimental chemistry)", 1992, published by Maruzen Co., Ltd., vol. 20.

The diazonium salt (5) may be produced from a compound such as aniline by a conventional method.

The carbonyl compound (4) may be typically produced by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NHC(=O)—).

An ether linkage may be formed, e.g., as follows.

(i) A compound represented by the formula: D1-hal (hal represents a halogen atom, and the same applies to the following) and a compound represented by a formula: D2-OMet (Met represents an alkaline metal (mainly sodium), and the same applies to the following) are mixed and condensed (Williamson synthesis). In the formulae, D1 and D2 are optional organic groups (the same applies to the following).

(ii) A compound represented by the formula: D1-hal and a compound represented by the formula: D2-OH are mixed in the presence of a base such as sodium hydroxide or potassium hydroxide and condensed.

(iii) A compound represented by the formula: D1-J (J represents an epoxy group) and a compound represented by the formula: D2-OH are mixed in the presence of a base such as sodium hydroxide or potassium hydroxide and condensed.

(iv) A compound represented by the formula: D1-OFN (OFN represents a group having an unsaturated bond) and a compound represented by the formula: D2-OMet are mixed in the presence of a base such as sodium hydroxide or potassium hydroxide and subjected to an addition reaction.

(v) A compound represented by the formula: D1-hal and a compound represented by the formula: D2-OMet are mixed in the presence of copper or cuprous chloride and condensed (Ullmann condensation).

An ester linkage and an amide linkage may be formed, e.g., as follows.

(vi) A compound represented by the formula: D1-COOH and a compound represented by the formula: D2-OH or D2-NH$_2$ are subjected to dehydration condensation in the presence of a dehydration condensation agent (N,N-dicyclohexylcarbodiimide, etc.).

(vii) A compound represented by the formula: D1-COOH is reacted with a halogenating agent to obtain a compound represented by the formula: D1-CO-hal, and the compound is reacted with a compound represented by the formula: D2-OH or D2-NH$_2$ in the presence of a base.

(viii) A compound represented by the formula: D1-COOH is reacted with an acid anhydride to obtain a mixed acid anhydride, and the mixed acid anhydride is reacted with a compound represented by the formula: D2-OH or D2-NH$_2$.

(ix) A compound represented by the formula: D1-COOH and a compound represented by the formula: D2-OH or D2-NH$_2$ are subjected to dehydration condensation in the presence of an acid catalyst or a base catalyst.

More specifically, among the carbonyl compound (4), a compound (4') in which a group represented by the formula: $Z^2$-$Y^6$-$G^2$-$Y^4$-$A^3$-$Y^2$- in the formula (4) is the same as a group represented by the formula: $Z^1$-$Y^5$-$G^1$-$Y^3$-$A^2$-$Y^1$- , and $Y^1$ is a group represented by $Y^{11}$—C(=O)—O— may be produced by the following reaction.

[Chemical Formula 26]

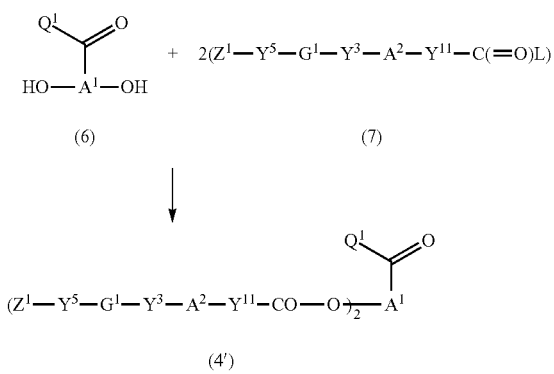

(wherein $Y^3$, $Y^5$, $G^1$, $Z^1$, $A^1$, $A^2$, and $Q^1$ have the same meanings as described above. $Y^{11}$ is a group having a structure such that $Y^{11}$—C(=O)—O— corresponds to $Y^1$. $Y^1$ has the same meanings as described above. L is a leaving group such as a hydroxyl group, a halogen atom, a methanesulfonyloxy group, or a p-toluenesulfonyloxy group.)

In the reaction, a dihydroxy compound represented by the formula (6) (compound (6)) may be reacted with a compound represented by the formula (7) (compound (7)) at a molar ratio of (compound (6):compound (7)) of 1:2 to 1:4, and preferably 1:2 to 1:3 to highly selectively produce the target compound (4') in high yield.

When the compound (7) is a compound in which L in the formula (7) is a hydroxyl group (carboxylic acid), the reaction may be carried out in the presence of a dehydration condensation agent such as 1-ethyl-3-(3-dimethylaminopropyl)carbodiimide hydrochloride or dicyclohexyl carbodiimide to obtain a target compound.

The amount of the dehydration condensation agent to be used is usually 1 to 3 mol relative to 1 mol of the compound (7).

When the compound (7) is a compound in which L in the formula (7) is a halogen atom (acid halide), the reaction may be carried out in the presence of a base to obtain the target compound.

Examples of the base for use may include an organic base such as triethylamine and pyridine; and an inorganic base such as sodium hydroxide, sodium carbonate, and sodium hydrogen carbonate.

The amount of the base to be used is usually 1 to 3 mol relative to 1 mol of the compound (7).

A case where the compound (7) is a compound in which L in the formula (7) is a methanesulfonyloxy group or a p-toluenesulfonyloxy group (mixed acid anhydride) is also the same as in the case in which L is a halogen atom.

Examples of the solvent used in the reaction may include a chlorinated solvent such as chloroform and methylene chloride; an amide-based solvent such as N-methylpyrrolidone, N,N-dimethylformamide, N,N-dimethylacetamide, and triamide hexamethylphosphate; an ether such as 1,4-dioxane, cyclopentyl methyl ether, tetrahydrofuran, tetrahydropyran, and 1,3-dioxolan; a sulfur-containing solvent such as dimethyl sulfoxide and sulfolane; an aromatic hydrocarbon-based solvent such as benzene, toluene, and xylene; an aliphatic hydrocarbon-based solvent such as n-pentane, n-hexane, and n-octane; an alicyclic hydrocarbon-based solvent such as cyclopentane and cyclohexane; and a mixed solvent of two or more types thereof.

The amount of the solvent to be used is not particularly limited, and may be appropriately determined in consideration of type of compound to be used and reaction scale. The amount is usually 1 to 50 g relative to 1 g of the dihydroxy compound (6).

Many of the compounds (7) are known compounds, and may be produced by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NHC(=O)—).

In any of the reactions, a usual post-treatment operation in organic synthesis chemistry is carried out after completion of the reactions, and if desired, a known separation or purification operation such as column chromatography, recrystallization, and distillation may be carried out to isolate the target compound.

The structure of the target compound may be identified by, e.g., measurements such as NMR spectrometry, IR spectrometry, and mass spectrometry, as well as elemental analysis.

Examples of the polymerizable liquid crystal compound with reverse wavelength dispersion may include a compound represented by the following formula (II) (this compound may be referred to hereinbelow as "compound (II)").

[Chemical Formula 27]

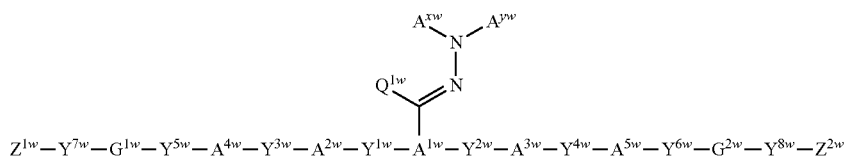

(II)

$Z^{1w}-Y^{7w}-G^{1w}-Y^{5w}-A^{4w}-Y^{3w}-A^{2w}-Y^{1w}-A^{1w}-Y^{2w}-A^{3w}-Y^{4w}-A^{5w}-Y^{6w}-G^{2w}-Y^{8w}-Z^{2w}$

In the formula, $Y^{1w}$ to $Y^{8w}$ are each independently a chemical single bond, —O—, —S—, —O—C(=O)—, —C(=O)—O—, —O—C(=O)—O—, —NR$^{1w}$—C(=O)—, —C(=O)—NR$^{1w}$—, —O—C(=O)—NR$^{1w}$—, —NR$^{1w}$—C(=O)—O—, —NR$^{1w}$—C(=O)—NR$^{1w}$—, —O—NR$^{1w}$—, or —NR$^{1w}$—O—.

Herein R$^{1w}$ is a hydrogen atom or an alkyl group having 1 to 6 carbon atoms.

Examples of the alkyl group having 1 to 6 carbon atoms of R$^{1w}$ may include a methyl group, an ethyl group, a n-propyl group, an isopropyl group, a n-butyl group, a sec-butyl group, a tert-butyl group, a n-pentyl group, and a n-hexyl group.

Herein R$^{1w}$ is preferably a hydrogen atom or an alkyl group having 1 to 4 carbon atoms.

In the polymerizable compound of the present invention, it is preferable that $Y^{1w}$ to $Y^{8w}$ are each independently a chemical single bond, —O—, —O—C(=O)—, —C(=O)—O—, or —O—C(=O)—O—.

$G^{1w}$ and $G^{2w}$ are each independently a divalent aliphatic group having 1 to 20 carbon atoms and optionally having a substituent.

Examples of the divalent aliphatic group having 1 to 20 carbon atoms may include a divalent aliphatic group having a linear structure such as an alkylene group having 1 to 20 carbon atoms and an alkenylene group having 2 to 20 carbon atoms; and a divalent aliphatic group such as a cycloalkanediyl group having 3 to 20 carbon atoms, a cycloalkanediyl group having 4 to 20 carbon atoms, and a divalent alicyclic condensed ring group having 10 to 30 carbon atoms.

Examples of the substituent on the divalent aliphatic group of $G^{1w}$ and $G^{2w}$ may include a halogen atom such as a fluorine atom, a chlorine atom, a bromine atom, and an iodine atom; and an alkoxy group having 1 to 6 carbon atoms such as a methoxy group, an ethoxy group, a n-propoxy group, an isopropoxy group, a n-butoxy group, a sec-butoxy group, a tert-butoxy group, a n-pentyloxy group, and a n-hexyloxy group. Among these, a fluorine atom, a methoxy group, and an ethoxy group are preferable.

The aliphatic group may have —O—, —S—, —O—C(=O)—, —C(=O)—O—, —O—C(=O)—O—, —NR$^{2w}$—C(=O)—, —C(=O)—NR$^{2w}$—, or —C(=O)— inserted thereinto, provided that a case where two or more —O— groups or —S— groups are adjacently inserted is excluded. Herein R$^{2w}$ is a hydrogen atom or an alkyl group having 1 to 6 carbon atoms, like R$^{1w}$, and preferably a hydrogen atom or a methyl group.

It is preferable that the group inserted into the aliphatic group is —O—, —O—C(=O)—, —C(=O)—O—, or —C(=O)—.

Specific examples of the aliphatic group having these groups inserted thereinto may include —CH$_2$—CH$_2$—O—CH$_2$—CH$_2$—, —CH$_2$—CH$_2$—S—CH$_2$—CH$_2$—, —CH$_2$—CH$_2$—O—C(=O)—CH$_2$—CH$_2$, —CH$_2$—CH$_2$—C(=O)—O—CH$_2$—CH$_2$—, —CH$_2$—CH$_2$—C(=O)—O—CH$_2$—, —CH$_2$—O—C(=O)—O—CH$_2$—CH$_2$—, —CH$_2$—CH$_2$—NR$^{2w}$—C(=O)—CH$_2$—CH$_2$—, —CH$_2$—CH$_2$—C(=O)—NR$^{2w}$—CH$_2$—, —CH$_2$—NR$^{2w}$—CH$_2$—, and —CH$_2$—C(=O)—CH$_2$—.

Among these, from the viewpoint of favorably expressing the desired effect of the present invention, it is preferable that $G^{1w}$ and $G^{2w}$ are each independently a divalent aliphatic group having a linear structure such as an alkylene group having 1 to 20 carbon atoms and an alkenylene group having 2 to 20 carbon atoms, more preferably an alkylene group having 1 to 12 carbon atoms such as a methylene group, an ethylene group, a trimethylene group, a propylene group, a tetramethylene group, a pentamethylene group, a hexamethylene group, an octamethylene group, and a decamethylene group [—(CH$_2$)$_{10}$—], and particularly preferably a tetramethylene group [—(CH$_2$)$_4$—], a hexamethylene group [—(CH$_2$)$_6$—], an octamethylene group [—(CH$_2$)$_8$—], or a decamethylene group [—(CH$_2$)$_{10}$- ].

$Z^{1w}$ and $Z^{2w}$ are each independently an alkenyl group having 2 to 10 carbon atoms that is unsubstituted or substituted by a halogen atom.

It is preferable that the number of carbon atoms in the alkenyl group is 2 to 6. Examples of the halogen atom that is a substituent in the alkenyl group of $Z^{1w}$ and $Z^{2w}$ may include a fluorine atom, a chlorine atom, and a bromine atom. A chlorine atom is preferable.

Specific examples of the alkenyl group having 2 to 10 carbon atoms of $Z^{1w}$ and $Z^{2w}$ may include CH$_2$=CH—, CH$^2$=C(CH$_3$)—, CH$_2$=CH—CH$_2$—, CH$_3$—CH=CH—, CH$_2$=CH—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$CH$_2$—, CH$_2$=C(Cl)—, CH$_2$=C(CH$_3$)—CH$_2$—, and CH$_3$—CH=CH—CH$_2$—.

Among these, from the viewpoint of favorably expressing the desired effect of the present invention, it is preferable that $Z^{1w}$ and $Z^{2w}$ are each independently CH$_2$=CH—, CH$_2$=C(CH$_3$)—, CH$_2$=C(Cl)—, CH$_2$=CH—CH$_2$—, CH$_2$=C(CH$_3$)—CH$_2$—, or CH$_2$=C(CH$_3$)—CH$_2$—CH$_2$—. They each are more preferably CH$_2$=CH—, CH$_2$=C(CH$_3$)—, or CH$_2$=C(Cl)—, and particularly preferably CH$_2$=CH—.

$A^{xw}$ is an organic group of 2 to 30 carbon atoms having at least one aromatic ring selected from the group consisting of an aromatic hydrocarbon ring and an aromatic heterocyclic ring.

The organic group of 2 to 30 carbon atoms having at least one aromatic ring selected from the group consisting of an aromatic hydrocarbon ring and an aromatic heterocyclic ring, of $A^{xw}$, may have a plurality of aromatic rings, and may have an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a condensed aromatic heterocyclic ring such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring group of $A^{xw}$ may have a substituent. Examples of the substituent may include a halogen atom such as a fluorine atom and a chlorine atom; a cyano group; an alkyl group having 1 to 6 carbon atoms such as a methyl group, an ethyl group, and a propyl group; an alkenyl group having 2 to 6 carbon atoms such as a vinyl group and an allyl group; a halogenated alkyl group having 1 to 6 carbon atoms such as a trifluoromethyl group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; —C(=O)—$R^{5w}$; —C(=O)—$OR^{5w}$; and —$SO_2R^{11w}$. Herein $R^{5w}$ is an alkyl group having 1 to 20 carbon atoms, an alkenyl group having 2 to 20 carbon atoms, or a cycloalkyl group having 3 to 12 carbon atoms, and $R^{11w}$ is an alkyl group having 1 to 20 carbon atoms, an alkenyl group having 2 to 20 carbon atoms, a phenyl group, or a 4-methylphenyl group, like $R^{4w}$ which will be described later.

The aromatic ring of $A^{xw}$ may have a plurality of substituents that are the same or different, and two adjacent substituents may be bonded together to form a ring. The formed ring may be a monocyclic ring or a condensed polycyclic ring, and may be an unsaturated ring or a saturated ring.

The "number of carbon atoms" in the organic group having 2 to 30 carbon atoms of $A^{xw}$ means the total number of carbon atoms in the entire organic group, although carbon atoms in the substituents are excluded therefrom (the same applies to $A^{yw}$ which will be described later).

Examples of the organic group of 2 to 30 carbon atoms having at least one aromatic ring selected from the group consisting of an aromatic hydrocarbon ring and an aromatic heterocyclic ring of $A^{xw}$ may include an aromatic hydrocarbon ring group; an aromatic heterocyclic ring group; an alkyl group of 3 to 30 carbon atoms having at least one aromatic ring selected from the group consisting of an aromatic hydrocarbon ring group and an aromatic heterocyclic ring group; an alkenyl group of 4 to 30 carbon atoms having at least one aromatic ring selected from the group consisting of an aromatic hydrocarbon ring group and an aromatic heterocyclic ring group; and an alkynyl group of 4 to 30 carbon atoms having at least one aromatic ring selected from the group consisting of an aromatic hydrocarbon ring group and an aromatic heterocyclic ring group.

Specific preferable examples of $A^{xw}$ are as follows. However, in the present invention, $A^{xw}$ is not limited to the following examples. In the following formulae, [—] represents an atomic bond extended from any position of the ring (the same applies to the following).

(1) An aromatic hydrocarbon ring group

[Chemical Formula 28]

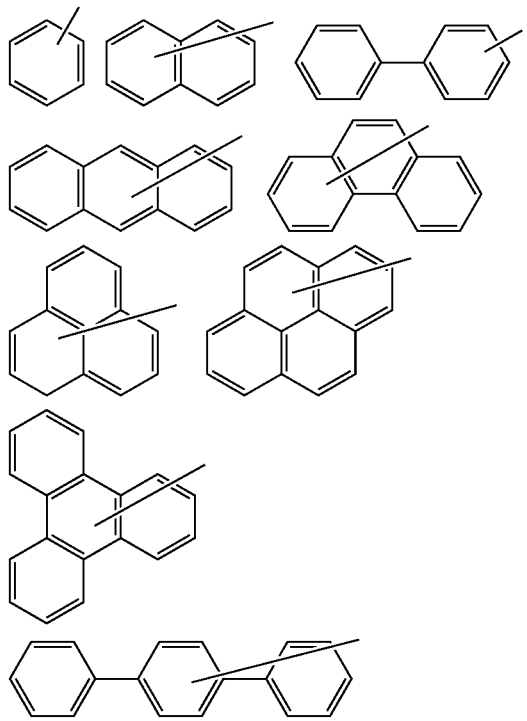

[Chemical Formula 29]

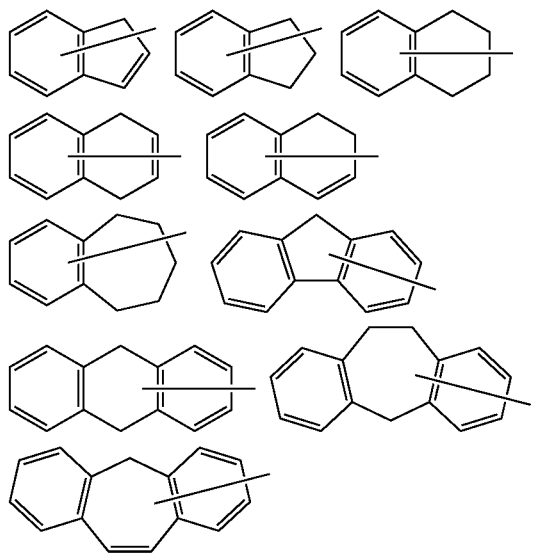

(2) An aromatic heterocyclic ring group

[Chemical Formula 30]

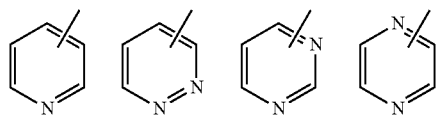

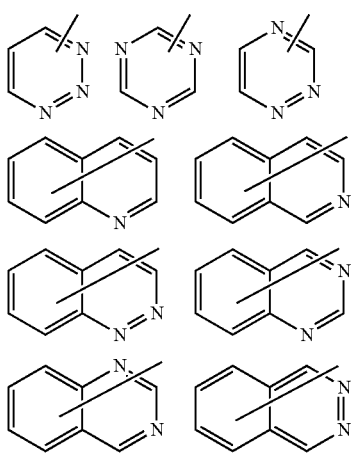

[Chemical Formula 31]

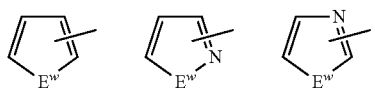

In the formulae, $E^w$ is $NR^{6w}$, an oxygen atom, or a sulfur atom. Herein $R^{6w}$ is a hydrogen atom; or an alkyl group having 1 to 6 carbon atoms such as a methyl group, an ethyl group, and a propyl group.

[Chemical Formula 32]

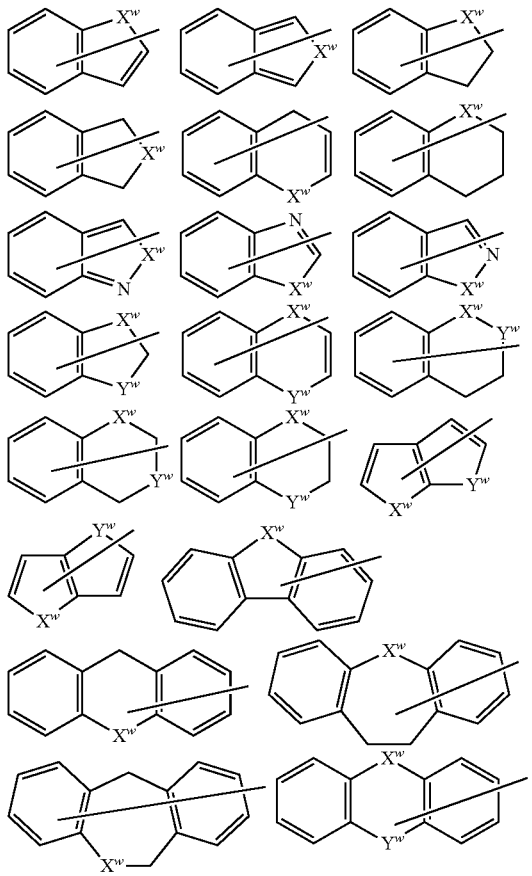

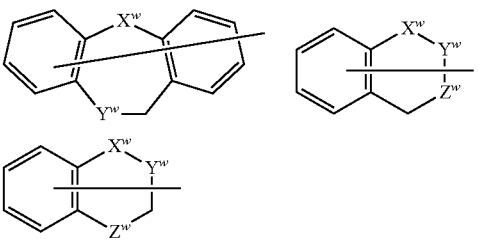

In the formulae, $X^w$, $Y^w$, and $Z^w$ are each independently $NR^{7w}$, an oxygen atom, a sulfur atom, —SO—, or —SO$_2$— (provided that a case where oxygen atoms, sulfur atoms, —SO— groups, or —SO$_2$— groups are adjacent is excluded). $R^{7w}$ is a hydrogen atom; or an alkyl group having 1 to 6 carbon atoms such as a methyl group, an ethyl group, and a propyl group, like the aforementioned $R^{6w}$.

[Chemical Formula 33]

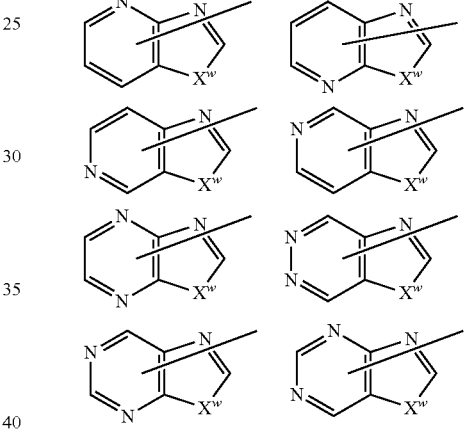

(In the formulae, $X^w$ has the same meanings as described above)

(3) An alkyl group having at least one aromatic ring selected from the group consisting of an aromatic hydrocarbon ring group and an aromatic heterocyclic ring group

[Chemical Formula 34]

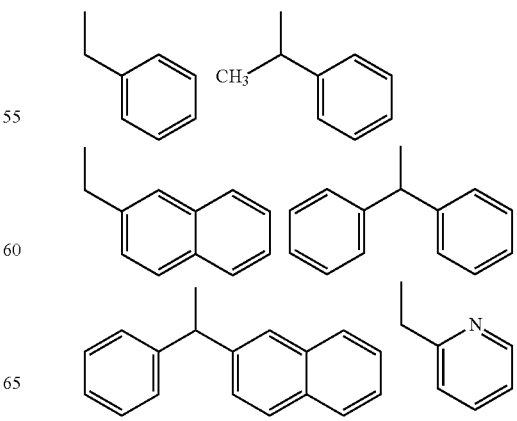

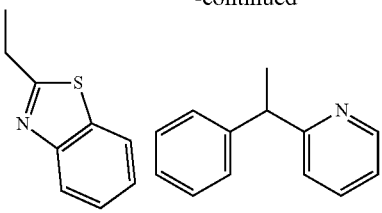

(4) An alkenyl group having at least one aromatic ring selected from the group consisting of an aromatic hydrocarbon ring group and an aromatic heterocyclic ring group

[Chemical Formula 35]

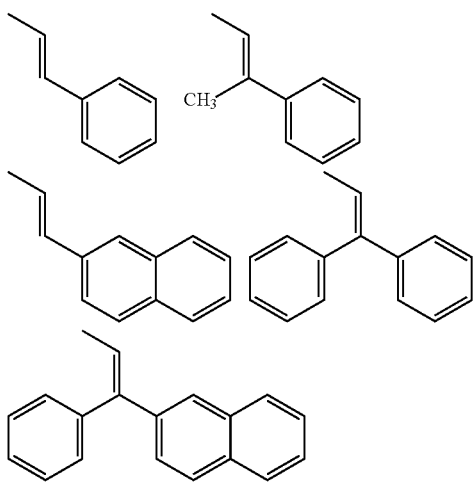

(5) An alkynyl group having at least one aromatic ring selected from the group consisting of an aromatic hydrocarbon ring group and an aromatic heterocyclic ring group

[Chemical Formula 36]

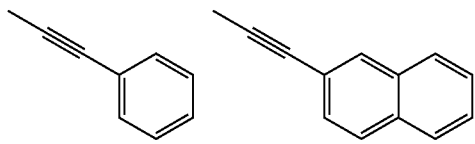

Among the groups of the aforementioned $A^{xw}$, an aromatic hydrocarbon group having 6 to 30 carbon atoms and an aromatic heterocyclic ring group having 4 to 30 carbon atoms are preferable. Any of the groups shown in the following are more preferable.

[Chemical Formula 37]

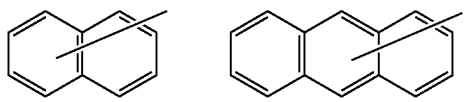

[Chemical Formula 38]

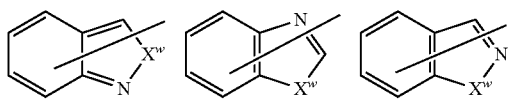

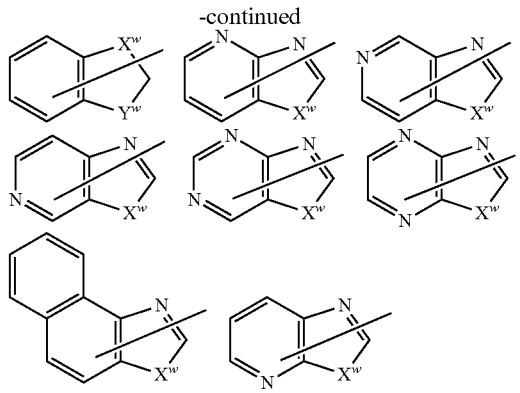

Any of the groups shown in the following are further preferable.

[Chemical Formula 39]

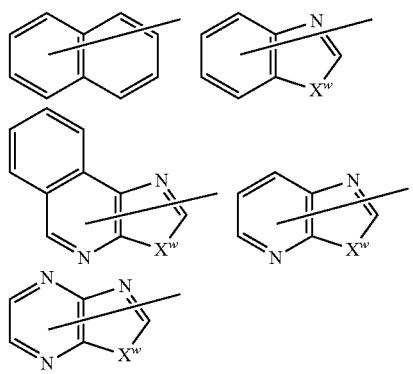

The ring of $A^{xw}$ may have a substituent. Examples of the substituent may include a halogen atom such as a fluorine atom and a chlorine atom; a cyano group; an alkyl group having 1 to 6 carbon atoms such as a methyl group, an ethyl group, and a propyl group; an alkenyl group having 2 to 6 carbon atoms such as a vinyl group and an allyl group; a halogenated alkyl group having 1 to 6 carbon atoms such as a trifluoromethyl group; a substituted amino group such as a dimethylamino group; an alkoxy group having 1 to 6 carbon atoms such as a methoxy group, an ethoxy group, and an isopropoxy group; a nitro group; an aryl group such as a phenyl group and a naphthyl group; —C(=O)—OR$^{12w}$; —C(=O)—OR$^{12w}$; and —SO$_2$R$^{6w}$. Herein R$^{12w}$ is an alkyl group having 1 to 6 carbon atoms such as a methyl group or an ethyl group; or an aryl group having 6 to 14 carbon atoms such as a phenyl group. Among these, a halogen atom, a cyano group, an alkyl group having 1 to 6 carbon atoms, and an alkoxy group having 1 to 6 carbon atoms are preferable.

The ring of $A^{xw}$ may have a plurality of substituents that are the same or different, and two adjacent substituents may be bonded together to form a ring. The formed ring may be a monocyclic ring or a condensed polycyclic ring.

The "number of carbon atoms" in the organic group having 2 to 30 carbon atoms of $A^{xw}$ means the total number of carbon atoms in the entire organic group, although carbon atoms in the substituents are excluded therefrom (the same applies to $A^{yw}$ which will be described later).

$A^{yw}$ is a hydrogen atom, an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, an alkynyl group having 2 to 20 carbon atoms and optionally having a substituent, —C(=O)—$R^{3w}$, —$SO_2$—$R^{4w}$, —C(=S)NH—$R^{9w}$, or an organic group having 2 to 30 carbon atoms and at least one aromatic ring selected from the group consisting of an aromatic hydrocarbon ring and an aromatic heterocyclic ring. Herein $R^{3w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic hydrocarbon group having 5 to 12 carbon atoms, $R^{4w}$ is an alkyl group having 1 to 20 carbon atoms, an alkenyl group having 2 to 20 carbon atoms, a phenyl group, or a 4-methylphenyl group, and $R^{9w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic group having 5 to 20 carbon atoms and optionally having a substituent.

Examples of an alkyl group having 1 to 20 carbon atoms in the alkyl group having 1 to 20 carbon atoms and optionally having a substituent of $A^{yw}$ may include a methyl group, an ethyl group, a n-propyl group, an isopropyl group, a n-butyl group, an isobutyl group, a 1-methylpentyl group, a 1-ethylpentyl group, a sec-butyl group, a tert-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group having 1 to 20 carbon atoms and optionally having a substituent is preferably 1 to 12, and further preferably 4 to 10.

Examples of an alkenyl group having 2 to 20 carbon atoms in the alkenyl group having 2 to 20 carbon atoms and optionally having a substituent of $A^{yw}$ may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icocenyl group.

The number of carbon atoms in the alkenyl group having 2 to 20 carbon atoms and optionally having a substituent is preferably 2 to 12.

Examples of a cycloalkyl group having 3 to 12 carbon atoms in the cycloalkyl group having 3 to 12 carbon atoms and optionally having a substituent of $A^{yw}$ may include a cyclopropyl group, a cyclobutyl group, a cyclopentyl group, a cyclohexyl group, and a cyclooctyl group.

Examples of an alkynyl group having 2 to 20 carbon atoms in the alkynyl group having 2 to 20 carbon atoms and optionally having a substituent of $A^{yw}$ may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of substituents in the alkyl group having 1 to 20 carbon atoms and optionally having a substituent and the alkenyl group having 2 to 20 carbon atoms and optionally having a substituent of $A^{yw}$ may include a halogen atom such as a fluorine atom and a chlorine atom; a cyano group; a substituted amino, group such as a dimethylamino group; an alkoxy group having 1 to 20 carbon atoms such as a methoxy group, an ethoxy group, an isopropoxy group, and a butoxy group; an alkoxy group having 1 to 12 carbon atoms that is substituted by an alkoxy group having 1 to 12 carbon atoms such as a methoxymethoxy group and a methoxyethoxy group; a nitro group; an aryl group such as a phenyl group and a naphthyl group; a cycloalkyl group having 3 to 8 carbon atoms such as a cyclopropyl group, a cyclopentyl group, and a cyclohexyl group; a cycloalkyloxy group having 3 to 8 carbon atoms such as a cyclopentyloxy group and a cyclohexyloxy group; a cyclic ether group having 2 to 12 carbon atoms such as a tetrahydrofuranyl group, a tetrahydropyranyl group, a dioxolanyl group, and a dioxanyl group; an aryloxy group having 6 to 14 carbon atoms such as a phenoxy group and a naphthoxy group; a fluoroalkoxy group having 1 to 12 carbon atoms having at least one substitution by a fluorine atom, such as a trifluoromethyl group, a pentafluoroethyl group, and —$CH_2CF_3$; a benzofuryl group; a benzopyranyl group; a benzodioxolyl group; a benzodioxanyl group; —C(=O)—$R^{13w}$; —C(=O)—$OR^{13w}$; —$SO_2R^{8w}$; —$SR^{10w}$; an alkoxy group having 1 to 12 carbon atoms that is substituted by —$SR^{10w}$; and a hydroxyl group. Herein $R^{13w}$ and $R^{10w}$ are each independently an alkyl group having 1 to 20 carbon atoms, an alkenyl group having 2 to 20 carbon atoms, a cycloalkyl group having 3 to 12 carbon atoms, or an aromatic hydrocarbon group having 6 to 12 carbon atoms, and $R^{8w}$ is an alkyl group having 1 to 20 carbon atoms, an alkenyl group having 2 to 20 carbon atoms, a phenyl group, or a 4-methylphenyl group, like the aforementioned $R^{4w}$.

Examples of a substituent in the cycloalkyl group having 3 to 12 carbon atoms and optionally having a substituent of $A^{yw}$ may include a halogen atom such as a fluorine atom and a chlorine atom; a cyano group; a substituted amino group such as a dimethylamino group; an alkyl group having 1 to 6 carbon atoms such as a methyl group, an ethyl group, and a propyl group; an alkoxy group having 1 to 6 carbon atoms such as a methoxy group, an ethoxy group, and an isopropoxy group; a nitro group; an aryl group such as a phenyl group and a naphthyl group; a cycloalkyl group having 3 to 8 carbon atoms such as a cyclopropyl group, a cyclopentyl group, and a cyclohexyl group; —C(=O)—$R^{7w}$; —C(=O)—$OR^{7w}$; —$SO_2R^{8w}$; and a hydroxyl group. Herein $R^{7w}$ and $R^{8w}$ have the same meanings as described above.

Examples of a substituent in the alkynyl group having 2 to 20 carbon atoms and optionally having a substituent of $A^{yw}$ may include substituents that are the same as the substituents in the alkyl group having 1 to 20 carbon atoms and optionally having a substituent and the alkenyl group having 2 to 20 carbon atoms and optionally having a substituent.

In the group represented by —C(=O)—$R^{3w}$ of $A^{yw}$, $R^{3w}$ is an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, or an aromatic hydrocarbon group having 5 to 12 carbon atoms. Specific examples thereof may include those exemplified as the examples of the alkyl group having 1 to 20 carbon atoms and optionally having a substituent, the alkenyl group having 2 to 20 carbon atoms and optionally having a substituent, and the cycloalkyl group having 3 to 12 carbon atoms and optionally having a substituent of $A^{yw}$.

In the group represented by —SO$_2$—R$^{4w}$ of A$^{yw}$, R$^{4w}$ is an alkyl group having 1 to 20 carbon atoms, an alkenyl group having 2 to 20 carbon atoms, a phenyl group or a 4-methylphenyl group.

Specific examples of the alkyl group having 1 to 20 carbon atoms and the alkenyl group having 2 to 20 carbon atoms of R$^{4w}$ may include those exemplified as the examples of the alkyl group having 1 to 20 carbon atoms and the alkenyl group having 2 to 20 carbon atoms of the aforementioned A$^{yw}$.

Examples of the organic group having 2 to 30 carbon atoms and at least one aromatic ring selected from the group consisting of an aromatic hydrocarbon ring and an aromatic heterocyclic ring of A$^{yw}$ may include those exemplified as the examples regarding A$^{xw}$.

Among these, it is preferable that A$^{yw}$ is a group represented by a hydrogen atom, an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, an alkynyl group having 2 to 20 carbon atoms and optionally having a substituent, —C(═O)—R$^{3w}$, —SO$_2$—R$^{4w}$, or an organic group having 2 to 30 carbon atoms and at least one aromatic ring selected from the group consisting of an aromatic hydrocarbon ring and an aromatic heterocyclic ring, and further preferably a group represented by a hydrogen atom, an alkyl group having 1 to 20 carbon atoms and optionally having a substituent, an alkenyl group having 2 to 20 carbon atoms and optionally having a substituent, a cycloalkyl group having 3 to 12 carbon atoms and optionally having a substituent, an alkynyl group having 2 to 20 carbon atoms and optionally having a substituent, an aromatic hydrocarbon group having 6 to 12 carbon atoms and optionally having a substituent, an aromatic heterocyclic ring group having 3 to 9 carbon atoms and optionally having a substituent, —C(═O)—R$^{3w}$, or —SO$_2$—R$^{4w}$. Herein R$^{3w}$ and R$^{4w}$ have the same meanings as described above.

It is preferable that substituents in the alkyl group having 1 to 20 carbon atoms and optionally having a substituent, the alkenyl group having 2 to 20 carbon atoms and optionally having a substituent, and the alkynyl group having 2 to 20 carbon atoms and optionally having a substituent of A$^{yw}$ are a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a phenylsulfonyl group, a 4-methylphenylsulfonyl group, a benzoyl group, or —SR$^{10w}$. Herein R$^{10w}$ has the same meanings as described above.

It is preferable that substituents in the cycloalkyl group having 3 to 12 carbon atoms and optionally having a substituent, the aromatic hydrocarbon group having 6 to 12 carbon atoms and optionally having a substituent, and the aromatic heterocyclic ring group having 3 to 9 carbon atoms and optionally having a substituent of A$^{yw}$ are a fluorine atom, an alkyl group having 1 to 6 carbon atoms, an alkoxy group having 1 to 6 carbon atoms, or a cyano group.

A$^{xw}$ and A$^{yw}$ may together form a ring. Examples of the ring may include an unsaturated heterocyclic ring having 4 to 30 carbon atoms and an unsaturated carbon ring having 6 to 30 carbon atoms, wherein these rings may optionally have a substituent.

The unsaturated heterocyclic ring having 4 to 30 carbon atoms and the unsaturated carbon ring having 6 to 30 carbon atoms are not particularly restricted, and may or may not have aromaticity. Examples thereof may include rings shown in the following. The rings shown in the following are a moiety of:

[Chemical Formula 40]

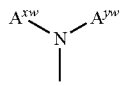

in the formula (II).

[Chemical Formula 41]

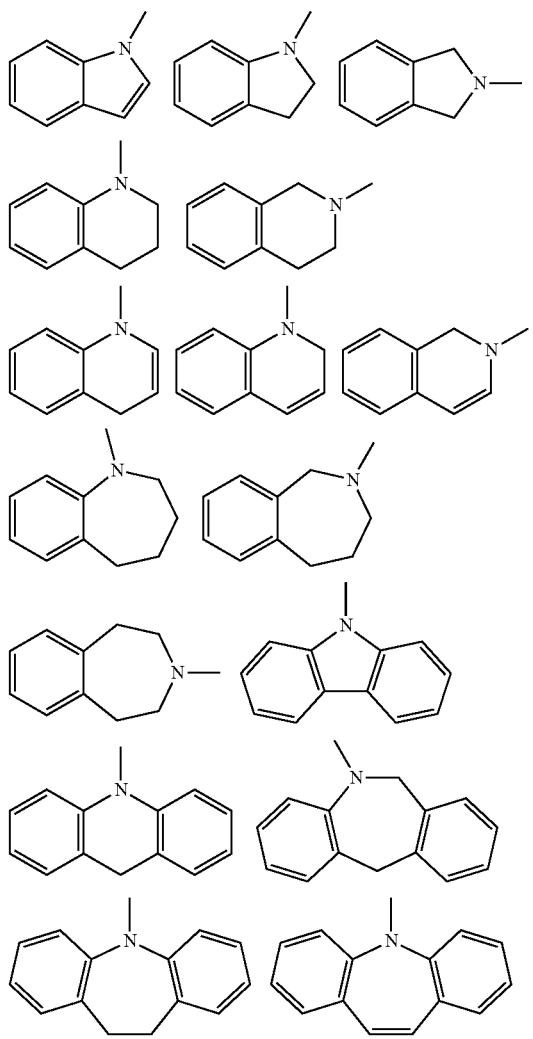

[Chemical Formula 42]

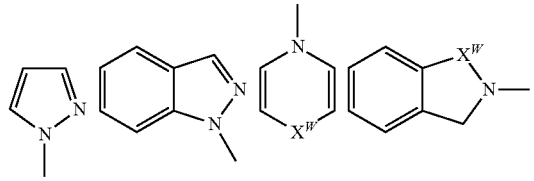

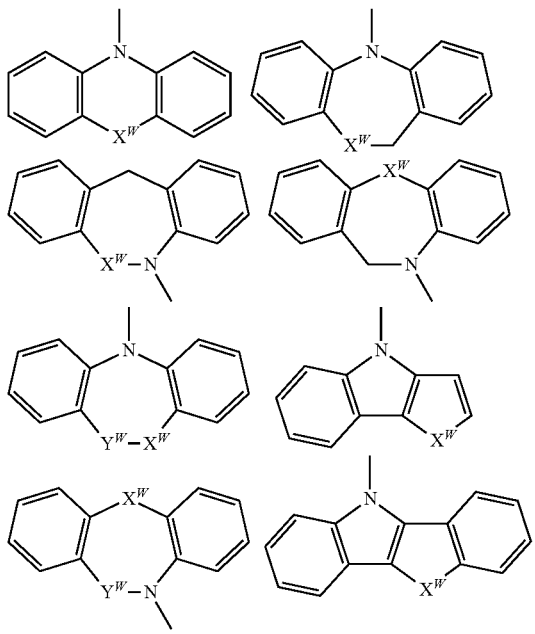

(In the formulae, $X^w$, $Y^w$, and $Z^w$ have the same meanings as described above.)

The rings may have a substituent. Examples of the substituent may include those exemplified as the examples of the substituent on the aromatic ring of $A^{xw}$.

The total number of π electrons included in $A^{xw}$ and $A^{yw}$ is preferably 4 or more and 24 or less, more preferably 6 or more and 20 or less, and further preferably 6 or more and 18 or less from the viewpoint of favorably expressing the desired effect of the present invention.

Examples of preferred combination of $A^{xw}$ and $A^{yw}$ may include:

(α) a combination of $A^{xw}$ and $A^{yw}$ in which $A^{xw}$ is an aromatic hydrocarbon group or an aromatic heterocyclic ring group having 4 to 30 carbon atoms, $A^{yw}$ is a hydrogen atom, a cycloalkyl group having 3 to 8 carbon atoms, an aromatic hydrocarbon group having 6 to 12 carbon atoms and optionally having (a halogen atom, a cyano group, an alkyl group having 1 to 6 carbon atoms, an alkoxy group having 1 to 6 carbon atoms, or a cycloalkyl group having 3 to 8 carbon atoms) as a substituent, an aromatic heterocyclic ring group having 3 to 9 carbon atoms and optionally having (a halogen atom, an alkyl group having 1 to 6 carbon atoms, an alkoxy group having 1 to 6 carbon atoms, or a cyano group) as a substituent, an alkyl group having 1 to 20 carbon atoms and optionally having a substituent, an alkenyl group having 1 to 20 carbon atoms and optionally having a substituent, or an alkynyl group having 2 to 20 carbon atoms and optionally having a substituent, and the substituent is any of a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a benzenesulfonyl group, a benzoyl group, and —$SR^{10w}$; and (β) a combination in which $A^{xw}$ and $A^{yw}$ together form an unsaturated heterocyclic ring or an unsaturated carbon ring. Herein $R^{10w}$ has the same meanings as described above.

Examples of more preferred combination of $A^{xw}$ and $A^{yw}$ may include:

(γ) a combination in which $A^{xw}$ is any of groups having the following structures, $A^{yw}$ is a hydrogen atom, a cycloalkyl group having 3 to 8 carbon atoms, an aromatic hydrocarbon group having 6 to 12 carbon atoms and optionally having (a halogen atom, a cyano group, an alkyl group having 1 to 6 carbon atoms, an alkoxy group having 1 to 6 carbon atoms, or a cycloalkyl group having 3 to 8 carbon atoms) as a substituent, an aromatic heterocyclic ring group having 3 to 9 carbon atoms and optionally having (a halogen atom, an alkyl group having 1 to 6 carbon atoms, an alkoxy group having 1 to 6 carbon atoms, or a cyano group) as a substituent, an alkyl group having 1 to 20 carbon atoms and optionally having a substituent, an alkenyl group having 1 to 20 carbon atoms and optionally having a substituent, or an alkynyl group having 2 to 20 carbon atoms and optionally having a substituent, and the substituent is any of a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a benzenesulfonyl group, a benzoyl group, and —$SR^{10w}$. Herein $R^{10w}$ has the same meanings as described above.

[Chemical Formula 44]

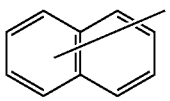

[Chemical Formula 45]

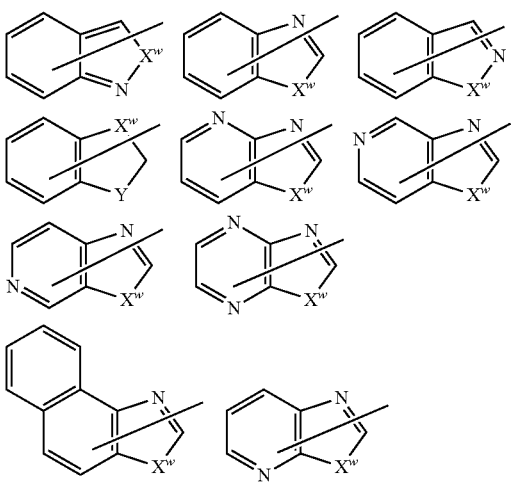

(In the formulae, $X^w$ and $Y^w$ have the same meanings as described above.)

A particularly preferred combination of $A^{xw}$ and $A^{yw}$ is (δ) a combination in which $A^{xw}$ is any of groups having the following structures, $A^{yw}$ is a hydrogen atom, a cycloalkyl group having 3 to 8 carbon atoms, an aromatic hydrocarbon group having 6 to 12 carbon atoms and optionally having (a halogen atom, a cyano group, an alkyl group having 1 to 6 carbon atoms, an alkoxy group having 1 to 6 carbon atoms, or a cycloalkyl group having 3 to 8 carbon atoms) as a substituent, an aromatic heterocyclic ring group having 3 to 9 carbon atoms and optionally having (a halogen, atom, an alkyl group having 1 to 6 carbon atoms, an alkoxy group having 1 to 6 carbon atoms, or a cyano group) as a substituent, an alkyl group having 1 to 20 carbon atoms and optionally having a substituent, an alkenyl group having 1 to 20 carbon atoms and optionally having a substituent, or an alkynyl group having 2 to 20 carbon atoms and optionally having a substituent, and the substituent is any of a halogen atom, a cyano group, an alkoxy group having 1 to 20 carbon atoms, an alkoxy group having 1 to 12 carbon atoms that is substituted by an alkoxy group having 1 to 12 carbon atoms, a phenyl group, a cyclohexyl group, a cyclic ether group having 2 to 12 carbon atoms, an aryloxy group having 6 to 14 carbon atoms, a hydroxyl group, a benzodioxanyl group, a benzenesulfonyl group, a benzoyl group, and $-SR^{10w}$. In the following formulae, $X^w$ has the same meanings as described above. Herein $R^{10w}$ has the same meanings as described above.

[Chemical Formula 46]

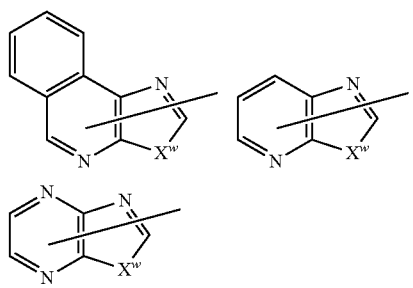

$A^{1w}$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent carbocyclic aromatic group is preferable, a trivalent benzene ring group and a trivalent naphthalene ring group are more preferable, and a trivalent benzene ring group and a trivalent naphthalene ring group represented by the following formulae are further preferable.

In the following formulae, substituents $Y^{1w}$ and $Y^{2w}$ are shown for the sake of convenience to clearly show a bonding state ($Y^{1w}$ and $Y^{2w}$ have the same meanings as described above, and the same applied to the following).

[Chemical Formula 47]

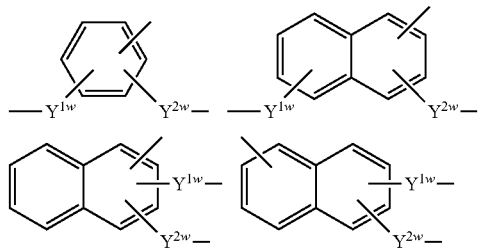

In particular, it is preferable that $A^{1w}$ is a group represented by each of the formulae ($A^w11$) to ($A^w25$), more preferably a group represented by the formula ($A^w11$), ($A^w13$), ($A^w15$), ($A^w19$), or ($A^w23$), and particularly preferably a group represented by the formula ($A^w11$) or ($A^w23$).

[Chemical Formula 48]

($A^W11$)

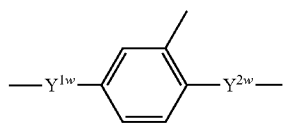

($A^W12$)

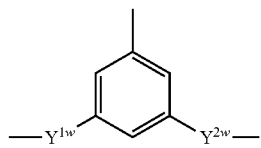

(A^W13) 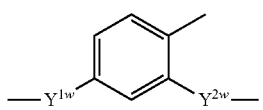

(A^W14) 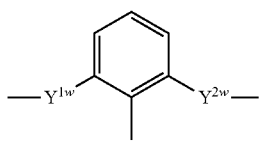

(A^W15) 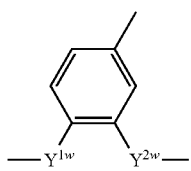

(A^W16) 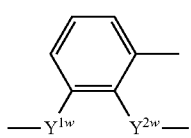

(A^W17) 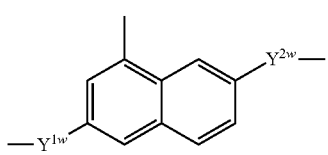

(A^W18) 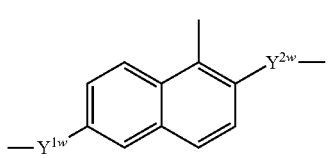

(A^W19) 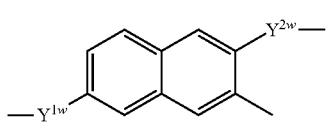

(A^W20) 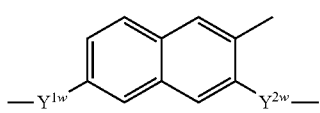

(A^W21) 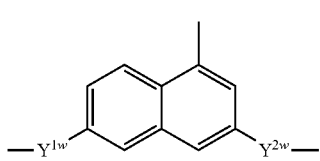

(A^W22) 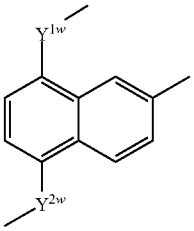

(A^W23) 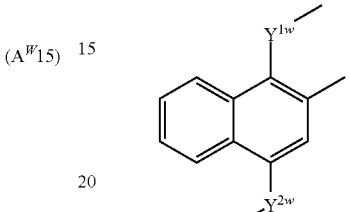

(A^W24) 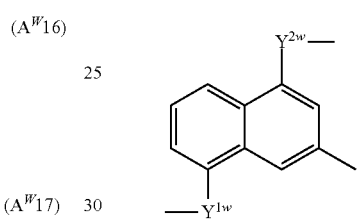

(A^W25) 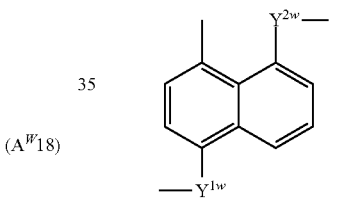

Examples of the substituent that may be included in the trivalent aromatic group of $A^{1w}$ may include those exemplified as the examples of the substituent on the aromatic group of the aforementioned $A^{xw}$. It is preferable that $A^{1w}$ is a trivalent aromatic group having no substituent.

$A^{2w}$ and $A^{3w}$ are each independently a divalent alicyclic hydrocarbon group having 3 to 30 carbon atoms and optionally having a substituent.

Examples of the divalent alicyclic hydrocarbon group having 3 to 30 carbon atoms may include a cycloalkanediyl group having 3 to 30 carbon atoms and a divalent alicyclic condensed ring group having 10 to 30 carbon atoms.

Examples of the cycloalkanediyl group having 3 to 30 carbon atoms may include a cyclopropanediyl group; a cyclobutanediyl group such as a cyclobutane-1,2-diyl group and a cyclobutane-1,3-diyl group; a cyclopentanediyl group such as a cyclopentane-1,2-diyl group and a cyclopentane-1,3-diyl group; a cyclohexanediyl group such as a cyclohexane-1,2-diyl group, a cyclohexane-1,3-diyl group, and a cyclohexane-1,4-diyl group; a cycloheptanediyl group such as a cycloheptane-1,2-diyl group, a cycloheptane-1,3-diyl group, and a cycloheptane-1,4-diyl group; a cyclooctanediyl group such as a cyclooctane-1,2-diyl group, a cyclooctane-1,3-diyl group, a cyclooctane-1,4-diyl group, and a cyclooctane-1,5-diyl group; a cyclodecanediyl group such as a cyclodecane-1,2-diyl group, a cyclodecane-1,3-diyl group, a cyclodecane-1,4-diyl group, and a cyclodecane-1,5-diyl group; a cyclododecanediyl group such as a cyclododecane-1,2-diyl group, a cyclododecane-1,3-diyl group, a cyclododecane-1,4-diyl group, and a cyclododecane-1,5-diyl group; a cyclotetradecanediyl group such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group such as a cycloeicosane-1,2-diyl group and a cycloeicosane-1,10-diyl group.

Examples of the divalent alicyclic condensed ring group having 10 to 30 carbon atoms may include a decalindiyl group such as a decalin-2,5-diyl group and a decalin-2,7-diyl group; an adamantanediyl group such as an adamantane-1,2-diyl group and an adamantane-1,3-diyl group; and a bicyclo[2.2.1]heptanediyl group such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent on any position. Examples of the substituent may include those exemplified as the examples of the substituent on the aromatic ring group of the aforementioned $A^{xw}$.

Among these, it is preferable that $A^{2w}$ and $A^{3w}$ are a divalent alicyclic hydrocarbon group having 3 to 12 carbon atoms, more preferably a cycloalkanediyl group having 3 to 12 carbon atoms, further preferably a group represented by each of the following formulae ($A^{w}31$) to ($A^{w}34$):

[Chemical Formula 49]

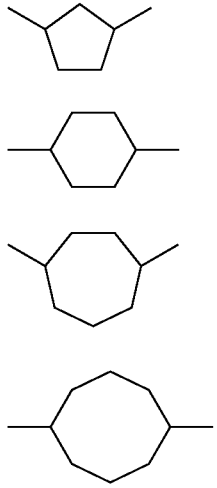

(A$^{w}$31)

(A$^{w}$32)

(A$^{w}$33)

(A$^{w}$34)

and particularly preferably the group represented by the aforementioned formula ($A^{w}32$).

As the divalent alicyclic hydrocarbon group having 3 to 30 carbon atoms, there may exist cis- and trans-stereoisomers on the basis of difference of steric configuration of carbon atom bonded to $Y^{1w}$ and $Y^{3w}$ (or $Y^{2w}$ and $Y^{4w}$). For example, when the group is a cyclohexane-1,4-diyl group, a cis-isomer ($A^{w}32a$) and a trans-isomer ($A^{w}32$ b) can exist, as described in the following.

[Chemical Formula 50]

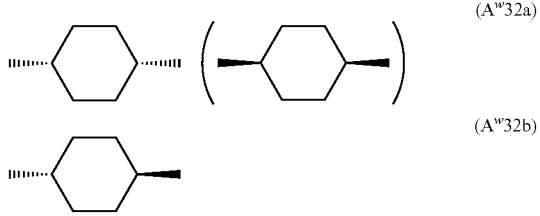

(A$^{w}$32a)

(A$^{w}$32b)

In the present invention, the group may be a cis-isomer, a trans-isomer, or an isomeric mixture of cis- and trans-isomers. The trans-isomer and the cis-isomer are preferable, and the trans-isomer is more preferable since orientation is favorable.

$A^{4w}$ and $A^{5w}$ are each independently a divalent aromatic group having 6 to 30 carbon atoms and optionally having a substituent.

The aromatic group of $A^{4w}$ and $A^{5w}$ may be monocyclic or polycyclic.

Specific preferable examples of $A^{4w}$ and $A^{5w}$ may include the following groups.

[Chemical Formula 51]

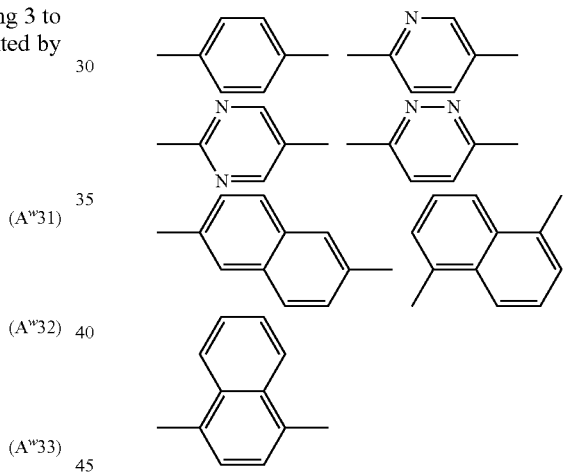

The divalent aromatic group of the aforementioned $A^{4w}$ and $A^{5w}$ may have a substituent on any position. Examples of the substituent may include a halogen atom, a cyano group, a hydroxyl group, an alkyl group having 1 to 6 carbon atoms, an alkoxy group having 1 to 6 carbon atoms, a nitro group, and a —C(=O)—OR$^{14w}$ group. Herein R$^{14w}$ is an alkyl group having 1 to 6 carbon atoms. Among these, a halogen atom, an alkyl group having 1 to 6 carbon atoms, and an alkoxy group are preferable. Among the halogen atom, a fluorine atom is more preferable, among the alkyl group having 1 to 6 carbon atoms, a methyl group, an ethyl group, and a propyl group are more preferable, and among the alkoxy group, a methoxy group and an ethoxy group are more preferable.

Among these, it is preferable that $A^{4w}$ and $A^{5w}$ are each independently a group represented by the following formulae ($A^{w}41$), ($A^{w}42$), and ($A^{w}43$) that may optionally have a substituent from the viewpoint of favorably expressing the desired effect of the present invention, and the group represented by the formula ($A^{w}41$) and optionally having a substituent is particularly preferable.

[Chemical Formula 52]

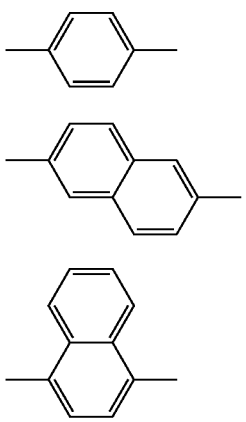

(A^w41)

(A^w42)

(A^w43)

$Q^{1w}$ is a hydrogen atom or an alkyl group having 1 to 6 carbon atoms and optionally having a substituent.

Examples of the alkyl group having 1 to 6 carbon atoms and optionally having a substituent may include those exemplified as the examples regarding the aforementioned $A^{xw}$.

Among these, $Q^{1w}$ is preferably a hydrogen atom or an alkyl group having 1 to 6 carbon atoms, and more preferably a hydrogen atom or a methyl group.

The compound (II) may be obtained by procedures that are similar to those for the aforementioned compound (I).

(Additive Monomers)

The additive monomer in the present invention is a monomer added to the liquid crystal composition containing the polymerizable liquid crystal compound with reverse wavelength dispersion and is a compound polymerizable or crosslinkable with the liquid crystal compound with reverse wavelength dispersion.

The liquid crystal composition contains, as the additive monomer, an additive monomer A or an additive monomer B. Only one of the additive monomer A and the additive monomer B may be used, or a combination thereof may also be used.

When the additive monomer A is dispersed in the polymerizable liquid crystal compound with reverse wavelength dispersion, the additive monomer A satisfies the following Expression (i) within the wavelength range of λ=380 nm to 780 nm.

When the additive monomer B is dispersed in the polymerizable liquid crystal compound with reverse wavelength dispersion, the additive monomer B satisfies the following Expression (ii) within the wavelength range of λ=380 nm to 780 nm.

$$ne>nea \text{ and } no<noa \quad \text{Expression (i)}$$

$$ne<neb \text{ and } no>nob \quad \text{Expression (ii)}$$

In the aforementioned Expressions (i) and (ii), the "ne" represents the refractive index of the polymerizable liquid crystal compound with reverse wavelength dispersion in the direction of its slow axis. The "no" represents the refractive index of the polymerizable liquid crystal compound with reverse wavelength dispersion in the direction of its fast axis. The "nea" represents the refractive index of the additive monomer A in the ne direction when it is dispersed in the polymerizable liquid crystal compound with reverse wavelength dispersion. The "noa" represents the refractive index of the additive monomer A in the no direction when it is dispersed in the polymerizable liquid crystal compound with reverse wavelength dispersion. The "neb" is a refractive index of the additive monomer B in the ne direction when it is dispersed in the polymerizable liquid crystal compound with reverse wavelength dispersion. The "nob" is the refractive index of the additive monomer B in the no direction when it is dispersed in the polymerizable liquid crystal compound with reverse wavelength dispersion.

As can be seen from the foregoing description using (Expression 4) to (Expression 12), the birefringence Δn of a liquid crystal composition containing the additive monomer A that satisfies Expression (i) is smaller than the birefringence Δn of the polymerizable liquid crystal compound with reverse wavelength dispersion. Therefore, the wavelength dispersion of the birefringence Δn of the liquid crystal composition containing the additive monomer A can be larger than the wavelength dispersion of the birefringence Δn of the polymerizable liquid crystal compound with reverse wavelength dispersion.

The birefringence Δn of a liquid crystal composition containing the additive monomer B that satisfies Expression (ii) is larger than the birefringence Δn of the polymerizable liquid crystal compound with reverse wavelength dispersion. Therefore, the wavelength dispersion of the birefringence Δn of the liquid crystal composition containing the additive monomer B can be smaller than the wavelength dispersion of the birefringence Δn of the polymerizable liquid crystal compound with reverse wavelength dispersion.

Therefore, by controlling the amounts of the additive monomers A and B in the liquid crystal composition, the magnitude of the wavelength dispersion in the liquid crystal composition can be controlled.

The refractive indices nea and noa of the additive monomer A and the refractive indices neb and nob of the additive monomer B correspond to the refractive indices in the aforementioned (Expression 4) to (Expression 12) in the following manner.

The refractive index nea of the additive monomer A corresponds to the refractive index ne2' in (Expression 8) or the refractive index n' in (Expression 12). The refractive index noa of the additive monomer A corresponds to the refractive index no2' in (Expression 8) or the refractive index n' in (Expression 12).

The refractive index neb of the additive monomer B corresponds to the refractive index ne1' in (Expression 4), and the refractive index nob of the additive monomer B corresponds to the refractive index no1' in (Expression 4).

As described above, the refractive indices nea, noa, neb, and nob in Expressions (i) and (ii) are refractive indices when the additive monomer A or B is dispersed in the polymerizable liquid crystal compound with reverse wavelength dispersion. These refractive indices are not necessarily measured in a state wherein the additive monomer A or B is dispersed in the polymerizable liquid crystal compound with reverse wavelength dispersion. When the slow axis direction and fast axis direction of the polymerizable liquid crystal compound with reverse wavelength dispersion and the slow axis direction and fast axis direction of the additive monomer A or B in a state wherein the additive monomer A or B is dispersed in the polymerizable liquid crystal compound with reverse wavelength dispersion are known, the refractive indices nea and noa of the additive monomer A and the refractive indices neb and nob of the additive monomer B may be determined using the additive monomer A or B in a state of not being dispersed in the polymerizable liquid crystal compound with reverse wavelength dispersion. For example, when a liquid crystal compound is used as the additive monomer A or B, the slow axis direction of the liquid crystal compound and the slow axis direction of the polymerizable liquid crystal compound with reverse wavelength dispersion are usually parallel to each other in the liquid crystal composition. Therefore, when the slow axis directions in the liquid crystal composition are known in this manner, the refractive indices nea, nob, neb, and nob may be determined from the refractive indices of the additive monomer A or B measured with the additive monomer A or B in a state of not being dispersed in the polymerizable liquid crystal compound with reverse wavelength dispersion.

The additive monomer B is not particularly limited, so long as it is a monomer satisfying Expression (ii). Examples of the additive monomer B may include a polymerizable liquid crystal compound with forward wavelength dispersion, and particular examples may include a polymerizable liquid crystal compound LC1057 manufactured by BASF and the following compound (2).

The additive monomer A is not particularly limited, so long as it is a monomer satisfying (Expression i). The additive monomer A used may be any of a polymerizable liquid crystal compound with forward wavelength dispersion and a resin monomer that is not a liquid crystal compound (with no refractive index anisotropy). Specific examples thereof may include the following compound (3).

The ratio of the amount of the additive monomer relative to the amount of the polymerizable liquid crystal compound with reverse wavelength dispersion may be changed in accordance with the necessity to control the magnitude of a change in the wavelength dispersion of the birefringence Δn. Usually, the ratio of the amount of the additive monomer relative to 100 parts by weight of the polymerizable liquid crystal compound with reverse wavelength dispersion is preferably 1 part by weight or more and 100 parts by weight or less and more preferably 5 parts by weight or more and 50 parts by weight or less.

(Other Components of Liquid Crystal Composition and Method for Producing Phase Difference Plate Including Optically Anisotropic Layer)

Subsequently, the method for producing a phase difference plate using the polymerizable liquid crystal compound with reverse wavelength dispersion in the present invention will be described. There are a variety of possible means for the production. A simple one is to coat a support with a solution used as a liquid crystal composition containing the polymerizable liquid crystal compound with reverse wavelength dispersion and the additive monomer A or B and then expose the liquid crystal composition to light to cure it. In this manner, an optically anisotropic layer can be formed on the support, and thereby a phase difference plate including the optically anisotropic layer can be obtained.

In addition to the polymerizable liquid crystal compound with reverse wavelength dispersion, the additive monomers A and B, and a solvent, the solution may further contain a chiral agent, a photopolymerization initiator, a thermal polymerization initiator, a sensitizer, a chain transfer agent, a polyfunctional monomer or oligomer, a resin, a surfactant, a storage stabilizer, an adhesion improver, and other necessary materials. These may be added within the range in which the liquid crystal composition does not lose its liquid crystallinity and its wavelength dispersion property is not impaired.

Examples of the solvent may include cyclopentanone, cyclohexanone, ethyl cellosolve acetate, butyl cellosolve acetate, 1-methoxy-2-propyl acetate, 1,3-dioxolane, diethylene glycol dimethyl ether, ethylbenzene, ethylene glycol diethyl ether, xylene, ethyl cellosolve, methyl-n amyl ketone, propylene glycol monomethyl ether, toluene, methyl ethyl ketone, ethyl acetate, methanol, ethanol, isopropyl alcohol, butanol, isobutyl ketone, and petroleum-based solvents. These may be used alone or in combination thereof.

The solvent may be used in an amount of 100 parts by weight to 1,000 parts by weight and preferably 150 parts by weight to 600 parts by weight relative to 100 parts by weight of the polymerizable liquid crystal compound with reverse wavelength dispersion.

[Chemical Formula 53]

Compound (2)

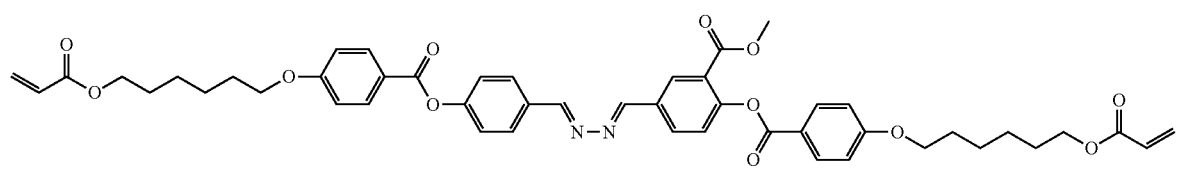

[Chemical Formula 54]

Compound (3)

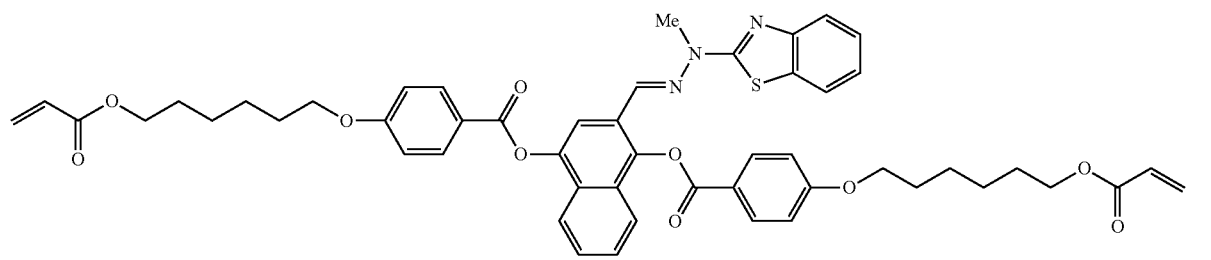

Examples of the photopolymerization initiator used may include: an acetophenone-based photopolymerization initiator such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, 2-methyl-1-[4-(methylthio)phenyl]-2-morpholinopropan-1-one, and 2-benzyl-2-dimethylamino-1-(4-morpholinophenyl)-butan-1-one; a benzoin-based photopolymerization initiator such as benzoin, benzoin methyl ether, benzoin ethyl ether, benzoin isopropyl ether, and benzyl dimethyl ketal; a benzophenone-based photopolymerization initiator such as benzophenone, benzoylbenzoic acid, benzoylbenzoic acid methyl ester, 4-phenylbenzophenone, hydroxybenzophenone, acrylated benzophenone, and 4-benzoyl-4'-methyldiphenyl sulfide; a thioxanthone-based photopolymerization initiator such as thioxanthone, 2-chlorothioxanthone, 2-methylthioxanthone, isopropylthioxanthone, and 2,4-diisopropylthioxanthone; triazine-based photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphth-1-yl)-4,6-bis(trichloromethyl)-s-triazine, 2-(4-methoxy-naphth-1-yl)-4,6-bis(trichloromethyl)-s-triazine, 2,4-trichloromethyl-(piperonyl)-6-triazine, and 2,4-trichloromethyl-(4'-methoxystyryl)-6-triazine; a borate-based photopolymerization initiator; a carbazole-based photopolymerization initiator; and an imidazole-based photopolymerization initiator.

The photopolymerization initiator may be used in an amount of 0.1 parts by weight to 30 parts by weight and preferably 0.5 parts by weight to 10 parts by weight relative to 100 parts by weight of the polymerizable liquid crystal compound with reverse wavelength dispersion.

One type of photopolymerization initiator or a mixture of two or more types of photopolymerization initiators is used. In addition, a compound such as an α-acyloxy ester, acylphosphine oxide, methylphenyl glyoxylate, benzil, 9,10-phenanthrenequinone, camphorquinone, ethylanthraquinone, 4,4'-diethylisophthalophenone, 3,3',4,4'-tetra(t-butylperoxycarbonyl)benzophenone, or 4,4'-diethylaminobenzophenone may be used as a sensitizer.

The sensitizer may be contained in an amount of 0.1 to 60 parts by weight relative to 100 parts by weight of the photopolymerization initiator.

The solution containing the polymerizable liquid crystal compound with reverse wavelength dispersion may further contain a polyfunctional thiol functioning as a chain transfer agent.

The polyfunctional thiol used is a compound having at least two thiol groups. Examples of the polyfunctional thiol may include hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine, and 2-(N,N-dibutylamino)-4,6dimmercapto-s-triazine. One type of polyfunctional thiol or a mixture of two or more types may be used.

The polyfunctional thiol may be used in an amount of 0.2 to 150 parts by weight and preferably 0.2 to 100 parts by weight relative to 100 parts by weight of the polymerizable liquid crystal compound with reverse wavelength dispersion.

Examples of the surfactant may include: an anionic surfactant such as a polyoxyethylene alkyl ether sulfate, sodium dodecylbenzene sulfonate, an alkali metal salt of a styrene-acrylic acid copolymer, a sodium alkyl naphthalene sulfonate, a sodium alkyl diphenyl ether disulfonate, monoethanolamine lauryl sulfate, triethanolamine lauryl sulfate, ammonium lauryl sulfate, monoethanolamine stearate, sodium stearate, sodium lauryl sulfate, a monoethanolamine of a styrene-acrylic acid copolymer, and a polyoxyethylene alkyl ether phosphate; a nonionic surfactant such as polyoxyethylene oleyl ether, polyoxyethylene lauryl ether, polyoxyethylene nonylphenyl ether, polyoxyethylene alkyl ether phosphates, polyoxyethylene sorbitan monostearate, and polyethylene glycol monolaurate; a cationic surfactant such as an alkyl quaternary ammonium salt and an ethylene oxide adduct thereof; and an amphoteric surfactant such as an alkyl betaine, e.g., an alkyl dimethylaminoacetic acid betaine and an alkyl imidazoline. One type of surfactant may be used alone, or a mixture of two or more types may be used.

The solution containing the polymerizable liquid crystal compound with reverse wavelength dispersion may further contain a storage stabilizer, for stabilizing a change in viscosity over the lapse of time. Examples of the storage stabilizer may include: a quaternary ammonium chloride such as benzyltrimethyl chloride and diethylhydroxyamine, an organic acid such as lactic acid and oxalic acid and methyl ethers thereof, t-butylpyrocatechol, an organic phosphine such as tetraethylphosphine and tetraphenylphosphine, and a phosphite. The storage stabilizer may be contained in an amount of 0.1 to 10 parts by weight relative to 100 parts by weight of the polymerizable liquid crystal compound with reverse wavelength dispersion.

The solution containing the polymerizable liquid crystal compound with reverse wavelength dispersion may further contain an adhesion improver such as a silane coupling agent, for improving the adhesion to the support.

Examples of the silane coupling agent may include: a vinylsilane such as vinyl tris(β-methoxyethoxy)silane, vinylethoxysilane, and vinyltrimethoxysilane; a (meth)acrylic silane such as γ-methacryloxypropyltrimethoxysilane; an epoxysilane such as β-(3,4-epoxycyclohexyl)ethyltrimethoxysilane, β-(3,4-epoxycyclohexyl)methyltrimethoxysilane, β-(3,4-epoxycyclohexyl)ethyltriethoxysilane, β-(3,4-epoxycyclohexyl)methyltriethoxysilane, γ-glycidoxypropyltrimethoxysilane, and γ-glycidoxypropyltriethoxysilane; an aminosilane such as N-β(aminoethyl)γ-aminopropyltrimethoxysilane, N-β(aminoethyl)γ-aminopropyltriethoxysilane, N-β(aminoethyl)γ-aminopropylmethyldiethoxysilane, γ-aminopropyltriethoxysilane, γ-aminopropyltrimethoxysilane, N-phenyl-γ-aminopropyltrimethoxysilane, and N-phenyl-γ-aminopropyltriethoxysilane; and a thiosilane such as γ-mercaptopropyltrimethoxysilane and γ-mercaptopropyltriethoxysilane.

The silane coupling agent may be contained in an amount of 0.01 to 100 parts by weight relative to 100 parts by weight of the polymerizable liquid crystal compound with reverse wavelength dispersion.

Subsequently, the solution is applied onto the support. Upon application, the surface of the support may be subjected to an orientation treatment in advance as needed. For application of the solution, any of a spin coating method, a slit coating method, a letterpress printing method, a screen printing method, planographic printing, reverse printing, gravure printing, other printing methods, a combination of any of the aforementioned printing methods and an offset method, an ink-jet method, a bar coating method, and other known film-forming methods may be used.

The type of the support is not particularly limited, and any plate or film formed from a known organic or inorganic material may be used. As the support, it is preferable to use a transparent support. Examples of the organic material may include polycycloolefin [such as ZEONEX and ZEONOR (registered trademarks, manufactured by ZEON CORPORATION), ARTON (registered trademark, manufactured by JSR), and APEL (registered trademark, manufactured by Mitsui Chemicals, Inc.], polyethylene terephthalate, polycarbonate, polyimide, polyamide, polymethyl methacrylate, polystyrene, polyvinyl chloride, polytetrafluoroethylene, cellulose, cellulose triacetate, and polyethersulfone. Examples of the inorganic material may include silicon, glass, and calcite. From the viewpoint of cost and handleability, the organic material is preferable. A light-transmissive film such as a plastic film, a glass plate, a resin plate, etc. is preferable.

On the surface of the support, the orientation film may be formed. In this case, the optically anisotropic layer may be formed on the orientation film. With the orientation film, the liquid crystal compound in the liquid crystal composition may be oriented in one direction within the surface.

The orientation film contains, e.g., a polymer such as polyimide, polyvinyl alcohol, polyester, polyarylate, polyamide-imide, and polyetherimide. The orientation film may be obtained by applying a solution containing such a polymer (a composition for the orientation film) onto the support to form a film, drying the film, and then subjecting the film to, e.g., a rubbing treatment in one direction.

The thickness of the orientation film is preferably 0.001 to 5 μm and more preferably 0.001 to 1 μm.

If necessary, the surface of the support or the orientation film may be subjected to a rubbing treatment. Such a rubbing treatment can impart orientation ability to the surface for uniformly orient the compound that is capable of exhibiting liquid crystallinity in the liquid crystal composition.

The method of rubbing treatment is not particularly limited, and examples thereof may include a method in which the surface of the support or orientation film is rubbed in a constant direction with a roll wrapped with cloth or felt formed of synthetic fibers such as nylon or natural fibers such as cotton. For removing powders (foreign substance) generated during the rubbing treatment to render the treated surface clean, it is preferable that the treated surface is washed after the rubbing treatment with isopropyl alcohol, etc.

Other than the rubbing treatment method, a method of irradiating the surface of the orientation film with polarized ultraviolet light can also impart a function of restraining orientation of the liquid crystal layer in one direction on the surface to the orientation film.

In addition, an ion beam orientation method in which the support is irradiated obliquely with an ion beam such as $Ar^+$ to impart uniform orientation ability to the support may also be used.

By such application, the layer of the liquid crystal composition may be formed, and the liquid crystal compound in the formed layer is uniformly oriented in a desired form. That is, the orientation of the applied liquid crystal composition can be made uniform. The orientation may be immediately achieved by the application. If necessary, the orientation may be achieved in some cases by subjecting the layer to an orientation treatment such as heating after the application. The heating temperature in this case is usually within the range of TN−50° C. to TN+10° C., where TN is the liquid crystal phase–isotropic phase transition temperature. The heating temperature is preferably within the range of TN−10° C. to TN+10° C. The heating temperature is more preferably within the range of TN−5° C. to TN ° C.

Drying of the layer of the liquid crystal composition may be achieved by a drying method such as atmospheric drying, drying by heating, drying under reduced pressure, or drying by heating under reduced pressure. By the drying, the solvent can be removed.

As the method for polymerizing the polymerizable compound in the layer of the liquid crystal composition, any method suitable for the nature of the components of the liquid crystal composition such as the polymerizable compound and the polymerization initiator may be appropriately selected. Examples thereof may include a method including an active energy ray irradiation method and a thermal polymerization method. The active energy ray irradiation method is preferable since heating is not required and the reaction proceeds at room temperature. The active energy rays for use may be one or plurality of types of radial rays such as ultraviolet light, electron beams, visible light, and infrared light. Particularly, the method of irradiation with light such as ultraviolet light is preferred because of its simple operation. The active energy rays applied may include any of energy rays such as visible light, ultraviolet light, infrared light, and electron beams. The temperature during irradiation with ultraviolet rays is preferably 30° C. or lower. The ultraviolet light irradiation intensity is usually within the range of 0.1 mW/cm$^2$ to 1,000 mW/cm$^2$ and preferably within the range of 0.5 mW/cm$^2$ to 200 mW/cm$^2$. As a result of the polymerization, uniform orientation state of the liquid crystal composition is fixed.

(Optically Anisotropic Layer)

In the optically anisotropic layer, the main chain mesogen and the side chain mesogen of the polymerizable liquid crystal compound with reverse wavelength dispersion are oriented in different directions. The "mesogen of the polymerizable liquid crystal compound with reverse wavelength dispersion" in the optically anisotropic layer is the mesogen that existed in the molecule of the polymerizable liquid crystal compound with reverse wavelength dispersion and is the mesogen in the polymer produced by polymerization of the polymerizable liquid crystal compound with reverse wavelength dispersion. When the main chain mesogen and the side chain mesogen are oriented in different directions in this manner, the birefringence $\Delta n_L'$ of the optically anisotropic layer has reverse wavelength dispersion property, and favorable properties as a phase difference plate can thereby be expressed.

The presence of reverse wavelength dispersion property of birefringence $\Delta n_L'$ of the optically anisotropic layer may be confirmed by measurement of birefringence $\Delta n_L'$ at a variety of wavelengths λ with a phase difference analyzer (trade name "AxoScan" manufactured by Axometrics, Inc., etc.).

The optically anisotropic layer is a layer formed by curing the liquid crystal composition of the present invention, as described above. Therefore, this optically anisotropic layer can have the same orientation state as the orientation state of the liquid crystal composition and can thus control wavelength dispersion in the same manner as that for the liquid crystal composition. As a result, by controlling the amount of the additive monomer A or B contained in the liquid crystal composition in the method for producing the optically anisotropic layer, the magnitude of the wavelength dispersion in the optically anisotropic layer can be controlled.

For example, in an optically anisotropic layer formed of a liquid crystal composition containing the polymerizable liquid crystal compound with reverse wavelength dispersion and the additive monomer A, the wavelength dispersion of the birefringence $\Delta n_L'$ in the optically anisotropic layer formed by curing the liquid crystal composition may be larger than the wavelength dispersion of the birefringence $\Delta n_L$ in an optically anisotropic layer formed by uniformly orienting only the polymerizable liquid crystal compound with reverse wavelength dispersion. Therefore, the aforementioned birefringence $\Delta n_L'$ and birefringence $\Delta n_L$ may satisfy the relationship of the following Expression (iii).

$$\Delta n_L(450)/\Delta n_L(550) > \Delta n_L'(450)/\Delta n_L'(550) \text{ and}$$

$$\Delta n_L(650)/\Delta n_L(550) < \Delta n_L'(650)/\Delta n_L'(550) \qquad \text{Expression (iii)}$$

For another example, in an optically anisotropic layer formed of a liquid crystal composition containing the polymerizable liquid crystal compound with reverse wavelength dispersion and the additive monomer B, the wavelength dispersion of the birefringence $\Delta n_L'$ in the optically anisotropic layer formed by curing the liquid crystal composition may be smaller than the wavelength dispersion of the birefringence $\Delta n_L$ in an optically anisotropic layer formed by uniformly orienting only the polymerizable liquid crystal compound with reverse wavelength dispersion. Therefore, the aforementioned birefringence $\Delta n_L'$ and birefringence $\Delta n_L$ may satisfy the relationship of the following Expression (iv).

$$\Delta n_L(450)/\Delta n_L(550) < \Delta n_L'(450)/\Delta n_L'(550) \text{ and}$$

$$\Delta n_L(650)/\Delta n_L(550) > \Delta n_L'(650)/\Delta n_L'(550) \qquad \text{Expression (iv)}$$

In the aforementioned Expressions (iii) and (iv), $\Delta n_L$ (450) represents the birefringence $\Delta n_L$ at a wavelength of $\lambda=450$ nm, $\Delta n_L$ (550) represents the birefringence $\Delta n_L$ at a wavelength of $\lambda=550$ nm, and $\Delta n_L(650)$ represents the birefringence $\Delta n_L$ at a wavelength of $\lambda=650$ nm. $\Delta n_L'(450)$ represents the birefringence $\Delta n_L'$ at a wavelength of $\lambda=450$ nm, $\Delta n_L'(550)$ represents the birefringence $\Delta n_L'$ at a wavelength of $\lambda=550$ nm, and $\Delta n_L'$ (650) represents the birefringence $\Delta n_L'$ at a wavelength of $\lambda=650$ nm.

The thickness of the optically anisotropic layer is not particularly limited, and may be appropriately adjusted so that properties such as retardation fall within a desired range. Specifically, the lower limit of the thickness is preferably 0.1 μm or more, and more preferably 0.5 μm or more, whereas the upper limit of the thickness is preferably 10 μm or less, and more preferably 5 μm or less.

(Phase Difference Plate: Other Components)

The phase difference plate of the present invention may solely consist of the aforementioned optically anisotropic layer, or may have another layer, if necessary. For example, a member such as the support and the orientation film used in production of the optically anisotropic layer may remain as it is without being peeled off for use as the phase difference plate. In this case, the layer other than the optically anisotropic layer may be usually made as an optically isotropic layer. Examples of the optional layer may include an adhesion layer for effecting adhesion of a layer to another, a mat layer for improving the sliding property of the film, a hard-coat layer such as an impact-resistant polymethacrylate resin layer, an anti-reflection layer, an anti-glare layer, and an anti-fouling layer.

(Image Display Device)

The image display device of the present invention has the phase difference plate of the present invention. The imaging display device of the present invention may have the phase difference plate in combination with a linear polarizer to serve as the circularly polarizing plate.

Examples of the image display device of the present invention may include a liquid crystal display device, an organic electroluminescent display device, a plasma display device, a FED (field emission) display device, and a SED (surface field emission) display device. The liquid crystal display device and the organic electroluminescent display device are particularly preferable.

Examples of the driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode. Among these, the in-plane switching mode and the vertical alignment mode are preferable, and the in-plane switching mode is particularly preferable. A liquid crystal cell of the in-plane switching mode has a wide viewing angle. However, by applying the phase difference plate, the viewing angle can be further increased.

The image display device of the present invention may have only one sheet of the phase difference plate of the present invention or two or more sheets thereof. In the image display device of the present invention, the phase difference plate of the present invention may be provided by bonding the plate to another component such as a liquid crystal cell via an adhesive.

EXAMPLES

Embodiments of the present invention will be described hereinbelow, but the present invention is not limited thereto. It will be appreciated that, since the materials used in the present invention are extremely sensitive to light, exposure to unnecessary light such as natural light must be prevented and all the operations are performed under a yellow or red light. Note that "part" used in Examples and Comparative Examples means "part by weight".

Production Example 1

Synthesis of Compound 1

[Chemical Formula 55]

Compound 1

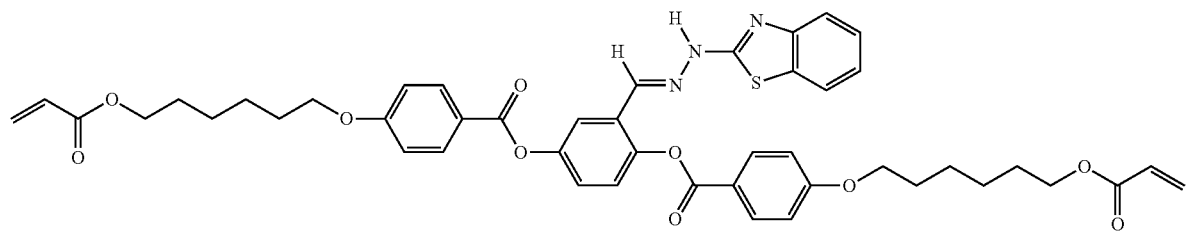

<Step 1: Synthesis of Intermediate Product A>

[Chemical Formula 56]

Intermediate product A

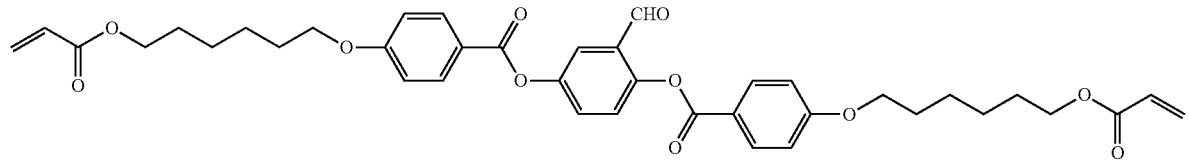

20 g (144.8 mmol) of 2,5-dihydroxybenzaldehyde, 105.8 g (362.0 mmol) of 4-(6-acryloyl-hex-1-yloxy)benzoic acid (available from DKSH), 5.3 g (43.4 mmol) of 4-(dimethylamino)pyridine, and 200 mL of N-methylpyrrolidone were placed in a four-necked reaction vessel equipped with a thermometer under nitrogen flow, and a homogeneous solution was produced. To the solution, 83.3 g (434.4 mmol) of 1-ethyl-3-(3-dimethylaminopropyl) carbodiimide hydrochloride (WSC) was added, and the mixture was stirred at 25° C. for 12 hours. After completion of the reaction, the reaction solution was added to 1.5 L of water, and the mixture was extracted with 500 mL of ethyl acetate. The ethyl acetate layer was dried over anhydrous sodium sulfate, and the sodium sulfate was removed by filtration. Ethyl acetate was distilled off under reduced pressure from the filtrate with a rotary evaporator to obtain a pale yellow solid. The pale yellow solid was purified by silica gel column chromatography (toluene:ethyl acetate=9:1 (by volume)) to obtain 75 g of an intermediate product A as a white solid (yield: 75.4%).

The structure thereof was identified by $^1$H-NMR.

$^1$H-NMR (400 MHz, CDCl$_3$, TMS, δ ppm): 10.20 (s, 1H), 8.18-8.12 (m, 4H), 7.78 (d, 1H, J=2.8 Hz), 7.52 (dd, 1H, J=2.8 Hz, 8.7 Hz), 7.38 (d, 1H, J=8.7 Hz), 7.00-6.96 (m, 4H), 6.40 (dd, 2H, J=1.4 Hz, 17.4 Hz), 6.12 (dd, 2H, J=10.6 Hz, 17.4 Hz), 5.82 (dd, 2H, J=1.4 Hz, 10.6 Hz), 4.18 (t, 4H, J=6.4 Hz), 4.08-4.04 (m, 4H), 1.88-1.81 (m, 4H), 1.76-1.69 (m, 4H), 1.58-1.42 (m, 8H)

<Step 2: Synthesis of Compound 1>

10.5 g (15.3 mmol) of the intermediate product A synthesized in the previous Step 1, 3.0 g (18.3 mmol) of 2-hydrazinobenzothiazole, and 80 mL of tetrahydrofuran (THF) were placed in a 4-necked reaction vessel equipped with a thermometer under nitrogen flow, and a homogeneous solution was produced. To the solution, 18 mg (0.08 mmol) of (±)-camphorsulfonic acid was added, and the mixture was stirred at 25° C. for 3 hours. After completion of the reaction, the reaction solution was added to 800 mL of 10% sodium bicarbonate water, and the mixture was extracted with 100 mL of ethyl acetate twice. The ethyl acetate layers were collected, and dried over anhydrous sodium sulfate, and the sodium sulfate was removed by filtration. Ethyl acetate was distilled off under reduced pressure from the filtrate with a rotary evaporator to obtain a pale yellow solid. The pale yellow solid was purified by silica gel column chromatography (toluene:ethyl acetate=8:2 (by volume)) to obtain 8.0 g of a compound 1 as a pale yellow solid (yield: 62.7%). The structure of the target compound was identified by $^1$H-NMR and mass spectrum.

$^1$H-NMR (500 MHz, DMSO-d$_6$, TMS, δ ppm): 12.30 (br, 1H), 8.19 (s, 1H), 8.17-8.12 (m, 4H), 7.76 (d, 1H, J=3.0 Hz), 7.68 (d, 1H, J=7.5 Hz), 7.45-7.39 (m, 3H), 7.28 (t, 1H, J=8.0 Hz), 7.18-7.14 (m, 4H), 7.09 (t, 1H, J=8.0 Hz), 6.33 (dd, 2H, J=1.5 Hz, 17.5 Hz), 6.18 (dd, 2H, J=10.5 Hz, 17.5 Hz), 5.944 (dd, 1H, J=1.5 Hz, 10.5 Hz), 5.941 (dd, 1H, J=1.5 Hz, 10.5 Hz), 4.14-4.10 (m, 8H), 1.80-1.75 (m, 4H), 1.69-1.63 (m, 4H), 1.53-1.38 (m, 8H)

LCMS (APCI): calcd for C$_{46}$H$_{47}$N$_3$O$_{10}$S: 833 [M$^+$]; Found: 833.

<Measurement of Phase Transition Temperature>

10 mg of the compound 1 was weighted, and placed between two glass substrates with a polyimide orientation film that had been subjected to a rubbing treatment while the compound 1 was in a solid state. The substrates was placed on a hot plate, and the temperature was increased from 50° C. to 200° C., and then decreased to 50° C. A histological change during the increase and decrease in the temperature was observed with a polarizing microscope (ECLIPSE LV100POL manufactured by Nikon Corporation). As a result, during the increase in the temperature, a solid phase was transformed into a nematic liquid crystal phase at 102° C., and then into an isotropic liquid phase at 165° C. In contrast, during the decrease in the temperature, the isotropic liquid phase was transformed into a nematic liquid crystal phase at 140° C., and then into a solid phase at 50° C. or lower.

Comparative Example 1

In this Comparative Example, a method for producing a phase difference plate using a polymerizable liquid crystal compound with reverse wavelength dispersion in which wavelength dispersion is not controlled will be described, and the optical properties of the produced phase difference plate will be described. Then, as Examples, examples of phase difference plates using liquid crystal compositions containing the polymerizable liquid crystal compound with reverse wavelength dispersion in which wavelength dispersion has been controlled will be described.

A mixture having the following composition was stirred and mixed homogeneously, and filtrated using a filter with a pore diameter of 0.45 μm to thereby obtain a solution containing the polymerizable liquid crystal compound with reverse wavelength dispersion.

| | |
|---|---|
| Polymerizable liquid crystal compound with reverse wavelength dispersion: Compound 1 | 19.3 parts |
| Photopolymerization initiator: IRGACURE-379 (manufactured by BASF Japan Ltd.) | 0.6 parts |
| Surfactant: FTERGENT 209F 1% solution (manufactured by NEOS Company Limited) | 5.8 parts |
| Solvent: Cyclopentanone | 74.3 parts |

One surface of an optically isotropic support (COP ZEONOR film, product name "ZF16", manufactured by ZEON CORPORATION) was subjected to an orientation treatment by rubbing. Onto the treated surface, a solution containing the polymerizable liquid crystal compound with reverse wavelength dispersion was applied with a spin coater so that the dried film thickness was 1.4 μm. The resultant was dried on a hot plate at 120° C. for 2 minutes to obtain a multilayered product.

Subsequently, the liquid crystal-oriented substrate was exposed to ultraviolet rays using a metal halide lamp. The ultraviolet irradiation was performed with the exposure amount of 100 mJ/cm$^2$ at an illuminance of 16 mW/cm$^2$ and a wavelength λ=365 nm. In this manner, a phase difference plate including the support and a 1.4 μm-thick optically anisotropic layer formed on the support was obtained.

<Measurement of Wavelength Dispersion of Refractive Indices>

Figure 6:
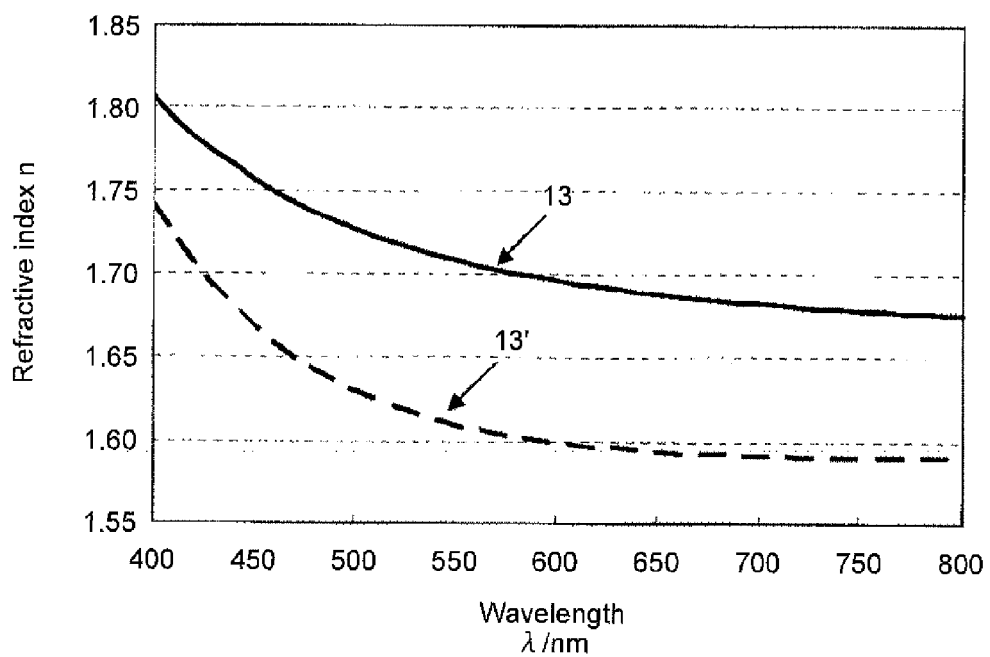
FIG. 6 is a graph for illustrating the wavelength dispersion of each of the refractive index in its slow axis direction and refractive index in its fast axis direction of compound 1.

The refractive indices of the produced phase difference plate in its slow and fast axis directions were measured using a refractive index measurement device, Prism Coupler, manufactured by Metricon. The refractive indices were measured at wavelengths of λ=407 nm, 532 nm, and 633 nm, and the obtained values were applied to a Cauchy model to calculate wavelength dispersion property. The results are shown in FIG. 6. The values at a wavelength of λ=550 nm were ne=1.708 and no=1.610.

<Measurement of Wavelength Dispersion of Birefringence Δn>

The wavelength dispersion property of the in-plane phase difference Re of the produced phase difference plate was measured using a phase difference analyzer, AxoScan, manufactured by AXOMETRICS. Δn was calculated from the relationship of Δn=(Re/film thickness) to obtain Δn(450)/Δn(550)=0.92 and Δn(650)/Δn(550)=1.01.

Example 1

A variety of mixtures named as composition 1, composition 2, and composition 3 shown in the following Table 1 were stirred and mixed homogeneously, and filtrated through a filter with a pore diameter of 0.45 μm to obtain solutions containing the polymerizable liquid crystal compound with reverse wavelength dispersion. Phase difference plates were produced in the same manner as in the Comparative Example. It has been known that, in a state wherein LC1057 used as the additive monomer is dispersed in the compound 1 and uniformly oriented, the slow axis direction of the LC1057 is parallel to the slow axis direction of the compound 1.

<Measurement of Wavelength Dispersion of Refractive Indices>

One surface of a support (COP ZEONOR film, product name "ZF16", manufactured by ZEON CORPORATION) was subjected to an orientation treatment by rubbing. Onto the treated surface, a solution prepared by dissolving 20 parts of the additive monomer LC1057 in 80 parts of cyclopentanone was applied with a spin coater so that the dried film thickness was 1.4 μm. The resultant was dried on a hot plate at 120° C. for 2 minutes to obtain a multilayered product. Subsequently, the multilayered product was exposed to ultraviolet rays using a metal halide lamp. The ultraviolet irradiation was performed with the exposure amount of 100 mJ/cm$^2$ at an illuminance of 16 mW/cm$^2$ and a wavelength λ=365 nm. The refractive indices of the LC1057 in the slow and fast axis directions were measured using a refractive index measurement device, Prism Coupler, manufactured by Metricon. As a result, it was confirmed that, over the entire wavelength range of λ=380 to 780 nm, the refractive index of the LC1057 in the slow axis direction was larger than that of the compound 1 and the refractive index of the LC1057 in the fast axis direction was smaller than that of the compound 1. The refractive indices at a wavelength of λ=550 nm were ne=1.763 and no=1.551.

Figure 7:
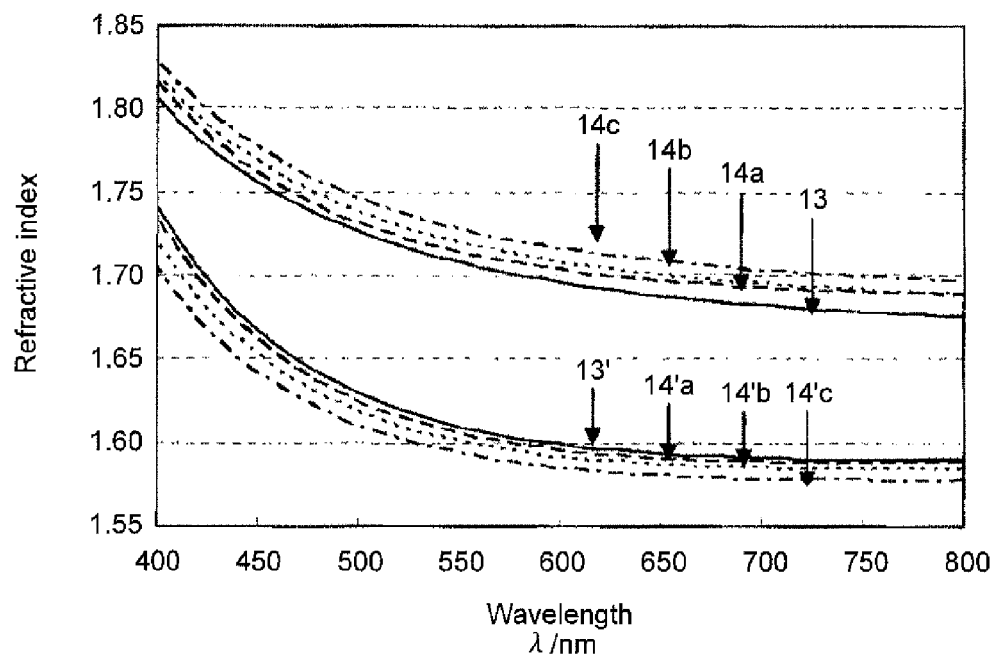
FIG. 7 is a graph showing changes in refractive indices due to an additive monomers.

The refractive indices of each of the liquid crystal compositions in the slow and fast axis directions were measured. The results are shown in FIG. 7. It was found that, as the adding amount of the additive monomer increases, the refractive index in the slow axis direction increases and the refractive index in the fast axis direction decreases. These results suggest that the refractive indices of the liquid crystal composition can be controlled by controlling the adding amount of the additive monomer.

<Measurement of Wavelength Dispersion of Birefringence Δn>

Figure 8:
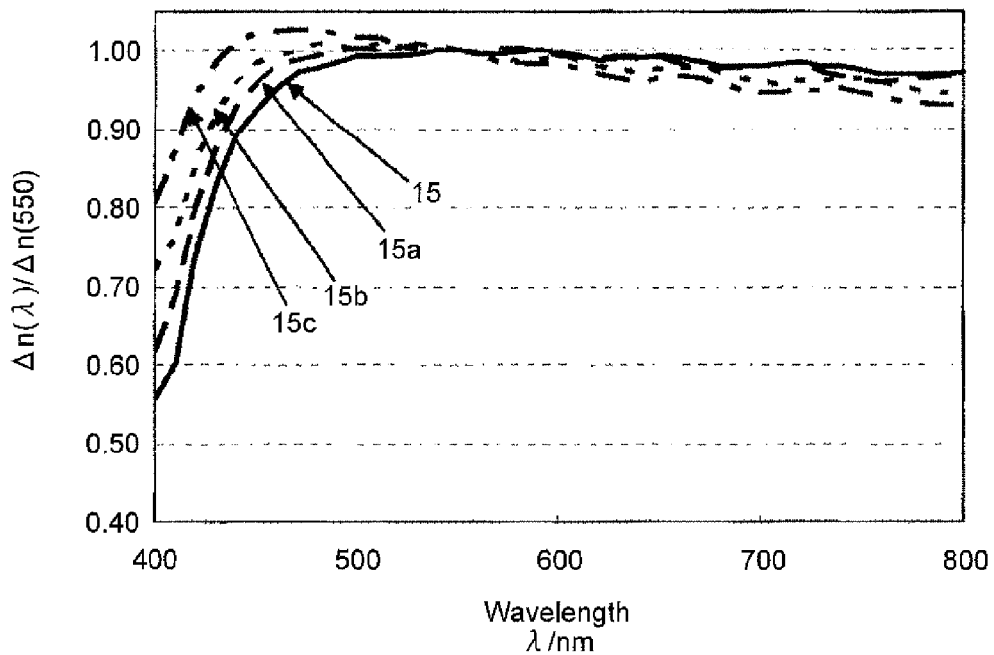
FIG. 8 is a graph showing a change in wavelength dispersion of birefringence $\Delta n$ due to the additive monomer.

The wavelength dispersion properties of the produced phase difference plates were measured using a phase difference analyzer, AxoScan, manufactured by AXOMETRICS. The results of calculation of Δn(λ)/Δn(550) for each of the compositions using the obtained Re wavelength dispersion property and the film thickness are shown in FIG. 8 and the following Table 2. It was found that, as the adding amount of the additive monomer increases, the wavelength dispersion of the birefringence Δn decreases. These results suggest that the wavelength dispersion of the birefringence Δn of the liquid crystal composition can be controlled by controlling the adding amount of the additive monomer.

TABLE 1

| | Product name | Manufacturer | Composition 1 | Composition 2 | Composition 3 |
|---|---|---|---|---|---|
| Polymerizable liquid crystal with reverse dispersion | Compound 1 | ZEON Corporation | 18.3 parts | 17.4 parts | 15.4 parts |
| Additive monomer | LC1057 | BASF Japan Ltd. | 1.0 part | 1.9 parts | 3.9 parts |
| Photopolymerization initiator | IRGACURE-379 | BASF Japan Ltd. | 0.6 part | 0.6 part | 0.6 part |
| Surfactant | FTERGENT-209F | NEOS Company Limited | 5.8 parts | 5.8 parts | 5.8. parts |
| Solvent | Cyclopentanone | — | 74.3 parts | 74.3 parts | 74.3 parts |

TABLE 2

|  | Compound 1 | Composition 1 | Composition 2 | Composition 3 |
|---|---|---|---|---|
| Re (450)/Re (550) | 0.92 | 0.96 | 0.98 | 1.02 |
| Re (650)/Re (550) | 1.01 | 0.99 | 0.97 | 0.96 |

Example 2

A variety of mixtures named as composition 4 and composition 5 shown in the following Table 3 were stirred and mixed homogeneously, and filtrated through a filter with a pore diameter of 0.45 μm to obtain solutions containing the polymerizable liquid crystal compound with reverse wavelength dispersion. Phase difference plates were produced in the same manner as in the Comparative Example.

TABLE 3

|  | Product name | Manufacturer | Composition 4 | Composition 5 |
|---|---|---|---|---|
| Polymerizable liquid crystal with reverse dispersion | Compound 1 | ZEON Corporation | 18.3 parts | 17.4 parts |
| Additive monomer | Compound 3 | ZEON Corporation | 1.0 part | 1.9 parts |
| Photopolymerization initiator | IRGACURE-379 | BASF Japan Ltd. | 0.6 part | 0.6 part |
| Surfactant | FTERGENT-209F | NEOS Company Limited | 5.8 parts | 5.8 parts |
| Solvent | Cyclopentanone | — | 74.3 parts | 74.3 parts |

<Measurement of Wavelength Dispersion of Birefringence Δn>

The wavelength dispersion property of the produced phase difference plate was measured using a phase difference analyzer, AxoScan, manufactured by Axometrics. The results of calculation of Δn (λ)/Δn( 550) for each of the compositions using the obtained Re wavelength dispersion property and the film thickness are shown in FIG. 9 and Table 4. It was found that, as the adding amount of the additive monomer increases, the wavelength dispersion of the birefringence Δn increases. These results suggest that the wavelength dispersion of the birefringence Δn of the liquid crystal composition can be controlled by controlling the adding amount of the additive monomer.

[Chemical Formula 57]

Compound 3

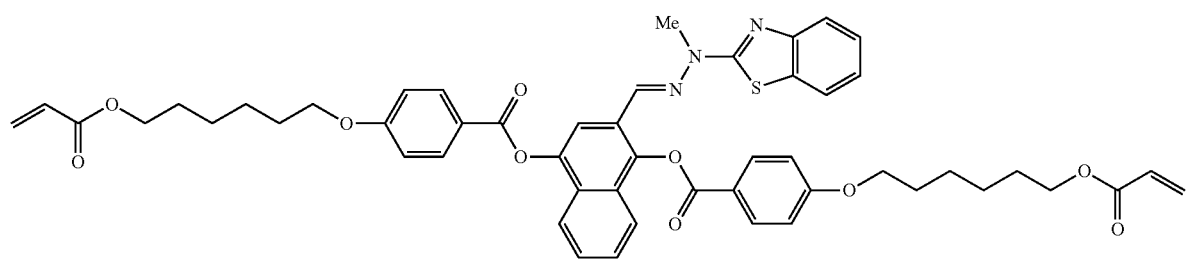

<Measurement of Wavelength Dispersion of Refractive Indices>

The refractive indices of the additive monomer (compound 3) in its slow and fast axis directions were measured using a refractive index measurement device, Prism Coupler, manufactured by Metricon in the same manner as in Example 1. As a result, it was confirmed that, over the entire wavelength range of λ=380 to 780 nm, the refractive index of the compound 3 in the slow axis direction was smaller than that of the compound 1 and the refractive index of the compound 3 in the fast axis direction was larger than that of the compound 1. Further, the compound 3 did not show anisotropy, and the refractive index at a wavelength of λ=550 nm was ne=1.635.

TABLE 4

|  | Compound 1 | Composition 4 | Composition 5 |
|---|---|---|---|
| Re (450)/Re (550) | 0.92 | 0.91 | 0.90 |
| Re (650)/Re (550) | 1.01 | 1.02 | 1.03 |

DESCRIPTION OF NUMERALS

4 Birefringence Δn of polymerizable liquid crystal compound with reverse wavelength dispersion
5 Wavelength dispersion of refractive index in slow axis direction of polymerizable liquid crystal compound with reverse wavelength dispersion 6 Wavelength dispersion of refractive index in fast axis direction of polymerizable liquid crystal compound with reverse wavelength dispersion
7 Wavelength dispersion of refractive index in slow axis direction of additive monomer A (polymerizable liquid crystal compound with forward wavelength dispersion)
8 Wavelength dispersion of refractive index in fast axis direction of additive monomer A (polymerizable liquid crystal compound with forward wavelength dispersion)
9 Wavelength dispersion of refractive index in slow axis direction of liquid crystal composition
10 Wavelength dispersion of refractive index in fast axis direction of liquid crystal composition
11 Wavelength dispersion of birefringence Δn of polymerizable liquid crystal compound with reverse wavelength dispersion
12 Wavelength dispersion of birefringence Δn of liquid crystal composition
13 Wavelength dispersion of refractive index in slow axis direction of Compound 1
13' Wavelength dispersion of refractive index in fast axis direction of Compound 1
14a Wavelength dispersion of refractive index in slow axis direction of Composition 1
14'a Wavelength dispersion of refractive index in fast axis direction of Composition 1
14b Wavelength dispersion of refractive index in slow axis direction of Composition 2
14'b Wavelength dispersion of refractive index in fast axis direction of Composition 2
14c Wavelength dispersion of refractive index in slow axis direction of Composition 3
14'c Wavelength dispersion of refractive index in fast axis direction of Composition 3
15 Wavelength dispersion of birefringence Δn of Compound 1
15a Wavelength dispersion of birefringence Δn of Composition 1
15b Wavelength dispersion of birefringence Δn of Composition 2
15c Wavelength dispersion of birefringence Δn of Composition 3
16a Wavelength dispersion of birefringence Δn of Composition 4
16b Wavelength dispersion of birefringence Δn of Composition 5

The invention claimed is:

1. A liquid crystal composition comprising a polymerizable liquid crystal compound with reverse wavelength dispersion and one of an additive monomer A and an additive monomer B, wherein:
the polymerizable liquid crystal compound with reverse wavelength dispersion includes, in a molecule thereof, a main chain mesogen and a side chain mesogen bonded to the main chain mesogen, an optical axis of the main chain mesogen and an optical axis of the side chain mesogen being oriented in different directions when the polymerizable liquid crystal compound with reverse wavelength dispersion is uniformly oriented, whereby birefringence Δn of the polymerizable liquid crystal compound with reverse wavelength dispersion has reverse wavelength dispersion property; and
when the additive monomer is dispersed in the polymerizable liquid crystal compound with reverse wavelength dispersion, the additive monomer A satisfies the following Expression (i) within the wavelength range of λ=380 nm to 780 nm, and the additive monomer B satisfies the following Expression (ii) within the wavelength range of λ=380 nm to 780 nm:

$$ne>nea \text{ and } no<noa \quad \text{Expression (i)}$$

$$ne<neb \text{ and } no>nob \quad \text{Expression (ii)}$$

(wherein ne is a refractive index of the polymerizable liquid crystal compound with reverse wavelength dispersion in a slow axis direction, no is a refractive index of the polymerizable liquid crystal compound with reverse wavelength dispersion in a fast axis direction,
nea is a refractive index of the additive monomer A in the ne direction when the additive monomer A is dispersed in the polymerizable liquid crystal compound with reverse wavelength dispersion, noa is a refractive index of the additive monomer A in the no direction when the additive monomer A is dispersed in the polymerizable liquid crystal compound with reverse wavelength dispersion,
neb is a refractive index of the additive monomer B in the ne direction when the additive monomer B is dispersed in the polymerizable liquid crystal compound with reverse wavelength dispersion, and nob is a refractive index of the additive monomer B in the no direction when the additive monomer B is dispersed in the polymerizable liquid crystal compound with reverse wavelength dispersion).

2. A phase difference plate comprising an optically anisotropic layer formed by curing a liquid crystal composition containing a polymerizable liquid crystal compound with reverse wavelength dispersion and an additive monomer A, wherein:
in the optically anisotropic layer, the polymerizable liquid crystal compound with reverse wavelength dispersion includes, in a molecule thereof, a main chain mesogen and a side chain mesogen bonded to the main chain mesogen, an optical axis of the main chain mesogen and an optical axis of the side chain mesogen being oriented in different directions, whereby birefringence $\Delta n_L'$ of the optically anisotropic layer has reverse wavelength dispersion property;
the additive monomer A satisfies the following Expression (i) within the wavelength range of λ=380 nm to 780 nm:

$$ne>nea \text{ and } no<noa \quad \text{Expression (i)}$$

(wherein ne is a refractive index of the polymerizable liquid crystal compound with reverse wavelength dispersion in a slow axis direction, no is a refractive index of the polymerizable liquid crystal compound with reverse wavelength dispersion in a fast axis direction,
nea is a refractive index of the additive monomer A in the ne direction when the additive monomer A is dispersed in the polymerizable liquid crystal compound with reverse wavelength dispersion, and noa is a refractive index of the additive monomer A in the no direction when the additive monomer A is dispersed in the polymerizable liquid crystal compound with reverse wavelength dispersion); and
the birefringence $\Delta n_L'$ of the optically anisotropic layer formed by curing the liquid crystal composition and birefringence $\Delta_L$ of an optically anisotropic layer formed by uniformly orienting only the polymerizable liquid crystal compound with reverse wavelength dispersion satisfy relationship of Expression (iii):

$$\Delta n_L(450)/\Delta n_L(550) > \Delta n_L'(450)/\Delta n_L'(550) \text{ and}$$

$$\Delta n_L(650)/\Delta n_L(550) < \Delta n_L'(650)/\Delta n_L'(550) \quad \text{Expression (iii)}$$

(wherein $\Delta n_L(450)$ and $\Delta n_L'(450)$ are the birefringence $\Delta n_L'$, respectively, at a wavelength of $\lambda=450$ nm, $\Delta n_L(550)$ and $\Delta n_L'(550)$ are the birefringence $\Delta n_L$ and the birefringence $\Delta n_L'$, respectively, at a wavelength of $\lambda=550$ nm, and $\Delta n_L(650)$ and $\Delta n_L'(650)$ are the birefringence $\Delta n_L$ and the birefringence $\Delta n_L'$, respectively, at a wavelength of $\lambda=650$ nm).

3. A phase difference plate comprising an optically anisotropic layer formed by curing a liquid crystal composition containing a polymerizable liquid crystal compound with reverse wavelength dispersion and an additive monomer B, wherein:

in the optically anisotropic layer, the polymerizable liquid crystal compound with reverse wavelength dispersion includes, in a molecule thereof, a main chain mesogen and a side chain mesogen bonded to the main chain mesogen, an optical axis of the main chain mesogen and an optical axis of the side chain mesogen being oriented in different directions, whereby birefringence $\Delta n_L'$ of the optically anisotropic layer has reverse wavelength dispersion property;

the additive monomer B satisfies the following Expression (ii) within the wavelength range of $\lambda=380$ nm to 780 nm:

ne<neb and no>nob  Expression (ii)

wherein ne is a refractive index of the polymerizable liquid crystal compound with reverse wavelength dispersion in a slow axis direction, no is a refractive index of the polymerizable liquid crystal compound with reverse wavelength dispersion in a fast axis direction, neb is a refractive index of the additive monomer B in the ne direction when the additive monomer B is dispersed in the polymerizable liquid crystal compound with reverse wavelength dispersion, and nob is a refractive index of the additive monomer B in the no direction when the additive monomer B is dispersed in the polymerizable liquid crystal compound with reverse wavelength dispersion); and $\Delta\lambda$ the birefringence $\Delta n_L'$ of the optically anisotropic layer formed by curing the liquid crystal composition and birefringence $\Delta n_L$ of an optically anisotropic layer formed by uniformly orienting only the polymerizable liquid crystal compound with reverse wavelength dispersion satisfy relationship of Expression (iv):

$\Delta n_L(450)/\Delta n_L(550) < \Delta n_L'(450)/\Delta n_L'(550)$ and $\Delta n_L(650)/\Delta n_L(550) > \Delta n_L'(650)/\Delta n_L'(550)$  Expression (iv)

(wherein $\Delta n_L(450)$ and $\Delta n_L'(450)$ are the birefringence $\Delta n_L$ and the birefringence $\Delta n_L'$, respectively, at a wavelength of $\lambda=450$ nm, $\Delta n_L(550)$ and $\Delta n_L'(550)$ are the birefringence $\Delta n_L$ and the birefringence $\Delta n_L'$, respectively, at a wavelength of $\lambda=550$ nm, and $\Delta n_L(650)$ and $\Delta n_L'(650)$ are the birefringence $\Delta n_L$ and the birefringence $\Delta n_L'$, respectively, at a wavelength of $\lambda=650$ nm).

4. A method for producing the phase difference plate according to claim 2, the method comprising the steps of:
applying the liquid crystal composition onto a support;
rendering orientation of the applied liquid crystal composition uniform; and
fixing the uniform orientation state.

5. A method for producing the phase difference plate according to claim 3, the method comprising the steps of:
applying the liquid crystal composition onto a support;
rendering orientation of the applied liquid crystal composition uniform; and
fixing the uniform orientation state.

6. An image display device comprising the phase difference plate according to claim 2.

7. A method for producing a phase difference plate including an optically anisotropic layer formed by curing the liquid crystal composition according to claim 1, the method comprising
controlling a magnitude of wavelength dispersion in the optically anisotropic layer by an amount of one of the additive monomer A and the additive monomer B in the liquid crystal composition.

8. An image display device comprising the phase difference plate according to claim 3.

* * * * *